United States Patent
Lethin et al.

(10) Patent No.: US 6,463,582 B1
(45) Date of Patent: *Oct. 8, 2002

(54) DYNAMIC OPTIMIZING OBJECT CODE TRANSLATOR FOR ARCHITECTURE EMULATION AND DYNAMIC OPTIMIZING OBJECT CODE TRANSLATION METHOD

(75) Inventors: Richard A. Lethin; Joseph A. Bank, III, both of New York, NY (US); Charles D. Garrett, Seattle, WA (US); Mikayo Wada; Mitsuo Sakurai, both of Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/176,112

(22) Filed: Oct. 21, 1998

(51) Int. Cl.⁷ .................................................. G06F 9/45

(52) U.S. Cl. ........................ 717/158; 717/138; 717/139

(58) Field of Search ...................... 717/9, 5, 151–161, 717/136–145; 712/239; 709/1

(56) References Cited

U.S. PATENT DOCUMENTS

| | | | |
|---|---|---|---|
| 5,751,982 A | | 5/1998 | Morley ........................ 712/209 |
| 5,761,477 A | * | 6/1998 | Wahbe et al. ................... 709/1 |
| 6,115,809 A | * | 9/2000 | Mattson, Jr. et al. ....... 712/239 |
| 6,158,047 A | * | 12/2000 | Le et al. ...................... 717/153 |

FOREIGN PATENT DOCUMENTS

| | | |
|---|---|---|
| JP | 4-213730 | 8/1992 |
| JP | 6-282437 | 10/1994 |

OTHER PUBLICATIONS

Armstrong, HotSpot: A New Breed of Virtual Machine, Java World, Mar. 1998, http://www.javaworld.com/javaworld/jw–03–1998/jw–03–hotspot_p.html.*
Cohn–Lowney, Hot Cold Optimization of Large Windows/NT Applications, IEEE 96, Dec. 1996.*
Conte–Patel–Cox, Using Branch Handling Hardware to Support Profile–driven Optimization, Proceeding of the 1994 27the Annual International Symposium on MicroArchitecture, Dec. 1994.*

(List continued on next page.)

*Primary Examiner*—Gregory Morse
*Assistant Examiner*—Hoang-Vu Antony Nguyen-Ba
(74) *Attorney, Agent, or Firm*—Staas & Halsey LLP

(57) ABSTRACT

An optimizing object code translation system and method perform dynamic compilation and translation of a target object code on a source operating system while performing optimization. Compilation and optimization of the target code is dynamically executed in real time. A compiler performs analysis and optimizations that improve emulation relative to template-based translation and interpretation such that a host processor which processes larger order instructions, such as 32-bit instructions, may emulate a target processor which processes smaller order instructions, such as 16-bit and 8-bit instructions. The optimizing object code translator does not require knowledge of a static program flow graph or memory locations of target instructions prior to run time. In addition, the optimizing object code translator does not require knowledge of the location of all join points into the target object code prior to execution. During program execution, a translator records branch operations. The logging of information identifies instructions and instruction join points. When a number of times a branch operation is executed exceeds a threshold, the destination of the branch becomes a seed for compilation and code portions between seeds are defined as segments. A segment may be incomplete allowing for modification or replacement to account for a new flow of program control during real time program execution.

32 Claims, 19 Drawing Sheets

OTHER PUBLICATIONS

Holze–Ungar, Optimizing Dynamically–dispatched Calls with Run–time Type Feedback, 1994 ACM Jun. 1994.*

Office Action from corresponding German Application No. 199 45 992.4–54 dated Sep. 26, 2001.

Raymond J. Hookway, et al., Digital FX!32: Combining Emultion and Binary Translation, Digital Technical Journal, vol. 9, No. 1, (1997) (11 pages total).

Frank Yellin, The Java Native Code API, Jul. 30 1996, pp. 1–21.

Kemal Ebcioglu, et al., IBM Research Report, Daisy: Dynamic Compilation for 100% Architectural Compatibility, RC 20539 (Aug. 5, 1996) Computer Science, pp. 1–82.

Kemal Ebcioglu, et al., Daisy: Dynamic Compilation for 100% Architectural Compatibility, IBM Thomas J. Watson, Research Center, Yorktown Heights, NY 10598, pp. 26–37.

Raymond J. Hookway, et al., Digital FX132: Combining Emultion and Binary Translation (11 pages total).

H. Massalin. Synthesis: An efficient Implementation of Fundamental Operating System Services. Columbia University Computer Science Technical Report CUCS–039–92, published 1992, Chapter 6, pp. 93–108, 137–140.

U.S. patent application Ser. No. 09/132,139, Wada et al., (corresponds to JP Appln. No. 9–360909) filed Aug. 10, 1998, Fujitsu, Ltd.

* cited by examiner

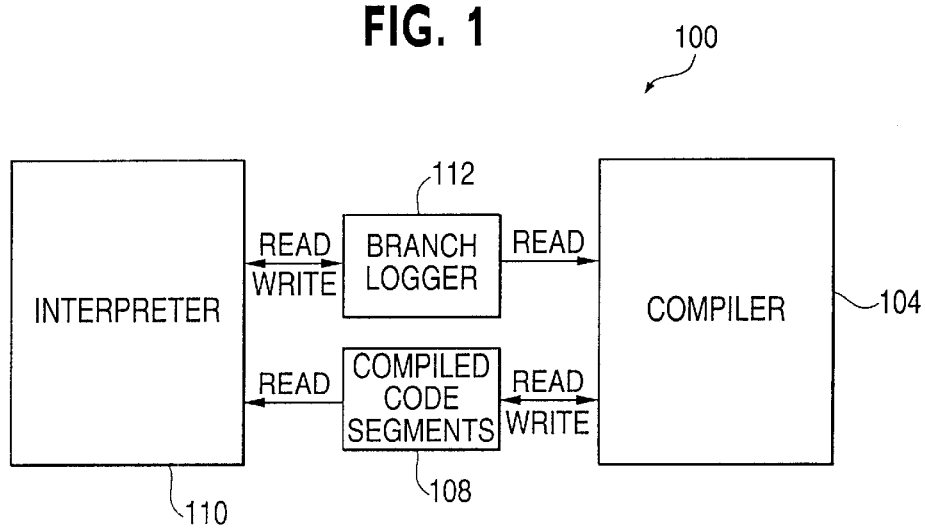
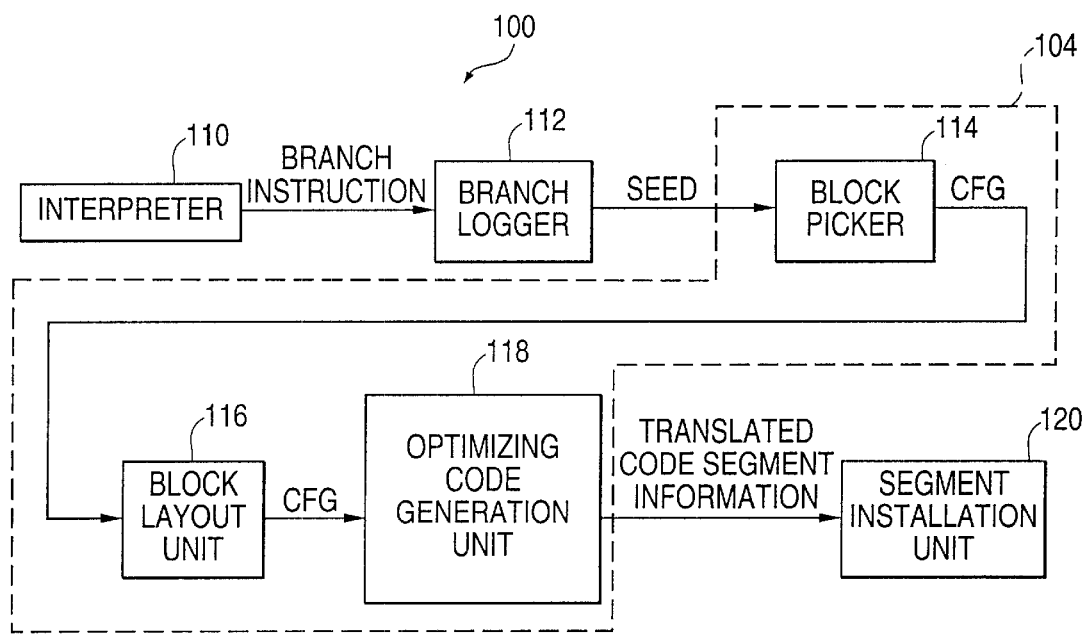

FIG. 8
| branch_address |
| --- |
| branch_destination |
| branch_fall_through |
| encountered_count |
| taken_count |
| next |
FIG. 9
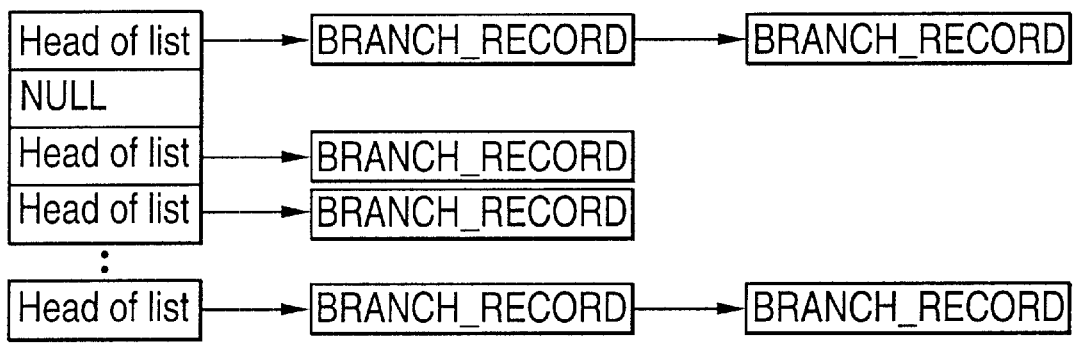
FIG. 10
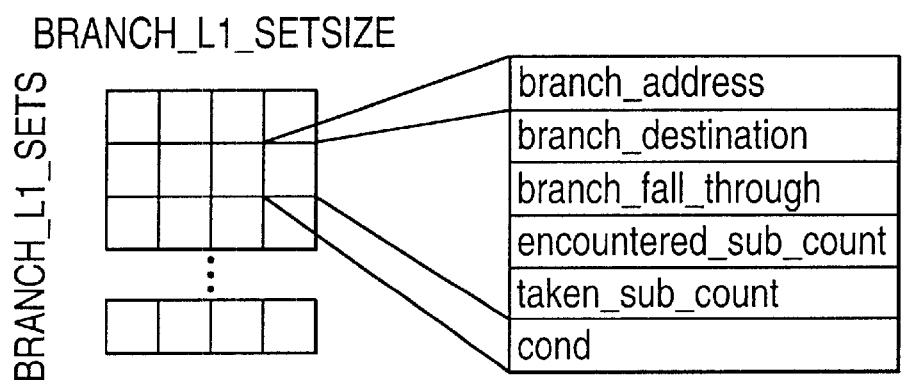

FIG. 14
```
LABEL L1
...
LABEL L2
...
IGOTO
ENTRY 1
ASSIGN r1 r35
ASSIGN r2 r36
GOTO L1
ENTRY 2
ASSIGN r1 r35
GOTO L2
```
FIG. 15
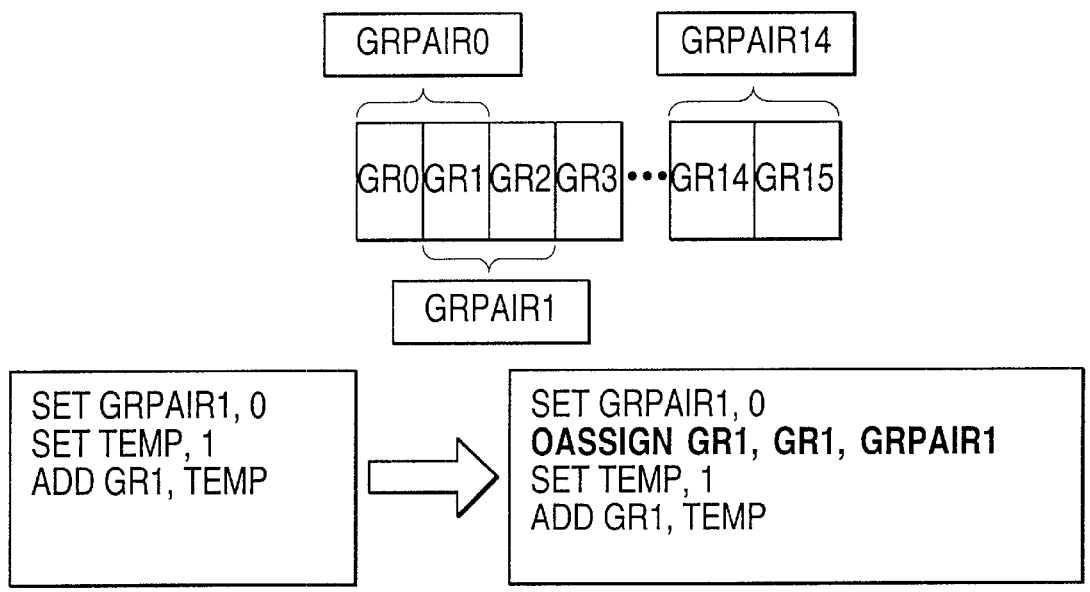
FIG. 16
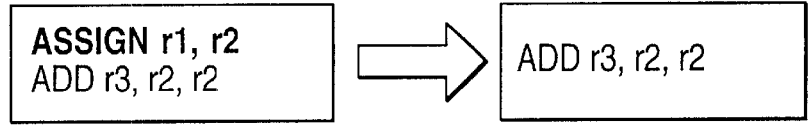

Page 1 (in physical memory): Branch instruction Fall through successor

Page 2 (not in physical memory): Branch taken successor

Page Fault

Set of translated blocks if threshold equals 20%.

DYNAMIC OPTIMIZING OBJECT CODE TRANSLATOR FOR ARCHITECTURE EMULATION AND DYNAMIC OPTIMIZING OBJECT CODE TRANSLATION METHOD

BACKGROUND OF THE INVENTION

The present invention relates to the art of object code translators which operate on a host processing system to emulate a second operating system. More particularly, the present invention relates to the art of dynamic object code translators which perform analysis and computation of an original object code instruction set in real time during execution on a host processor having a host processor object code instruction set.

In the field of object code translators, it becomes necessary to convert object code which has been developed for one computer on another computer having a different computer architecture. Conversion methods for such object code include a conventional method entitled a "static object code conversion method," in which instruction statements are first converted into an object code of a second architecture before execution. A second conventional method is a "dynamic object code conversion method," in which a first object code is converted into a second object code while executing instructions.

In the art of static object code conversion methods, execution time is not influenced by the time required for conversion. However, the physical size of the converted object code becomes large upon execution of the static object code conversion. In other words, in the static object code conversion method, a number of operating steps in the converted object code inevitably increases. As a result, there is a problem in that performance of the converted object code deteriorates and inefficiencies are introduced.

On the other hand, in the dynamic object code conversion method, the size of the converted object code becomes relatively small in comparison with the static converted object code. However, the conventional dynamic object code conversion method has a problem in that all objects, including seldom used objects, are converted. In other words, the conventional dynamic object code conversion method fails to efficiently recognize objects which are executed plural times and thereby increases the time needed for conversion of the original object code while sacrificing efficiency.

BRIEF SUMMARY OF THE INVENTION

Accordingly, it is an object of the present invention to provide an object code translator which address the problems in the art while providing dynamic optimization of the translated object code.

It is a further object of the present invention to profile a major program until a compiler completes compiling, with the is profile being used by the compiler to compile and optimize the program.

It is an even further object of the present invention to jump from non-translated code to translated during dynamic optimization and compilation.

It is an even further object of the present invention to provide a dynamic optimizing object code translator with software feedback which computes difference between a number of translation requests sent to the compiler and a number of translations completed.

A further object of the present invention is to provide a dynamic translation of a computer program in one machine language into another machine language while the program is running.

Moreover, it is an object of the present invention to provide a dynamic object code translator which determines segments for translation from a plurality of seeds which correspond to branches in a source object code.

Objects of the present invention are achieved by a computer architecture emulation system which emulates a source computer architecture on a destination computer architecture, including an interpreter for individually translating source object code into corresponding translated object code and for determining a number of executions of branch instructions in the source object code; and a compiler for grouping instructions of the source object code into a segment when a number of executions of a corresponding branch instruction exceeds a threshold number, and for dynamically compiling the segment.

Objects of the present invention are further achieved by a computer architecture emulation system which emulates a source computer architecture on a destination computer architecture system, including a plurality of interpreters for individually translating source object code into corresponding translated object code, wherein each of the plurality of interpreters profile source object code branch information in real time while executing translated object code instructions; and a compiler for grouping source object code instructions from any of the plurality of interpreters into segments based upon corresponding branch instructions in the source object code and for dynamically compiling the segments of the source object code when the corresponding branch instruction is greater than a threshold number.

Even further objects of the present invention are achieved by a computer architecture emulation system which emulates a source computer architecture on a destination computer architecture system, including an interpreter for individually translating source object code into corresponding translated object code, wherein the interpreter profiles branch instructions of the source object code by storing a number executions for each branch instruction and comparing the number of executions with a threshold number, such that branch instructions which exceed the threshold number are seeds; and a compiler for grouping the source object code instructions into segments based upon the seeds and dynamically compiling the segments of the source object code during translation and profiling by the interpreter.

Additional objects of the present invention are achieved by a multi-tasking computer architecture emulation system which emulates a source computer architecture on a multi-tasking destination computer architecture, including an interpreter task for individually translating source object code into corresponding translated object code and for determining a number of executions of branch instructions in the source object code; and a compiler task operating with the interpreter on the multi-tasking destination computer architecture, for grouping instructions of the source object code into a segment when a number of executions of a corresponding branch instruction exceeds a threshold number, and for dynamically compiling the segment.

BRIEF DESCRIPTION OF THE DRAWINGS

These and other objects and advantages of the present invention will become apparent and more readily appreciated from the following description of the preferred embodiments, taken in conjunction with the accompanying drawings of which:

FIG. 1 is a block diagram of a high level architecture of an OOCT system according to a preferred embodiment of the present invention.

FIG. 2 is a flow diagram illustrating major components of an optimizing object code translation along with flow of control for compiling a section of original code.

FIG. 8 is a block diagram illustrating a structure of a BRANCH_RECORD.

FIG. 9 is a schematic diagram illustrating a structure of a branch log as part of a large hash table that stores BRANCH_RECORDs.

FIG. 10 is a schematic diagram illustrating a structure of an L1 cache which is a 2-dimensional array of BRANCH_L1_RECORDs.

FIG. 14 is a block diagram of a code outline with two external entry points where a fill was inserted between the ENTRY instruction and the GOTO instruction.

FIG. 15 is a block diagram illustrating an OASSIGN insertion example.

FIG. 16 is a block diagram illustrating an example of dead code elimination and address check elimination.

DETAILED DESCRIPTION OF THE PREFERRED EMBODIMENTS

Figure 3:
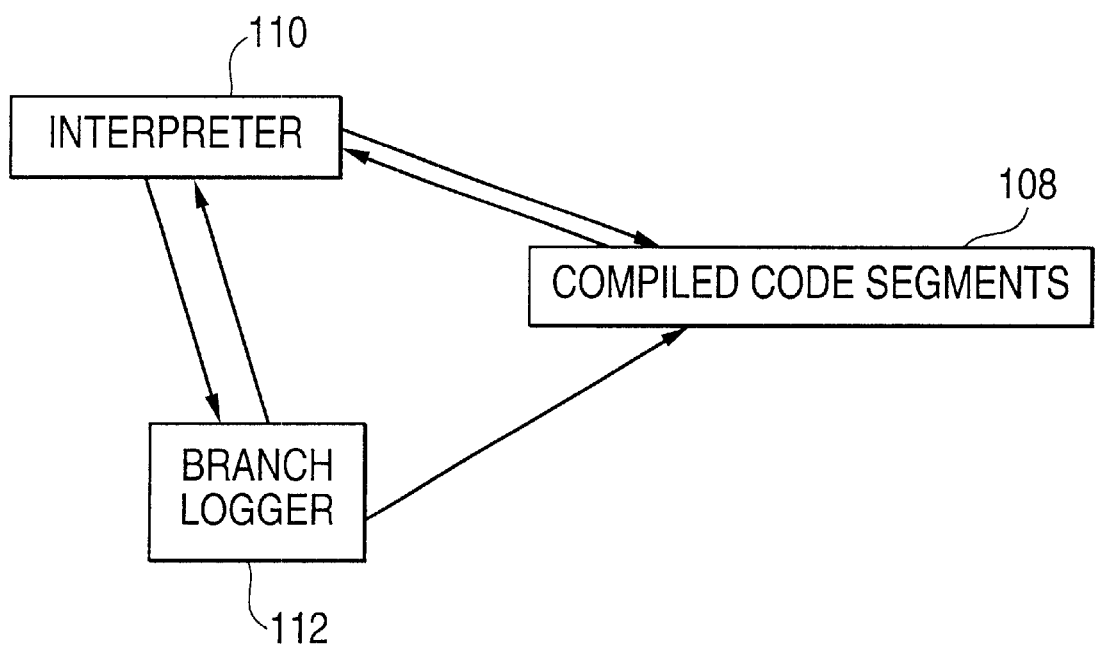
FIG. 3 is a flow diagram illustrating flow of control in an optimizing object code translation during normal execution.

Reference will now be made in detail to the preferred embodiments of the present invention, examples of which are illustrated in the accompanying drawings, wherein like reference numerals refer to like elements throughout.

First Embodiment of the Present Invention

I. System Overview

The present invention generally relates to an optimizing object code translator, hereinafter ("OOCT"), which performs dynamic compilation of a microprocessor instruction set as part of a computer architecture emulation system. Compilation is dynamic because there is no simple access to the application instruction set before run time. Using a compiler as part of the object code translation system allows the system to perform analysis and optimizations that improve the performance of the emulation relative to template-based translations and template-based interpretations.

The host processor for the emulation is preferably a commercially available processor such a the Intel Pentium Pro. The architecture of the Pentium Pro's instruction set facilitates manipulation of different sizes of data, and thereby facilitates emulation of both 16-bit and 8-bit object code instructions. The 16-bit and 8-bit object code instructions may be designed for original application on a second processor, such as a K-series processor from Fujitsu.

Performing meaningful compiler-type optimizations is only possible with knowledge of an instruction flow graph. In a traditional compiler, the flow graph is given and well defined, because the whole routine is completely parsed before optimization begins. For OOCT, this is not the case. Before running the program, the location of instructions in the memory image is unknown. This is because the instructions are variable in length, with arbitrary intervening sets of non-instruction data. The location of instructions is unknown, as is the location of all join points into the instructions.

Therefore, to determine the flow graph, the program must be run. An interpreter runs the program the first time. As the interpreter executes the program, the interpreter informs OOCT each time that it performs a branch operation. This logging of information identifies some of the instructions and some of the join points. As the program runs, information about the flow graph becomes more complete, though never totally complete. The OOCT system is designed to work with partial information about the flow graph: optimization is on potentially incomplete flow graphs, and the system is designed to allow optimized code to be replaced as more information becomes available.

The dynamic compilation chooses which portions of the text to optimize based on profiling information gathered by the interpreter. When the number of times some branch is executed exceeds a threshold number, the destination of that branch becomes a seed for compilation. The seed is a starting point for a parse of a portion of the K instructions to be compiled as a unit. This unit is called a segment.

A segment contains host processor instructions that result from optimizing the original processor instructions from the seed. A segment is installed and uninstalled as a unit. When the interpreter calls OOCT to inform of a branch, OOCT may choose to transfer control into the segment if code for the destination exists. Similarly, the segment may contain code for transferring control back to the interpreter.

A segment itself may be incomplete, such that the segment only represents a subset of the possible flow paths from the original program. But this incomplete representation does not interfere with correct operation of the emulation. If a new, unanticipated flow path through the original code arises, then control flow will jump back to the interpreter. Later, the same segment can be replaced to account for the new flow of control.

II. OOCT Code Structure

According to an embodiment of the present invention, the OOCT may run under a conventional operating system environment such as Windows. However, according to a second embodiment of the present invention, OOCT may be built to link with emulation firmware of an second operating system, such as the KOI operating system by Fujitsu.

III. Architecture

FIG. 1 illustrates a high level architecture of the OOCT system 100. FIG. 1 illustrates two tasks, namely an interpreter 110 and a compiler 104. Interpreter 110 and compiler 104 operate simultaneously under a multi-tasking operating system. The two tasks can both access a branch log by way of branch logger 112 and can also access the compiled code segments 108. Additionally, interpreter 110 can send compilation requests to compiler 104. A more complete description of the communication between the two tasks is given in the Communication section set forth below.

Compilation Flow Control

FIG. 2 illustrates the major components of the OOCT 100, along with the flow of control for compiling a section of original code. The main OOCT stages are as follows. First, interpreter 110 profiles branch information by communicating with branch logger 112. Branch logger 112 then uses a seed selection method to determine which seeds to send to compiler 104. Block picker 114 then uses the seed and branch profile information to choose a segment of the original code to compile. The block picker 114 then creates a control flow graph (CFG) that describes the original instructions to compile and passes the CFG to block layout unit 116.

The block layout unit 116 then flattens the control flow graph into a linear list of instructions. Optimizing code generation unit 118 performs the actual compilation of original instructions into translated code segment instructions. The translated code produced, along with information about the segment being compiled, is finally passed to segment installation unit 120, which makes the code available to the interpreter 110.

OOCT Execution Flow of Control

FIG. 3 illustrates the flow of control in OOCT during normal execution. While interpreter 110 is executing code, the OOCT can enter the branch logger 112 when executing certain instructions. Branch logger 112 can either return to interpreter 110, or if the destination of the branch has already been compiled, enter one of the installed segments of compiled code. From the compiled code, transitions can be made from segment to segment, or back to interpreter 110. The compiled code can either call interpreter 110 to execute a single original instruction, or can jump to interpreter 110, passing all control to interpreter 110.

A description of the first embodiment of the subject application is divided as follows. The first section describes the interface between interpreter 110 and compiler 104. The second section describes the modifications that were made to interpreter 110 for OOCT. The third section describes compiler 104. The final section describes a windows testing environment.

A description of the second through ninth embodiments of the present invention follow the description of the first embodiment.

IV. Communications (Common Unit)

Interpreter 110 and compiler 104 communicate with each other in several ways. The interpreter 110 records branch information into a branch log by communicating with branch logger 112. Compiler 104 is also able to read the branch log. Compiler 104 creates compiled code segments and stores their entry points in the Translation Table, which interpreter 110 reads. The interpreter 110 also send seed addresses to compiler 104 through a buffer. The source code, which is used by both compiler 104 and interpreter 110 for this communication, is in the Common directory. This section describes how the communication works.

Shared OOCT Buffer

All communication between compiler 104 and interpreter 110 is directed through the OOCT buffer area which is a large region of shared memory. Some communication also uses system calls to send messages from the interpreter 110 to compiler 104 and back.

Table 1, set forth below, illustrates a picture of the statically allocated parts of the OOCT buffer. The rest of the buffer is allocated dynamically for different data structures shown in Table 2, also set forth below. Some fields in the statically allocated part of the OOCT buffer point to data structures in the dynamically allocated part. These pointers have superscript numbers to show what they point to. For example, the zones field in the statically allocated part has the number 2 and the zones field points to the zone memory data structure in the dynamically allocated part, which also has the number 2.

TABLE 1

The statically allocated part of the OOCT buffer.

| Field | Offset | Contents |
|---|---|---|
| jump_table | 0h | An array of entry points in interpreter 110, such as IC_FETCHO2, IU_PGMxx. OOCT_INIT writes them and compiler 104 reads them. Compiler 104 uses them to generate jumps to interpreter 110. |
| trans_master_target_table[1] | 1000h | An array of pointers, one for each page in ASP's address space. For a page that ASP does not use, the pointer is 0. For a page that ASP uses, the pointer points to an array in the dynamically allocated part of the OOCT buffer (see below.) |
| unallocated | 41004h | A pointer which points to the first unused byte in the dynamically allocated part of the buffer. Only used during initialization. |
| length_left | 41008h | The number of bytes left in the dynamically allocated part of the buffer. Only used during initialization. |
| num_execs | 4100Ch | The number of interpreter 110. |
| zones[2] | 41010h | A pointer to the zone memory, which is in the dynamically allocated part of the OOCT buffer. OOCT_INIT writes the pointer while compiler 104 reads the pointer. Compiler 104 uses the zone memory during compiling. |
| zones_length | 41014h | The amount of zone memory. Written by OOCT_INIT and read by compiler 104 |
| segments[3] | 41018h | A pointer to the segment memory, which is in the dynamically allocated part of the OOCT buffer. OOCT_INIT writes the pointer while compiler 104 reads the pointer. Compiler 104 uses the segment memory to store compiled code. |
| segments_length | 4101Ch | The amount of segment memory. Written by OOCT_INIT and read by compiler 104 |
| branch_l1_tables[4] | 41020h | A pointer to level-one (L1) branch cache structures, which are in the dynamically allocated part of the OOCT buffer. |
| branch_record_free_list[5] | 41024h | A list of unused BRANCH_RBCORD structures, which are in the dynamically allocated part of the OOCT buffer. |
| branch_header_table[6] | 41028h | A hash table containing BRANCH_RECORD structures. The table is dynamically allocated in the OOCT buffer. |
| branch_log_lock | 4102Ch | A lock which must be held to write to the branch log. |
| branch_seed_buffer | 41030h | A buffer which the interpreter 110 use to send seeds to compiler 104. |
| num monitor_seed_messages | 41060h | A counter that tells how many messages the interpreter 110 have sent to compiler 104, but compiler 104 has not finished. |
| seed_threshold_mode | 41064h | A flag that tells the interpreter 110 how to pick a seed. The seed is either OOCT_DEBUG_MODE or OOCT_PERFORMANCE_MODE. |
| seed_production_threshold | 41068h | The threshold number of times a branch must execute before its destination becomes a seed for compiler 104. |
| trickle_flush_l1_rate | 4106Ch | The number of times a branch can be updated in an L1 cache before the branch is flushed from the cache and written back to memory. |
| seeds_sent | 41070h | UNUSED |
| seeds_handled | 41074h | UNUSED |
| exit | 41078h | Compiler 104 uses this flag to tell the interpreter 110 that compiler 104 has shut down after receiving a signal. |
| segment_exit | 4107Ch | An entry point jn the interpreter 110, which compiled code jumps to upon exit. The code at this entry point releases locks if necessary. |
| segment_exit_interp | 41080h | An entry point in the interpreter 110, which compiled code jumps to upon ending with an instruction that must be interpreted. The code at this entry point releases locks if necessary. |
| segment_exit_log | 41084h | An entry point in the interpreter 110, which compiled code jumps to upon ending with a non-fixed branch instruction. The code at this entry point releases locks if necessary. |
| sbe_impl | 41088h | An entry point in the interpreter 110, which compiled code calls to execute the SBE instruction |
| cc_impl | 4108Ch | An entry point in the interpreter 110, which compiled code calls to execute the CC instruction |

TABLE 1-continued

The statically allocated part of the OOCT buffer.

| Field | Offset | Contents |
|---|---|---|
| mv_impl | 41090h | An entry point in the interpreter 110, which compiled code calls to execute the MV instruction |
| mv_impl_same_size | 41094h | An entry point in the interpreter 110, which compiled code calls to execute the MV instruction when the lengths of both strings are the same. |
| segment_lock mousetrap | 41098h | An entry point in the interpreter 110, which compiled code calls to verify that it still holds a lock. THIS IS ONLY USED FOR DEBUGGING. |
| breakpoint_trap | 4109Ch | An entry point in the interpreter 110, which compiled code calls to stop in the debugger. THIS IS ONLY USED FOR DEBUGGING. |
| segment_gates | 410A0h | An array of SEGMENT_GATE structures. The SEGMENT_GATEs are used to lock segments of compiled code. |
| gate_free_list | 710A0h | A list of currently unused SEGMENT_GATEs. |
| ooct_stack_bottom[7] | 710A4h | The lowest address of compiler 104's stack. Points into the dynamically allocated part of the OOCT buffer. |
| ooct_stack_top[7] | 710A8h | The highest address of compiler 104's stack. Points into the dynamically allocated part of the OOCT buffer. |
| build_options | 710ACh | The options used to build the interpreter 110. In ooct_compiler_start, compiler 104 checks that it was built with the same options. |
| code_zone[2] | 710B0h | A pointer to an area of dynamically allocated memory. Compiler 104 uses this memory to temporarily create an array of target instructions. At the end of compilation, this array is copied to the segment memory area and then deleted. |

In the dynamically allocated part of the OOCT buffer, the sizes of data structures depend on several variables. One is the number of system pages used by the operating system for the original processor, such as ASP by Fujitsu. For each page of ASP address space that contains instructions to be translated, there is one translated page in the translation table. Another variable is the number of branch instructions that the system expects to log. It currently expects $2^{20}$ branches which affects the size of the BRANCH_RECORD array and the branch header table. The number of interpreter 110 affects the size of the L1 branch logger cache, because there is one cache for each task.

Figure 4:
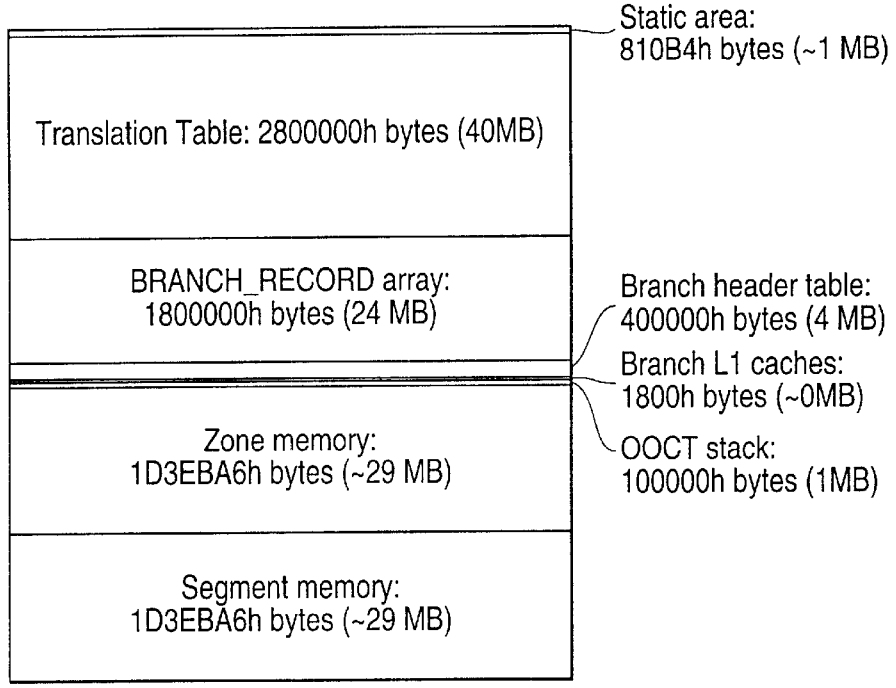
FIG. 4 is a schematic diagram illustrating an OOCT buffer for one setting of a variables.

FIG. 4 illustrates a picture of the OOCT buffer for one setting of the variables. In FIG. 4, the number of ASP pages is 10 MB of ASP instructions, the number of interpreter 110 is 4 and the total size of the OOCT buffer is 128 MB.

TABLE 2

The dynamically allocated part of the OOCT buffer.

| Name | Contents |
|---|---|
| Translation Table[1] | For every page of address space used by ASP, there is one 16 KB page allocated in the translation table. SIZE = Num system pages * 16 KB. |
| BRANCH_RECORD array[5] | We guess how many branch instructions occur in ASP (current guess is $2^{20}$) and allocate one BRANCH_RECORD for each one. SIZE = $2^{20}$ * 24 bytes = 24 MB. |
| Branch header table[6] | There is one pointer to a BRANCH_RECORD for each estimated branch. SIZE = $2^{20}$ * 4 bytes = 4 MB. |
| Branch L1 caches[4] | For each interpreter 110, there is one cache with 32 sets, 4 BRANCH_L1_RECORDs per set. SIZE = Num execs * 32 * 4 * 24 bytes. Maximum SIZE = 16 * 32 * 4 * 24 bytes = 49152 bytes. |
| OOCT stack[7] | A 1 MB stack. |
| Zone memory[2] | A percentage of the remaining memory is used for zone memory. Currently 50% of memory is used. |
| Segment memory[3] | A percentage of the remaining memory is used for segment memory. Currently 50% of memory is used. |

Branch Log (Branch Logger 112)

The branch log data structures are the BRANCH_RECORD array, the branch header table and the branch L1 caches. Please see the section on interpreter modifications, set forth below, for an explanation of how branch logger 112 works. This section will describe how the branch log is used to communicate information from the interpreter 110 to compiler 104.

FIG. 4 illustrates the OOCT buffer after initialization. The sizes of the regions are drawn to scale. For this example, the size of the OOCT buffer is 128 MB, the number of ASP pages is 2560, the number of interpreter 110 is 2 and the expected number of branch instructions is 220.

Compiler 104 reads the branch log to find out how many times a conditional branch instruction was taken and how many times a conditional branch instruction was not taken. Compiler 104 uses this information in two ways. First, when compiler 104 parses instructions, compiler 104 tries to parse only the instructions that have been executed most frequently. If there arises a conditional branch instruction, it checks how many times it branched and how many times it fell through. Second, when compiler 104 generates code, the compiler tries to place the most likely successor instruction of a conditional branch immediately after the branch instruction. This makes the generated code run faster. In order to tell which successor is more likely, compiler 104 uses branch log information. Please reference compiler 104 information set forth below for more details.

BRANCH_Get_Record (ooct/compiler/branch.c)

When compiler 104 wants to read branch log information, it calls the procedure BRANCH_Get_Record with the address of the branch instruction. This procedure looks up the branch in the branch log and returns a pointer to one of the elements of the BRANCH_RECORD array. Compiler 104 can then see how many times the branch instruction was executed, how many times it branched and how many times it fell through.

Translation Table (Trans Unit)

The translation table contains information about every instruction in the ASP address space. The translation table records whether the instruction is the destination of a branch (JOIN), whether the instruction was sent to compiler 104 as a seed (BUFFERED) and whether there is a compiled code entry point for the segment (ENTRY). When OOCT is initialized, the translation table is empty. When branch instructions are logged, their destinations are marked as JOIN points. If the branch executes more times than the threshold, the destination will be sent as a seed to compiler 104 and the translation table entry will be marked BUFFERED. After compiler 104 finishes compiling the translated version, it stores the addresses of entry points in the translation table and marks them as ENTRYs.

Figure 5A:
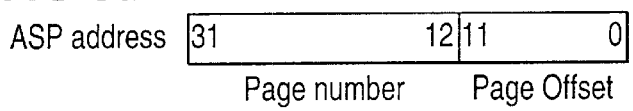
FIGS. 5a, 5b and 5c are schematic diagrams illustrating the structure of a translation table.
Figure 5B:
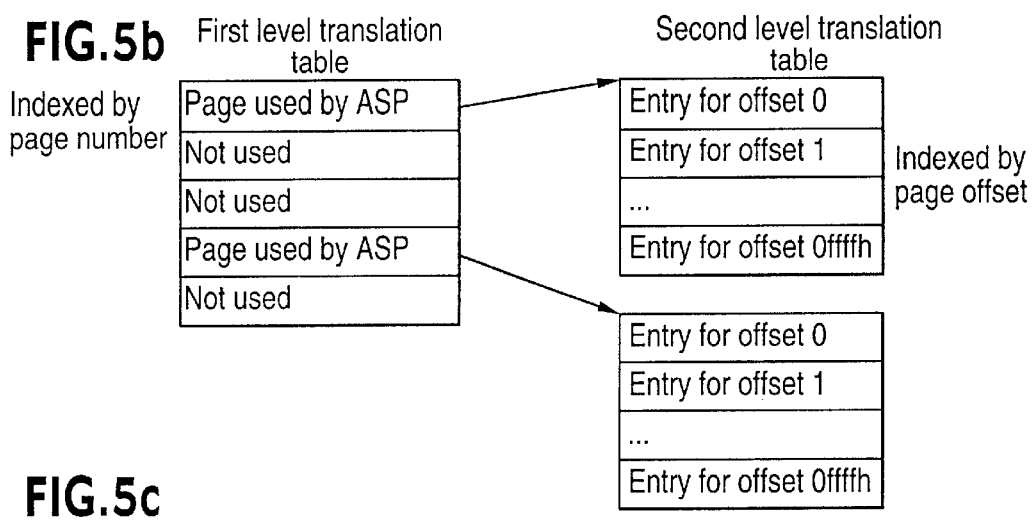
Figure 5C:
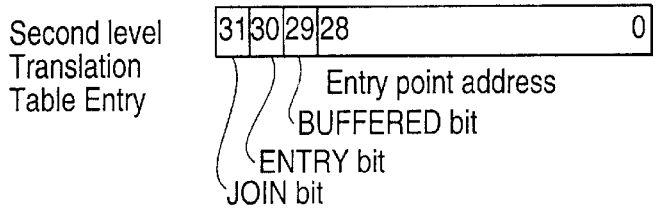

FIGS. 5a, 5b and 5c illustrate the structure of a translation table according to a preferred embodiment of the present invention. As illustrated in FIG. 5a, an ASP address is divided into two parts. The high 20 bits are the page number and the low 12 bits are the page offset.

FIG. 5b illustrates that the page number is used as an index into the first level translation table. The pages that ASP act are in the first level table. The pages that ASP does not use have no pointers because there will never be an instruction with that page number. The pointers point into the second level translation table. Adding the page offset to the pointer gives a translation table entry.

As illustrated in FIG. 5c, each entry is 32 bits long and its fields are shown at the bottom. The first bit says whether the ASP instruction is a join point. The second says whether there is a segment entry point for the instruction. The third says whether the instruction was sent to compiler 104 as a seed. The other bits of the translation table entry are the entry point address for the instruction if there is one or 0 if there is no entry point.

Since the K machine architecture has variable length instructions, the translation table has an entry for every ASP address, including addresses that are in the middle of instructions and data addresses. This makes the table very large but it simplifies the job of locating the translation table entry for an address. The structure of the translation table is shown in FIGS. 5a, 5b and 5c. As mentioned above, the second level translation table has a 32 bit entry for every ASP address. So if ASP uses 10 MB of space, the second level translation table uses 40 MB. There are several procedures and macros that read and write the entries of the translation table:

TRANS_Set_Entry_Flag (ooct/common/trcommon.h)

The TRANS_Set_Entry_Flag macro turns on one of the flags, JOIN, ENTRY or BUFFERED, of the translation table entry. It uses an assembly language instruction with the lock prefix so that it sets the bit atomically.

TRANS_Reset_Entry_Flag (ooct/common/trcommon.h)

The TRANS_Reset_Entry_Flag macro turns off one of the flags, JOIN, ENTRY or BUFFERED, of the translation table entry. It uses an assembly language instruction with the lock prefix so that it resets the bit atomically.

TRANS_Entry_FlagP (ooct/common/trcommon.h)

The TRANS_Entry_FlagP macro reads and returns the state of one of the flags, JOIN, ENTRY or BUFFERED, of the translation table entry.

TRANS_Test_And_Set_Entry_Flag (ooct/common/trcommon.h)

The TRANS_Test_And_Set_Entry_Flag procedure atomically reads the state of one of the flags, JOIN, ENTRY or BUFFERED, and turns it on if it was not already on. It returns the state of the flag before calling the procedure.

TRANS_Set_Entry_Address (ooct/common/trcommon.h)

The TRANS_Set_Entry_Address procedure writes the entry point address of the translation table entry. It uses an assembly language instruction with the lock prefix so that it writes the address atomically. Note that an entry point address is the address of an target instruction if there is no segment locking, but it is the address of a SEGMENT_GATE data structure if there is segment locking.

TRANS_Get_Entry_Address (ooct/common/trcommon.h)

The TRANS_Get_Entry_Address procedure reads and returns the entry point address of the translation table entry. Note that an entry point address is the address of an target instruction if there is no segment locking, but it is the address of a SEGMENT_GATE data structure if there is segment locking.

Segments

A segment is a unit of compiled code that may be executed by the KOI system. Compiler 104 material set forth below describes how a segment is created and deleted. This section describes how compiler 104 tells the interpreter 110 about a segment, how the interpreter 110 enter and leave the segment and how compiler 104 tells the interpreter 110 to stop using one segment and switch to another.

When a segment is created, there are several ASP instruction addresses where the interpreter 110 can enter the segment. For each of these addresses, compiler 104 creates an entry point to the segment. An entry point is a special point in the segment where the interpreter 110 is allowed to jump. At other points in the segment, the compiled code assumes that certain values are in registers, so it is not safe to jump there. To tell the interpreter 110 where the entry points are, compiler 104 calls TRANS_Set_Entry_Address for each nth TRANS_Get_Entry_Address.

The interpreter 110 check for compiled code segments when they enter branch logger 112. They call TRANS_

Entry_FlagP to see if the current ASP address has an entry point. If it does, they call TRANS_Get_Entry_Address to read the address. If segment locking is on, they lock the segment (see below) and then jump to the entry point. If segment locking is off, they just jump to the entry point. The compiled code decides when it should exit. Usually, this happens when it needs to execute an instruction that is not part of the same segment, so it jumps to interpreter 110.

entry points in the translation table, which makes it unreachable. When compiler 104 overwrites the segments last entry, it goes from state R/L to U/L if an interpreter 110 is using it, or from state R/U to U/U if no interpreter 110 was using it. Eventually, all interpreter 110 using the segment will release their locks and the segment will be in state U/U. Compiler 104 can then reclaim the segment and delete it because no interpreter 110 is using it and none can enter it.

TABLE 3

The states that a segment can be in

| State | Reachab | Locke | Description |
|---|---|---|---|
| U/U | No | No | No interpreter 110 is using the segment and no interpreter 110 can enter it. Compiler 104 can delete it at any time. |
| R/U | Yes | No | No interpreter 110 is using the segment but an interpreter 110 |
| R/L | Yes | Yes | One or more interpreter 110 are using the segment and other |
| U/L | No | Yes | One or more interpreter 110 are using the segment but no |

Compiler 104 can delete one compiled code segment and tell the interpreter 110 to use another one. Compiler 104 does this by turning off the ENTRY bit of the translation table entry, changing the entry point address and then turning on the ENTRY bit again.

Segment Locking

Segment locking is an optional feature of the OOCT system. Since branch logger 112 gains more information as the system runs, compiler 104 can produce a new version of a segment that is better than the old one. Segment locking permits compiler 104 to replace an old segment with a new one and reclaim the memory used by the old segment. Unfortunately, segment locking makes branch logger 112 and compiled code slower. So there is a tradeoff between the time to execute OOCT code and the space that it uses. This section describes how the segment locking works.

The segment locking code has two main parts. The first part is an interface for all parts of the OOCT system except the segment locking implementation. This interface guarantees that a segment can only be in one of four well-defined states and will change states atomically in well-defined ways. The second part is the implementation of segment locking itself, which fulfills the guarantees made by the interface.

Design

The states that a segment may be in are shown in Table 3. A segment may be either reachable or unreachable and it may be either locked or unlocked. Segments are reachable when there are one or more entry points in the translation table. It is unreachable when there are no entry points to the segment in the translation table. An entry point is a structure that contains a lock and an instruction address. The lock, which may be used by more than one interpreter 110 at the same time, counts how many interpreter 110 are using the entry point and the segment containing it. A segment is locked when one or more of its entry points are locked. It is unlocked when all of its entry points are unlocked.

Figure 6:
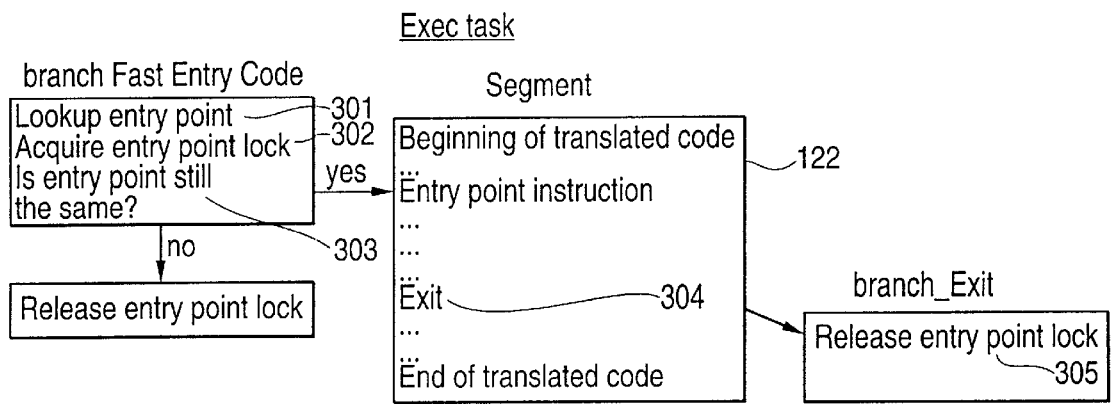
FIG. 6 is a block diagram of an interpreter for entering and leaving a segment.

Compiler 104 may reclaim and delete a segment if it is unreachable and unlocked, but it cannot reclaim it if it is reachable or locked. Every segment begins in state U/U when compiler 104 creates it. It moves to state R/U when compiler 104 writes its entry points to the translation table. It can move to state R/L and back to R/U as interpreter 110 enter and leave the segment. Compiler 104 may create a new segment that translates the same instructions as an old segment. In this case, it will overwrite the old segments FIG. 6 illustrates interpreter 110 for entering and leaving a segment 122 according to an embodiment of the present invention. The segment 122 in the middle of the drawing is the unit of code produced by compiler 104. Segment 122 must be locked at all times when used by interpreter 110. Accordingly, a lock counter (not shown) is incremented before entering segment 122 and the lock counter is decremented after leaving segment 122. Since the interpreter 110 cannot lookup the entry point and lock the entry point atomically, it must be determined whether the entry point did not changed after being locked.

Figure 7:
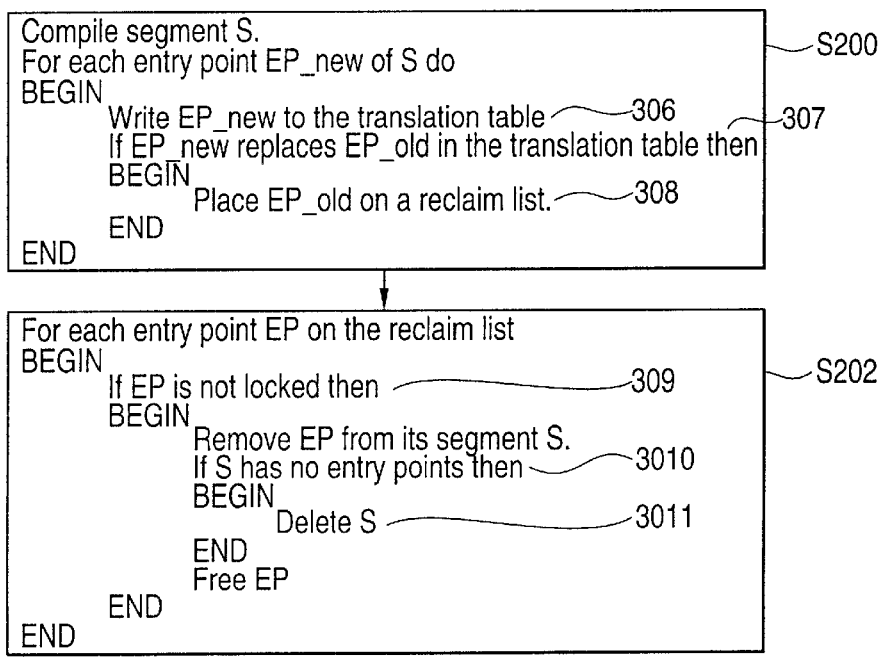
FIG. 7 is a block diagram of a compiler method for creating a segment, making the segment reachable by an interpreter, making old segments unreachable, and deleting old segments.

FIG. 7 illustrates a compiler 104 method for creating a segment, making the segment reachable by interpreter 110, making old segments unreachable, and deleting old segments. In step S200, compiler 104 creates a new segment and adds associated entry points to the translation table. When an entry point is added in step S200, an older entry point may be re-written. The older entry point is now unreachable, and accordingly may be reused if no task (such as interpreter 110 or compiler 104) holds a lock on it. The old entry point is put on a reclaim list (not shown).

Step 202 illustrates how compiler 104 uses the reclaim list. Step 202 checks whether an entry point is locked. If the entry point is not locked, then the entry point is not being used by any interpreter 110, and therefore can be removed from the segment that owns it. However, if that segment does not have any more entry points, then the segment is not being used by a task (such as interpreter 110 and compiler 104) and no task can enter it. Therefore, the segment can be deleted.

The segment locking interface allows most parts of OOCT to ignore the details of synchronization because a segment always appears to be in a well-defined state and all state transitions appear to happen atomically. However, within the segment locking code the transitions are not atomic because the Intel target does not support such complicated operations in hardware. Therefore, the segment locking code makes the transitions appear to be automatic.

Implementation

Procedures for execution of the interpreter 110 and compiler 104 are illustrated in FIG. 6 and FIG. 7, respectively. The two procedures cooperate to ensure that each transition appears automatic. The numbered references in the following description refer to FIG. 6 and FIG. 7.

There are six possible transitions among the four states of the segment interface and they fall into four groups. The first transition is U/U to R/U, when compiler 104 makes a segment reachable by writing its entry points into the translation table (*6). Since compiler 104 is the only task allowed to write the translation table, no synchronization is necessary to make this transition automatic.

The second group of transitions is R/U to U/U and the similar one from R/L to U/L. These happen when compiler 104 overwrites the last entry point of a segment in the translation table (*306). Although compiler 104 can atomically write a new entry point in the translation table, the interpreter 110 cannot atomically read and lock an entry point (*301, *302). The interpreter 110 has to read the entry point in one operation and lock it in another operation. This exposes a potential problem if an interpreter 110 reads an old entry point from the translation table, then compiler 104 writes a new one, and then the interpreter 110 locks the old entry point. In this case, compiler 104 assumes that the entry point is unreachable but the interpreter 110 is able to enter the segment, which is an error. To prevent this problem, the interpreter 110 checks that the translation table contains the same entry point after locking (*303). If the translation table contains the same entry point, then it is still reachable and it is safe to enter the segment. If the translation table does not contain the same entry, the interpreter 110 must release its lock and not enter the segment.

The third group of transitions is R/U to R/L and its opposite from R/L to R/U. The first one happens when an interpreter 110 reads the entry point from the translation table and locks it (*302). The second one happens when the interpreter 110 leaves a segment at its exit (*304) and goes to the unlock procedure (*305). It is important that the locking and unlocking instructions are not themselves in the segment because any time the segment is unlocked, compiler 104 may delete it (*3011).

The fourth transition is from U/L to U/U. It also happens when the interpreter 110 leaves a segment (*304) and goes to the unlock procedure (*305). After this transition occurs, the segment is unlocked and compiler 104 will pass the two tests (*309, *3010) and delete the segment (*3011).

Since the interpreter 110 can hold the lock on a segment for an arbitrary amount of time, it is inefficient to make compiler 104 wait for a lock. Therefore, compiler 104 does not try to lock entry points to prevent interpreter 110 from using them. Instead, it just makes the segment unreachable and later checks whether the lock has been released (*309). Once the lock is released, the entry point can be freed and reused.

Monitor Message Queues

The interpreter 110 send seed addresses to compiler 104. They use two message queues to send them. The first one uses the KOI system calls ScMsgSnd and ScMsgRcv to send and receive seeds. The second queue uses a shared memory area in the OOCT buffer. The shared area is called the branch_Seed_Buffer.

The reason for using two queues is that each has one advantage and one disadvantage. The KOI system call is expensive for the interpreter 110 to use so it should not be used very frequently. However, the AOI system call allows compiler 104 to block when there are no seeds to compile. This allows the KOI system to use compiler 104 CPU to do some other work. The advantage of the shared memory buffer is that it is very cheap for the interpreter 110 and the disadvantage is that compiler 104 cannot block when there are no seeds.

By using both queues, OOCT gets the advantages of both methods. When compiler 104 is idle, it calls ScMsgRcv to block. In this case, the interpreter 110 sends the next seed with a ScMsgSnd call to wake compiler 104 up. When compiler 104 is working, the interpreter 110 sends seeds through the branch_Seed_Buffer area, which is faster. After compiler 104 finishes one compilation, it checks for sch_Seed_Buffer area. If there are any then it compiles them. When it finishes the all seeds, it calls ScMsgRcv again and blocks.

V. Interpreter Modifications (Exec Unit)

The design of OOCT includes three types of modifications to interpreter 110. First, OOCT needs to be initialized by interpreter 110. Second, interpreter 110 has been modified to use branch logging. Finally, interpreter 110 has been modified to allow transitions to and from compiled code. This document will describe the details of those modifications.

The OOCT interpreter code can run in two modes, OOCT_PERFORMANCE_MODE and OOCT_DEBUG_MODE. This documentation describes all of the features of OOCT_PERFORMANCE_MODE and notes where OOCT_DEBUG_MODE is different.

Initialization

Before OOCT compiles any code or logs any branches, interpreter 110 calls OOCT_INIT to initialize the OOCT data structures. OOCT_INIT and the procedures that it calls perform the following steps.

Initialize the translation table. The MCD instruction tells OOCT the pages in the systems address space. The procedure TRANS_Execution_Init creates the first level translation table so that the entries for system pages point to second level translation table arrays. These arrays are zeroed out at initialization. See the Communications section for more details about the translation table.

Initialize branch logger 112. The procedure BRANCH_Execution_Init initializes memory in the OOCT_buffer for several data structures. First there is the branch log itself which contains profile information about branch instructions. Second there is a level-one (L1) cache which makes branch logger 112 operate faster. Third there is a seed buffer which contains seeds sent from branch logger 112 to compiler 104. Fourth there are several global functions which compiled code calls. Their addresses are stored in the OOCT_buffer during BRANCH_Execution_Init. See the above section on branch logger 112 for more information about the branch log and level-one cache.

Allocate compiler 104s stack memory. Compiler 104 uses a special large stack that is allocated in the OOCT_buffer.

1. Allocate compiler 104's zone memory. Compiler 104 uses this memory in the OOCT_buffer during compilation.
2. Allocate the compiled segment memory. The compiled code is placed in this area of the OOCT_buffer.
3. Zero out statistical information. Most information in the OOCT statistics area is reset when OOCT is initialized.

Branch Logger

Interface with Interpreter

When interpreter 110 executes a branch instruction in system code and the OOCT mode bit is set, interpreter 110 calls branch logger 112 through one of the following routines:

---

__declspec(naked) OOCT_Log_Unconditional_Fixed_Branch( )
Invoked by interpreter with a branch
Arguments:    ecx: address of branch instruction
Returns:    Does not return (acts like a jump to IC_FETCHO2)

-continued

```
__declspec(naked) OOCT_Log_Unconditional_Non_Fixed_Branch( )
Invoked by interpreter with a branch
Arguments:      ecx: address of branch instruction
                Does not return (acts like a jump to IC_FETCHO2)
__declspec(naked) OOCT_Log_Conditional_Fixed_Branch_Taken( )
Invoked by interpreter with a branch
Arguments:      ecx: address of branch instruction
Returns:        Does not return (acts like a jump to IC_FETCHO2)
__declspec(naked) OOCT_Log_Conditional_Fixed_Branch_
Not_Taken( )
Invoked by interpreter with a branch
Arguments:      ecx: address of branch instruction
Returns:        Does not return (acts like jump to IC_FETCHO2)
```

These four routines check for a compiled code entry point for the destination address and jump to the entry point if it exists. If it does not exist, then the routines update the branch log by calling branch_L1_Touch (see next section) and then jump to interpreter 110's fetch routine.

Updating Branch Log Tables

FIG. 8 illustrates a structure of a BRANCH_RECORD according to a preferred embodiment of the present invention.

The branch logging code counts how many times a branch has executed. There are two data structures that branch logger 112 uses to store the counts. First, there is the branch log, which is shared by all simulated processors in a multi-processor system. Second, there is one level-one (L1) cache for each simulated processor in the system. The branch execution counts are first written to the cache and then written to the branch log. This section describes the structure of the L1 caches and the branch log. It also describes how branch logger 112 uses them.

The information for each branch is stored in a structure called a BRANCH_RECORD. It includes the address of the branch, the destination of the branch, the fall through instruction following the branch, the approximate number of times the branch has executed and the approximate number of times the branch was taken. The last field of the BRANCH_RECORD is a pointer to another BRANCH_RECORD. It is used to connect BRANCH_RECORDs in a linked list.

The hash table is organized as an array of linked lists.

FIG. 9 illustrates the structure of the branch log. It is a large hash table that stores BRANCH_RECORDs. Each interpreter 110 has its own copy of the variable local_branch_header_table, but they all point to the same array in the OOCT buffer area. The elements of the local_branch_header_table are pointers to lists of BRANCH_RECORDs. The procedure for finding a BRANCH_RECORD for a branch has 3 steps.

1. Hash the destination address. (index=BRANCH_HASH(destination_address) % BRANCH_TABLE_SIZE.)
2. Get the head of the list. (list=local_branch_header_table[index].)
3. Walk down the list until you find a record with the same branch address. (while (list->branch_address!=branch_address) list=list->next.)

FIG. 9 particularly illustrates that the variable local_branch_header_table is an array of pointers to lists. Each list contains BRANCH_RECORDs that have the same destination address. When there is no list, the pointer in local_branch_header_table is NULL.

The branch log contains all of the information about branches, but it has two problems. First, looking up and inserting BRANCH_RECORDs are slow operations. They are too slow to do every time interpreter 110 logs a branch. Second, every interpreter 110 uses the same branch log. In order to keep the lists of BRANCH_RECORDs consistent, only one Exec can access the branch log at one time. This slows down the multi-processor system even more than the single processor system. In order to fix these problems, there is an L1 cache for each interpreter 110. The L1 cache can be accessed quickly and the interpreter 110 can access their L1 caches in parallel. Each L1 cache is a 2-dimensional array of BRANCH_L1_RECORD structures. The base address of the array is stored in the variable branch_L1_table.

FIG. 10 illustrates the structure of the L1 cache. The cache is a 2-dimensional array of BRANCH_L1_RECORDs. The first dimension is BRANCH_L1_SETS (currently 32) and the second dimension is BRANCH_L1_SETSIZE (currently 4.) Each row of the array is one set. The same branch instruction always uses the same set of the cache, but it can be at different places.

As illustrated in FIG. 10, the L1 cache is organized into sets. The set number for a branch is equal to (branch_address+branch_destination) % BRANCH_L1_SETS. The 4 members of the set hold the 4 most recent branches with the same set number. This is called 4-way set associativity. It improves the performance of the cache when there are several branches executed at almost the same time that have the same set number.

Figure 11:
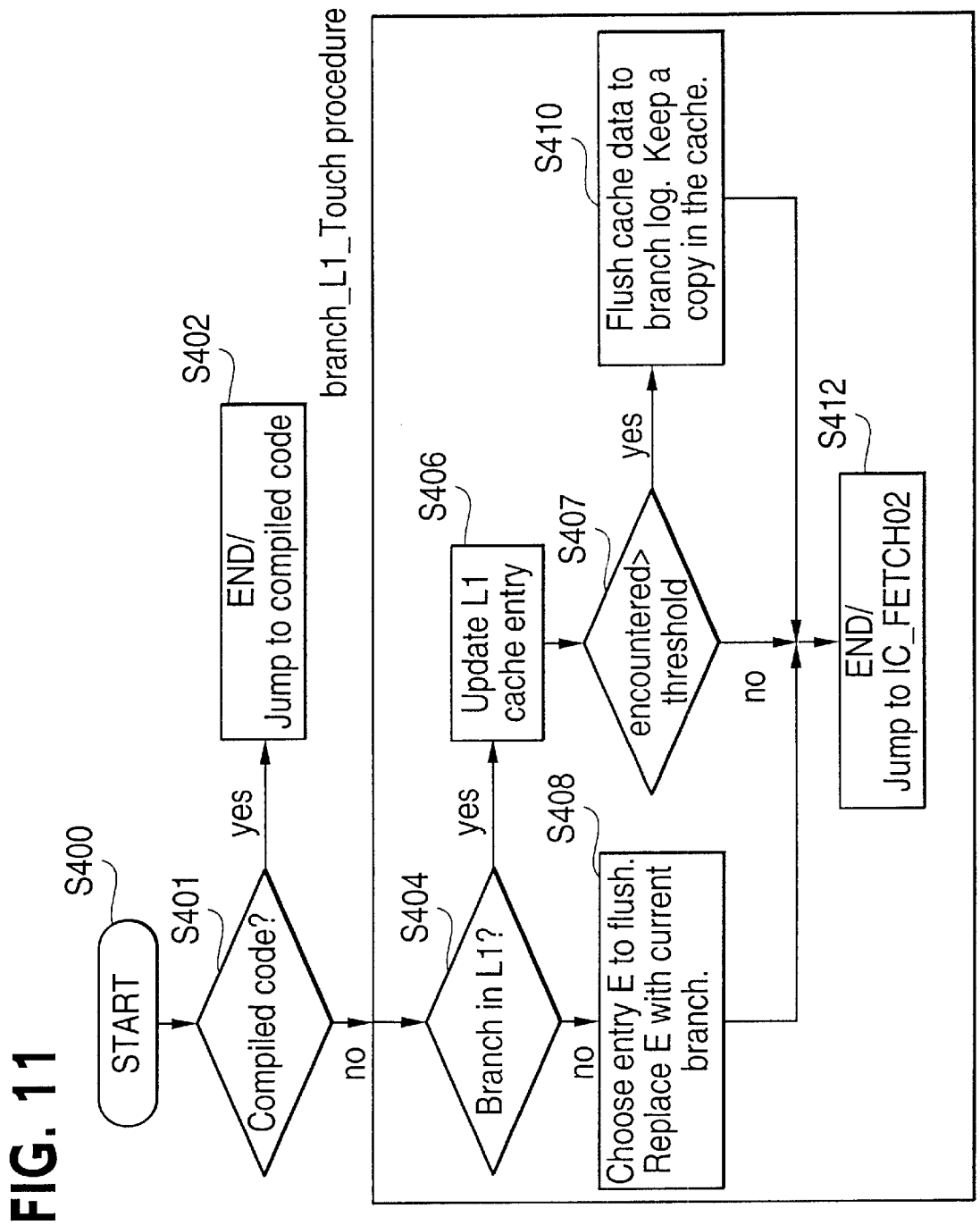
FIG. 11 is a schematic diagram illustrating a method for executing operation of the L1 cache by an interpreter.

FIG. 11 illustrates a method for executing operation of the L1 cache by the interpreter 110 according to an embodiment of the present invention. In other words, FIG. 11 illustrates a branch logging method by using the L1 cache.

The optimizing object code translation method utilizes two forms of memory to record non-compiled branches, namely 1. a branch log having a dynamically changing size in proportion to the number of recorded branches, and
2. a branch cache, entitled an L1 cache, in which a limited number of non-compiled recorded branches are stored according to an order which enhances access.

The branch log and the L1 cache represent virtual memory locations which are managed by an operating system. Thus, the term "L1 cache" is arbitrarily given to the cache for storing non-compiled branches and should not be confused with the 'L1 cache' which is generally found on a processor such as the Pentium Pro.

The optimizing object code translator according to the present invention provides that interpreter 110 may call a plurality of different branch logging routines. However, each branch logging routine itself calls a subroutine which decides to jump to compiled code or to log a branch instruction. This subroutine is particularly illustrated in FIG. 11.

In view of the above, to execute the branch logging method with the L1 cache, the method is first started in step S400. In step S401, the interpreter 110 first checks for a compiled code entry point for the branch destination (i.e. whether the segment at issue has been previously compiled). If there is an entry point, i.e. "yes," then there is a compiled segment and flow jumps to step S402 for immediate execution of the compiled code segment. Execution then proceeds with the compiled code segment until an end flag is reached, and flow then returns for execution of the next segment. Of course, the branch is not recorded in the branch log because the branch has already been compiled.

If there is no entry point in step S401, i.e. "no", then there is no compiled code corresponding to the branch instruction. Flow then proceeds to step S404 and the interpreter 110 looks into the L1 cache to determine if there is a possible match between the branch and the plurality of branches stored in the L1 cache.

Step S404 determines if there is a match between the branch and the plurality of branches stored in the L1 cache. The L1 cache is divided into a plurality of sets with each set being designated by a unique set number. According to an embodiment of the present invention, each set is contains four branches.

Step S404 first determines a cache set number "S" corresponding to the current branch address, with S=(branch_address+branch_destination) % BRANCH_L1_SETS. Next, each element of the branch_L1_table[S] is sequentially checked against the current branch address and destination. If a match is detected, i.e. "yes", then flow proceeds to step S406 and the fields "encountered_sub_count" (a field which designates how many times the branch was encountered) and "taken_sub_count" (a field which designates how many times the branch was taken) are updated. Flow then proceeds to step S407.

In step S407 it is determined if the current branch address has been encountered greater than a predetermined threshold number. The preferred threshold value is on the order of 1000 hits. Thus, the field encountered_sub_count is compared with the threshold value in step S407. If the threshold value is exceeded, i.e. "yes", then flow proceeds to step S410 and the cached information for this branch is written back to the branch log. On the other hand, if the threshold value is not exceeded, i.e. "no" then flow proceeds to step S412. Step S412 is an end of the current subroutine which jumps to IC-FETCHO2, i.e. the entry point of the interpreter 110.

If the correct branch is not in the cache, i.e. "no" in step S404, then flow proceeds to step S408 and one BRANCH_L1_RECORD (i.e. the record containing all fields which may be updated, such as encountered_sub_count and taken_sub_count) in the set designated by "S" above is removed from the L1 cache and written to the branch log. Next, the current branch information is written into the set designated by "S". Moreover, during writing of the current branch record into the set "S", the current branch record is placed as the first element of the set. This is because the same branch will very likely be executed again, thereby increasing performance and efficiency of the system. In other words sets S404 will be executed faster. Even when the branch is in the cache, i.e. "yes", it may be copied to the branch log if it has been executed a large number of times since it was last flushed.

When the L1 cache is used, the sequence of steps is almost always S400, S404, S406, S407, and S412. Accordingly, the present invention seeks to make those steps as fast as possible. When the current branch information is put in the first element of the set, the branch information makes step S404 faster because the interpreter 110 is likely to execute the same branch again.

The branch logging method set forth above reduces a burden on the processor by executing code which has been previously compiled and enhancing access to often called branch instructions which have not yet reached the threshold level for compilation. In this regard, the main purpose of OOCT is to make step S400 take the "yes" branch almost every time. If a branch is executed frequently, then there should be a compiled code segment for its destination.

A secondary goal is to make the "no" path following step S401 faster, so that branches which have not yet been compiled will not appreciably slow down program execution. The slowest part of the "no" path is referred to as "flush." In both steps S408 and S410, branch information is "flushed" from the L1 cache and written to the branch log. It become necessary to flush a branch's information in order to send a seed to the compiler, which will cause compiled code to be generated and cause step S400 to answer "yes" for this branch in the future.

However, it is not necessary to flush the branch's information every time a non-compiled branch address is executed. Flushing every 100 executions or less is often O.K. Therefore, the present invention seeks to increase the speed of steps S400, S404, S406, S407, and S412, which include no flushes. Thus, the faster path is always taken unless one of two things happen. In step S404, it is possible for the branch information not to be found in the set, so we take the "no" path to S408. In step S407, if the branch was executed more than the "threshold" number of times, it will take the "yes" path to S410 which also includes a flush.

In OOCT_DEBUG_MODE, the L1 cache method is still used, but the threshold for flushing the cache is set to 1, so the information is written to the branch log on every branch execution. This makes the OOCT_DEBUG_MODE much slower.

Seed Selection

When a branch instruction is executed very frequently, branch logger 112 sends its destination address to compiler 104. This address is called a 'seed' and choosing seeds is a very important part of the OOCT system.

Seeds should be addresses that are at the beginning of a procedure or at the head of a loop. Therefore, branch logger 112 only sends seeds that are the destination of an unconditional branch. Seeds should be addresses that are executed frequently, so a branch destination becomes a seed only when its encountered_count field is greater than a threshold. The threshold is stored in the OOCT buffer in the field named seed_production_threshold. The threshold can change over time, which is described in the next section.

Threshold Setting

There are two bad things about using a fixed threshold to decide whether to send a seed. First, the threshold might be too high while compiler 104 is idle. In this case, there is useful work for compiler 104 to do, but branch logger 112 does not tell compiler 104 what to do. Second, the threshold might be too low while the message queue is full. In this case, branch logger 112 will try to send a seed even though the seed will not fit in the queue, which is a waste of time.

Fortunately, it is possible to detect the two situations, when compiler 104 is idle and when the message queue is full, and change the threshold. Branch logger 112 detects that compiler 104 is idle in the procedure branch_Update_Entry by reading the OOCT buffer field named num_monitor_seed_messages. If this field is 0, then compiler 104 has finished all of the seeds that were sent. The threshold is too high, so branch logger 112 lowers it. Branch logger 112 detects a full message queue in the procedure branch_Send_Seed when it tries to send a seed and gets an error code indicating that the message was not sent. The threshold is too low, so branch logger 112 raises it.

In OOCT_DEBUG_MODE, the threshold never changes. Its value is set to the third argument of the OOCT_INIT procedure in this case.

Handling Multitasking

OOCT runs on a multiprocessor system with multiple interpreter 110. These tasks have individual branch L1 caches, but they use the same branch log table. When branch information is flushed from the L1 cache to the branch log table, the interpreter 110 acquires a log on the table so that it will not conflict with any other Exec. There are two possible ways to handle contention for the branch log lock.

The first is to make an interpreter 110 wait until the lock is available and then get the lock and write its branch information. This makes the interpreter 110 run more slowly but makes the branch log more accurate. The second is to give up without writing the branch information if the interpreter 110 cannot get the lock. This way makes the interpreter 110 faster but loses some branch logging information. OOCT uses the second way because the speed of interpreter 110 is more important than the accuracy of the branch log. The branch log information only needs to be approximately correct for the system to function well.

When OOCT is running with multiple interpreter 110, one of the tasks is the special master task that calls OOCT_INIT to initialize the OOCT buffer and the branch logging data structures. The other tasks are slave tasks that only have to initialize some local variables and their branch L1 caches. The slave tasks call SlaveOOCT_Init after the master task has finished initializing the OOCT_buffer. The synchronization between master and slave tasks uses the following methods.

Master Method

1. Execute the MCD instruction to turn OOCT on.
2. Call OOCT_INIT, which initializes the OOCT buffer and branch logging data structures.
3. Wake up slave tasks.
4. Jump to interpreter.

Slave Method

1. Go to sleep. Wake up when master task executes (step 3 above).
2. Call SlaveOOCT_Init, which initializes the task's individual branch L1 cache.
3. Jump to interpreter.

User/System Space Transitions

The OOCT system only compiles instructions from the system pages of the ASP address space. It ignores the user pages. The OOCTSTS bit of interpreter 110's individual area controls whether branch logger 112 is called or not. This bit is primarily controlled by the two macros NEXT_CO and NEXT_OUN. However, there is one case where the OOCT code has to set this bit. When a compiled code segment ends with a non-fixed branch instruction, it may cause the PSW_IA to move from system space to user space, which requires setting OOCTSTS to 0. So a compiled code segment that ends with a non-fixed branch jumps to the routine branch_Exit_Log which checks the destination address and sets the OOCTSTS bit correctly.

Compiled Code Interface

Transition to/from Compiled Code

Interpreter 110 transfers execution to compiled code when interpreter 110 calls a branch logging routine and it finds a compiled code segment for the branch destination (see FIG. 11.) When segment locking is turned off, interpreter 110 jumps directly to the entry point. When segment locking is turned on, interpreter 110 must attempt to lock the segment before jumping to the entry point. If it locks the segment, then it jumps to the entry point. If it fails to lock the segment, then it jumps back to interpreter 110.

There are several ways for execution to leave a compiled code segment, which are described in Table 4. In all cases, when control jumps back to interpreter 110, the ESI and EDI registers have correct values and the individual area of interpreter 110 has perfect K status.

TABLE 4

How control leaves a compiled code segment.

| Final K opcode | What the compiled code segment. |
|---|---|
| Fixed branch or straight-line K opcode | Tests if the destination address has a compiled entry point. If it does, then it makes an intersegment jump to the entry point. If it does not, then control is passed back to interpreter 110 at IC_FETCHO2, or to branch_Exit when segment locking is on. |
| Non-fixed branch | Jumps to branch_Exit_Log which sets the OOCTSTS bit and then invokes branch logger 112 if the PSW_IA is still in a system page. |
| LPSW, SSM, STNSM, MCD, | Without segment locking: Jumps to IC_FETCHO2 to execute the opcode |
| CALL, RRTN, SVC, MC, BPC, LINK, LINKD, LOAD, LOADD, DELT, DELTD, FBFCC | With segment locking: Jumps to branch_Exit_Interpret. |
| SAM opcode that switches to RISC mode | Without segment locking: Jumps to IC_FETCHO2 to execute SAM opcode |
| | With segment locking: Jumps to branch_Exit_Interpret. |

When segment locking is on, the interpreter 110 will be holding a lock on the compiled code segment while it is executing that code. It must release this lock after it leaves the segment, so the compiled code calls some procedures in branch logger 112 which release the lock and then jump to interpreter 110.

Interrupts

There are several interrupts that can occur while compiled code is executing, such as IO interrupts or MCHK interrupts. The compiled code checks the INTINF field of the individual area to detect whether an interrupt has occurred. It checks this field inside of any possibly infinite loop, which ensures that it does not ignore the interrupt forever. If an interrupt does occur, the compiled code calls interpreter 110 routine IU_OINTCHK with perfect K status. It expects that interpreter 110 will return to the compiled code.

Interpreted Callbacks

Some K opcodes are not translated by OOCT. Instead the compiled code calls interpreter 110 subroutine IC_OOCT to interpret the opcode and return back to the compiled code. The compiled code makes sure that the ESI and EDI registers have the correct values and that the individual area has perfect K status before calling IC_OOCT.

If interpreter 110 detects an error while executing the IC_OOCT subroutine, it calls the procedure OOCT_EXCP and does not return to the compiled code. If segment locking is turned on, then OOCT_EXCP releases the segment lock.

Exceptions

When a translated opcode has an unmasked exception, such as an operation exception or a zero divisor exception, the compiled code calls an interpreter subroutine IC_PGMxx, where the xx is the error code number between 01 h and 21 h. Interpreter 110 tries to handle the exception and return. When interpreter 110 cannot return, it calls OOCT_EXCP, which releases any segment lock.

Use of Global Functions

Some K opcodes, such as character processing operations, translate into a large number of target opcodes. Making multiple translations of these opcodes would use too much of the segment memory re subroutines called global functions which the compiled code calls to execute these opcodes. These global functions are just like interpreter 110 routines that execute K opcodes, except that they are specially written to be called from compiled code and return to compiled code. There are global functions for five opcodes, SBE, CC, MV, TS and C. Experiments show that the global functions are much faster than calling the IC_OOCT entry point of interpreter 110 and they use much less memory than compiling the opcode into target instructions multiple times.

VI. Compiler

Overview

Before delving into the details of compilation, it is important to understand at a high level the main purpose of compiler 104 and to understand the structure of compiler 104. The purpose of compiler 104 is to translate heavily executed portions of the currently executing program into optimized target code and to make this code available to interpreter 110 for execution.

Figure 12:
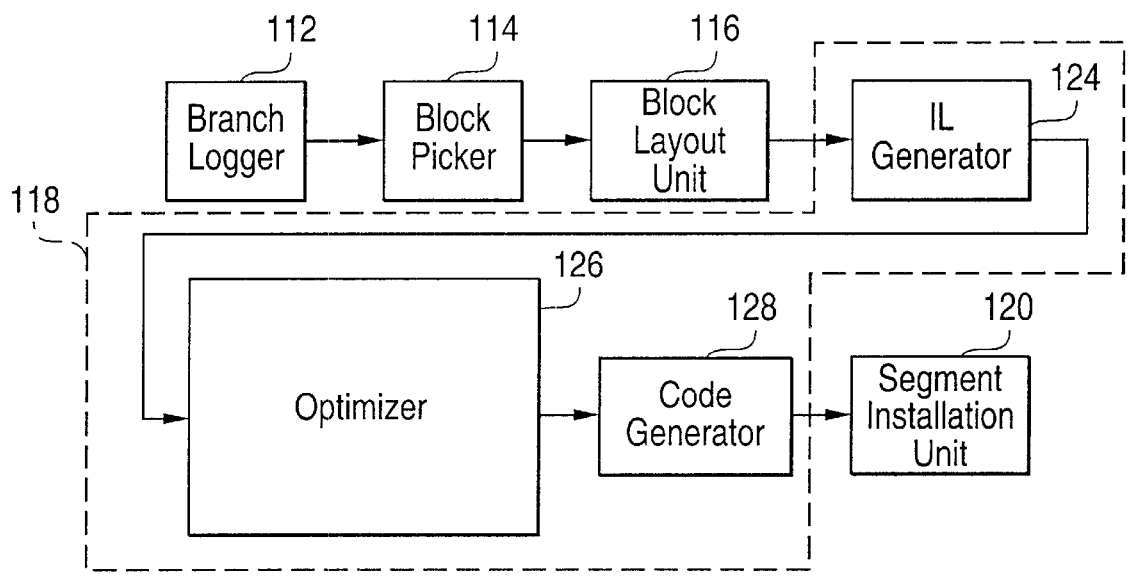
FIG. 12 is a schematic diagram illustrating an overall structure of a compiler according to an embodiment of the present invention.

FIG. 12 particularly illustrates an overall structure of compiler 104. Compiler 104 receives seeds from the branch logger 112 (discussed above) which start the compilation process. The seed is the address of a original instruction that has been the target of a large number of branches in the currently executing program. This is intended to give a starting point for finding a heavily executed portion of the currently executing program. The block picker 114 uses this seed along with other information provided by branch logger 112 to pick sections of the program that should be compiled.

Once the original code to be compiled has been chosen it goes through three major stages. The first stage is to convert the K opcodes into an intermediate language (IL) which used by the rest of compiler 104. The intermediate language is generated by IL generator 124. The second stage performs various analyses and optimizing transformations on the IL by way of optimization set forth above and designated for reference as optimizer 126. The final stage converts the IL into relocatable machine code and is designated as optimizing code generation unit 118.

The final job of compiler 104 is to make the optimized code available to interpreter 110. A segment data structure is then created with a copy of the optimized code by way of segment installation unit. The segment is then installed into a shared area within the OOCT buffer (not shown). The translation table is finally updated so that any branches by interpreter 110 to the compiled K code will use the new target code instead.

The rest of this section will discuss in detail each of the above compiler 104 stages. A number of other miscellaneous implementation details will also be discussed at the end of the section.

Block Picking

Compiler 104 receives a single seed address to start compilation. Beginning at the seed, it reads original instructions until it has read something like a procedure body. Then it passes this set of original instructions to the next compiler 104 stage, IL generation. The units of instructions that compiler 104 reads are called basic blocks, so this stage is called a block picker, i.e. block picker 114.

A basic block is a sequence of instructions where control can only enter at the first instruction and can only exit at the last instruction. This means that only the first instruction can be the target of a branch and only the last instruction can be a branch instruction. It also means that if the first instruction of the block is executed then all of the instructions will be executed.

Block Picker

Figure 13:
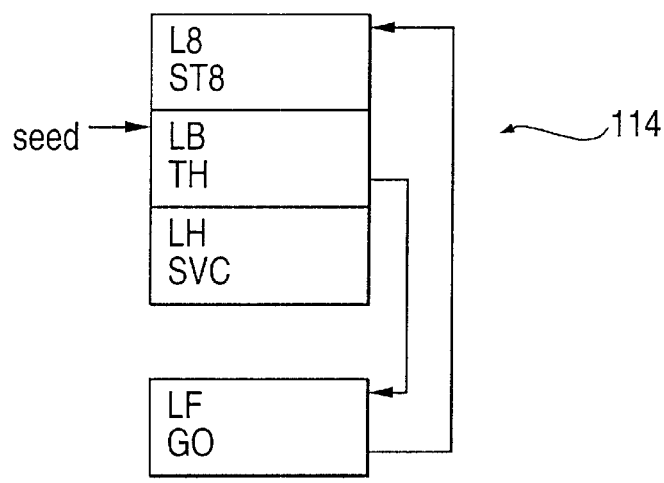
FIG. 13 is a schematic diagram illustrating an example of block picker according to an embodiment of the present invention.

FIG. 13 illustrates an example of block picker 114 according to an embodiment of the present invention. The procedure OOCT_ParseFrom implements the block picker 114. It reads one basic block at a time. A basic block ends for one of five reasons.

1. If the parser reads a branch instruction, then the block ends with the branch.
2. If the next instruction was already parsed, then the block ends with the current instruction, because each K opcode should only appear one time in one segment.
3. If the next instruction is a join point, then the block ends with the current instruction because join points have to be at the beginning of a basic block.
4. If the current instruction is a factor on and it could be followed by data instead of instructions, then the block ends with the current instruction.
5. If the current instruction is an illegal instruction, then the block ends with the current instruction.

After reading each block, block picker 114 decides what action to take next, depending on the way the block ended. The possible actions are illustrated in Table 5.

TABLE 5

Action after reading a block.

| End of current block | Block picker 114 action |
| --- | --- |
| Conditional branch | Continue parsing at the fall through instruction and the branch destination instruction. |
| Unconditional fixed branch | Continue parsing at the branch destination instruction. |
| Non-fixed branch | Stop parsing because branch destination is unknown. |
| Factor of end instruction or Illegal instruction | Stop parsing because the next byte might not be an instruction. |
| Other instructions | Continue parsing at the fall through instruction. |

An example is illustrated in FIG. 13. Block picker 114 begins at the seed instruction, which is an LB instruction. Since that is not a branch or factor of end instruction, it continues to the next instruction. That one is a TH instruction, which is a conditional branch. Block picker 114 stops reading the current block because of the conditional branch. It continues reading new blocks at both the LH and LF instructions. When it reads the SVC instruction, block picker 114 ends that block because SVC is a factor of end instruction. When it reads the GO instruction, block picker 114 ends that block because GO is a branch instruction. It continues reading at the L8 instruction because it is a branch destination. After it reads the ST8 instruction, block picker 114 ends the block because it has already read the next instruction.

There is an upper limit on the number of instructions that block picker 114 will read. The purpose of the limit is to prevent compiler 104 from running out of memory while compiling the source instructions. The limit is set by the constant MAX_KINST_NUM in OOCT_trace.c and it is currently 500.

Block picker 114 can cause a page fault when it tries to read an instruction. If it gets a page fault, block picker 114 stops reading the current block but continues reading from any branch destinations that it has not tried yet. This allows compiler 104 to create a segment even if it cannot parse all of the instructions that can be reached from a seed.

Block Layout

After choosing the basic blocks to be block picker calls the procedure OOCT_GenerateIL to create the IL instructions that the rest of compiler 104 will use. At this time, it is possible to rearrange the order of blocks. This is called block layout and it helps compiler 104 produce better code for the Pentium Pro processor because the Pentium Pro runs faster if forward conditional branches are not taken.

Consider the example in FIG. 13. It has one conditional branch, the TH instruction. In the original instructions, the fall through basic block is the one beginning with LH and the destination block is the one beginning with LF. If the conditional branch is taken 75% of the time, then it will run faster if the LF basic block is put in the fall through position and the LH basic block in the branch taken position.

The OOCT_GenerateIL procedure lays out blocks according to the information in the branch log. It places the most common successors of conditional branches in the fall through position whenever it can. This procedure produces a list of IL instructions that are passed to the optimization phases of compiler 104.

Intermediate Language (IL) Generation

The section will discuss the process of generating compiler 104's intermediate language (IL) representation for the K opcodes. Before directly discussing how the IL is generated, an overview of the IL is given and data structures that are important to understand are described.

IL Overview

The main analysis and transformation passes of compiler 104 operate on an intermediate language that is a special machine independent instruction set. Using an intermediate language is a standard compiler 104 technique for two main reasons. First, an IL typically has an architecture that simplifies analysis and transformations. Second, an IL allows many different source languages to use the same optimization and code generation stages and eases retargeting to different platforms.

The IL used by OOCT (referred to as just the IL from here on) is currently composed of 40 different opcodes listed in Table 6. The instructions fall into three main categories. First, there are functional opcodes such as ADD and LOAD that have a straightforward mapping to standard machine opcodes. Second, there are opcodes that handle control flow such as LABEL and CGOTO. Finally, there are a number of special opcodes that are used as special markers by compiler 104, which do not directly correspond to code that is generated by the back end. These special marker opcodes are described in a separate section. Since the IL represents a virtual machine, it is straightforward to add other opcodes to the IL if further functionality is required.

The IL is composed of instructions, each of which specifies one of the opcodes, a type, and a number of pseudoregister arguments. The types supported by compiler 104 are signed and unsigned 8 bit, 16 bit and 32 bit values. Aside from immediate values used by the SET opcode and values loaded from memory with the LOAD opcode, all arguments are passed with pseudoregisters. Pseudoregisters are simply the IL virtual machine's registers. Compiler 104 allows an arbitrary number of pseudoregisters, each of which has a predefined size (e.g. 16 bits). Each pseudoregister directly corresponds to a specified memory location. For OOCT, these memory locations are in the OOCT specific parts of the individual area. This mapping of pseudoregisters to memory locations gives two benefits. First, it streamlines the IL. The IL operations to load commonly used values into temporaries and store them back to memory are not needed. Second, compiler 104 is often able to allocate commonly used values into machine registers, eliminating redundant loads or stores.

TABLE 6

IL Opcodes

| OPCODE | DESCRIPTION |
|---|---|
| LABEL | Marks a place in the flow graph which could be the target of jump operations |
| GOTO | A jump to a label |

TABLE 6-continued

IL Opcodes

| OPCODE | DESCRIPTION |
|---|---|
| CGOTO | A conditional jump to a label based on the boolean value of a pseudoregister |
| IGOTO | An indirect jump to an address determined by the value of a pseudoregister |
| SET | Puts an immediate value into a pseudoregister |
| ASSIGN | Moves the value in one pseudoregister into another pseudoregister |
| OASSIGN | A special marker instruction that shows where pseudo-registers overlap, to make aliasing explicit |
| CVT | Convert a pseudoregister from one type to another (e.g. sign extension, zero extension) |
| NEG, CMPL, BSWAP | Unary negation, logical complement, byte-swap |
| ADD, SUB, MUL, DIV, REM | Binary add, subtract, multiplication, divide, remainder |
| ASL, ASR | Arithmetic shift left, right |
| LSR | Logical shift right |
| BAND, BOR, BXOR | Binary logical and, or, xor |
| EQ, NE, LT, LE, GT, GE | Compares two input operands and sets output operand to true if op1 == op2, op1 != op2, op1 < op2, op1 <= op2, op1 > op2, op1 >= op2 |
| TESTZ, TBSTNZ | Compares two input operands and sets output operand to true if (op1 & op2) = = 0, (op1 & op2) ! = 0 |
| CMP | Compares two input operands and sets output operand to −1 if op1 < op2, to 0 if op1 == op2 and to 1 if op1 > op2. This is not currently used by OOCT |
| LOAD | Load a pseudoregister with a value from a specified memory location |
| STORE | Store the value of a pseudoregister to a specified memory location |
| GCALL | Performs a function call to one of a set of predetermined global functions |
| ICALL | Performs an indirect function call, similar to IGOTO |
| EXIT | Exit the compiled block. This is not currently used by OOCT |
| ENTRY | Marks a point where control can enter the flow graph |
| SYNC | Marks the points where a set of pseudoregisters are flushed to memory |
| EXTMOD | Marks a pseudoregister as externally modified. This is used to handle modification of pseudoregisters by function calls |
| SBTCC | Sets a boolean to the value of a condition code based upon an operation. This is used to represent places where flags are used. Currently, all SETCC operations are folded into the successor so they are not emitted, but the use of SETCC makes the flow of the value of the condition code explicit without requiring compiler 104 to represent multiple destinations for a single IL operation. |

Special IL OPCodes

The OOCT IL contains a few opcodes that have special purposes. Most IL opcodes correspond to code that is generated in the back end. Instead, these special instructions act as sign posts to compiler 104 that something special is happening. The IL contains the following special opcodes: ENTRY, SYNC, EXTMOD, and OASSIGN. This section discusses the first three of these opcodes. OASSIGNs are fully set forth above.

The ENTRY opcode marks a point where control can enter the flow graph. The code generated by OOCT may have multiple external entry points that represent external join points. Each of the external entries has a corresponding ENTRY IL instruction. The ENTRY instructions occur at the end of the code and are immediately followed by a GOTO instruction that jumps to a label within the main body of code. The reason that an entry is used instead of having the external entry jump directly to the label is to allow the code generator to insert fills between the ENTRY and the jump to the label.

FIG. 14 illustrates an outline of code with two external entry points where a fill was inserted between the ENTRY instruction and the GOTO instruction. In other words, FIG. 14 particularly illustrates an entry example according to an embodiment of the present invention.

The SYNC opcode is used to guarantee that a range of pseudoregisters is flushed to memory. In particular, OOCT uses the SYNC opcode to guarantee that all the K registers are in the memory locations where interpreter 110 expects to find them. The SYNC acts as a directive to the register allocator, indicating that a pseudoregister that is in a machine register that has been modified should be spilled. A SYNC also acts as a use of any live data, which prevents compiler 104 from dead code eliminating code that only has the effect of modifying K registers.

The EXTMOD opcode is used to indicate that a pseudoregister is modified, but that compiler 104 does not have the details of how the register has been modified. Thus, the EXTMOD has two effects. First, it acts as a barrier to optimizations such as constant folding or copy propagation. Second, it forces compiler 104's register allocator to insert a fill before the next use of the pseudoregister. In OOCT, EXTMOD instructions are used after a call back to interpreter 110 to indicate which K registers may have been modified.

IL Data Structures

Before discussing how the IL is built from the K opcodes, it is useful to have familiarity with the main data structures used in compiler 104.

ZONE (compiler/zone.[h,c])

Memory allocation in compiler 104 is handled with an abstraction called a ZONE. The ZONE abstraction is an efficient way of allocating memory such that it can be released all at once. With the ZONE abstraction, allocation is fast and the programmer does not have to worry about memory leaks since destroying the ZONE will reclaim all the memory used.2

In compiler 104, a ZONE is created, and all calls that allocate memory (i.e. what would normally be malloc calls) call ZONE_Alloc with the initially created ZONE. When compiler 104 is done, it calls ZONE_Destroy which de-allocates the entire ZONE (i.e. does the equivalent of a free for all the memory).

The underlying implementation of ZONE uses 'chunks' of memory. For example, when the ZONE is created, it might 'malloc' a block of size 0x2000 bytes. Calls to ZONE_Alloc will use that 'chunk' of memory until it is used up. When there is not room to service a ZONE_Alloc request from the initial 0x2000 bytes, a new 'chunk' is created. Further ZONE_Alloc calls will use that 'chunk' until it is also used up.

In compiler 104, things are complicated a little bit by the fact that memory is all pre-allocated, and thus malloc can not be called. Instead, a special ZONE allocator unit (the ZALLOC unit) is used. The ZONE allocator is initialized with a large pool of memory (0x10000 bytes for example). It divides the memory into chunks of the same size that the ZONE will use for allocation, and keeps a list of free chunks. Thus, the 'malloc' requests are replaced by a call to ZALLOC_get_chunk that gives back a free 'chunk' of memory. Similarly, the calls to 'free' in the ZONE_Destroy are replaced with calls to ZALLOC_free_chunk. In the current implementation, the maximum allocation size that can be handled by ZONE_Alloc is the initial chunk size.

This limitation could be 'fixed' by changing the ZALLOC unit to handle variable size allocations instead of simply handling one size (see the Segment Allocation unit for an example of this type of allocator). There are two reasons that this was not done here. First, a variable size allocator is much more complex and creates problems such as fragmentation. Second, the chunk size can be made very large with little to no penalty. When the chunk size is sufficiently large, compiler 104 will only request a single allocation larger than the chunk size if compiler 104 would have run out of memory any way. Thus, there is no real advantage to generalizing the ZALLOC unit to handle variable sized allocation.

IL_CTXT (compiler/oc_common/include/il_internal.h)

Compiler 104 maintains a single data structure, the IL_CTXT, to keep track of the current state of the compilation. The IL_CTXT data structure stores a pointer to a linked list of IL_NODEs that represent the code currently being compiled. The IL_CTXT also stores a number of miscellaneous fields that are used throughout the compilation process such as the ZONE and IL_FRAME structure being used. Each of the stages of compiler 104 has the IL_CTXT as an argument and makes modifications to that data structure, for example, a number of the stages add or remove IL_NODEs.

IL_NODE (compiler/oc_common/include/il_internal.h)

The IL_NODE data structure represents a single abstract instruction in compiler 104's intermediate language, as translated from a K opcode.

The IL_NODEs that are generated from the K opcodes are maintained in a doubly-linked list. Pointers to the first and last elements in this list are maintained in the IL_CTXT. This list represents the code currently being worked on by compiler 104. Each pass of compiler 104 traverses this list and either generates information about the code in the list or transforms the list.

Each IL_NODE contains an operation field 'op' which indicates the basic nature of the instruction. It also contains a vector of operand fields representing the operands of the instruction. The interpretation of the operand fields is dependent on the operation type of the instruction. In addition to the operation and optrand fields, all IL_NODEs contain a number of fields that are shared by all node types, such as the K pc of the instruction from which the node was translated, the starting address of the target machine code generated for the node, etc.

The number of operand fields in a node varies according to the operation type. In fact, in some cases two nodes of the same type may have different numbers of operands; the number of operands for a call operation, for example, will depend on the number of arguments passed to the target method. This variation in the number of operands means that IL_NODEs are not of a consistent size, and that the operand vector is the last item in the IL_NODE structure. The operand vector is declared to be one entry long, and IL_NODEs are allocated by calculating/allocating the total amount storage necessary for the common fields and the operand fields and by casting the allocated memory to an IL_NODE pointer.

In most, but not all, cases each operand actually requires two consecutive entries in the operand vector. The entry operand[i] of the pseudo-register in which the operand will be found. If the operand is a destination operand, operand[i+1] will point to a list of nodes that use the value that is being defined by this operation; if the operand is a source operand, operand[I+1] will point to a list of nodes containing definitions for the value.

If an operation has a destination operand, that operand will always be stored in operand[0] and operand[1].

If operand[i] is a source (input or use) operand, then operand[i+2] will be also; i.e., all source registers must come at the end of the list of operands.

Operand fields in a node acre never accessed directly. Rather, access is by a large set of macros of the form ILOP_xxx(N), where N is a pointer to an IL_NODE. These macros which know how various operands are stored in the operands vector for all the it various instruction types.

Some of the node types are as follows (this list is not all-inclusive):

Unary operations

These represent a variety of simple unary (1 source operand) instructions including assignment.

type
   the type of the operation

ILOP_DEST(N)
   destination register; where the result goes

ILOP_DEST_use(N)
   list of instructions that use the destination register

ILOP_SRC(N)
   source register

ILOP_SRC_def(N)
   list of instructions that define the source

Binary Operations

A large number of binary (2 source operand) instructions are represented by this category.

type
   the type of the operation

ILOP_DEST(N)
   destination register; where the result goes

ILOP_DEST_use(N)
   list of instructions that use the destination register

ILOP_SRC1(N)
   first source register

ILOP_SRC1_def(N)
   list of instructions that define the first source

ILOP_SRC2(N)
   second source register

ILOP_SRC2_def(N)
   list of instructions that define the second source

ILOP_DIVEX(N)
   this operand appears only for the DIV and REM operations, and point to a (singleton) list containing the node that represents the start of the divide by zero exception if there is one.

Label

A LABEL instruction represents a point in the code where branches can branch to. It contains the following operands:

ILOP_LABEL(N)
   a unique integer identifying the label

ILOP_LABEL_refs(N)
   a list of instructions that refer to this label

ILOP_LABEL_live(N)
   a BITSET showing which registers are live at this label

ILOP_LABEL_rd(N)
   a vector of lists of the definitions of each register that reaches this label ILOP_LABEL_misc(N)
   a place for any pass to hang private info about the label Goto A GOTO instruction represents an unconditional branch to a label.

ILOP_LABEL(N)
   unique integer identifying the target label

ILOP_LABEL_refs(N)
   a singleton-list of the target LABEL instruction

CGoto

A CGOTO instruction represents a conditional branch to a label. It contains the same operands as a GOTO instruction as well as some additional operands.

ILOP_COND(N)
   register containing the condition on which to branch. This register must contain a boolean (B1) type value. The branch will be taken if the condition is TRUE.

ILOP_COND_def(N)
   list of instructions that define this register

ILOP_COND_live(N)
   a BITSET showing which regs are live if the branch is not taken.

In addition to the instruction-specific ILOP macros, there are a number of generic macros that can be used on any instruction ILOP_HasDEST
   Returns TRUE if the instruction has a destination register. In this case, the ILOP_DEST and ILOP_DEST_use macros can be used on this instruction.

IL_OP_START, IL_OP_DONE, IL_OP_NEXT
   Used to iterate through the source registers of an instruction.

IL_OP_START returns an IL_OP_INDEX referring to the first such source register. IL_OP_DONE tests an IL_OP_INDEX to see if it refers to a source register; it returns true if it does not. IL_OP_NEXT is used to go on to the next source register IL_OP, IL_OP_def
   These return the particular source register and the definition list for it for a given IL_OP_INDEX. These 5 macros are generally used in a loop of the form: for (op=IL_OP_START(n); !IL_OP_DONE(n,op); op=IL_OP_NEXT(n, op)) {use IL_OP(n, IL_FRAME (compiler/oc_common/include/il_frame.h, compiler/OOCT_Frame.c)

The IL_FRAME data structure is used to give information about the context in which the compiled code will run. The frame defines the size and memory location for each of the pseudoregisters, how the pseudoregisters overlap with other pseudoregisters and which machine registers are legal to use in the register allocator. Additionally, the IL_FRAME structure defines whether or not a C stack frame is required for the code being compiled. In OOCT, C stack frames are not used.

In compiler 104, the IL_FRAME structure is initialized by the functions in OOCT_Frame.c. These functions setup each of the pseudoregisters that correspond to the K registers and PSW locations. Additionally, compiler 104's temporary pseudoregisters are set to correspond to interpreter 110's work space area. Information about how the K registers overlap is also setup.

NL_LIST (compiler/oc_common/[include, src]/nl_nodelist.h)

In many places compiler 104 uses lists of IL_NODEs, the NL_LIST data structure provides an abstraction for manipulating these node lists. For example, the UseDef analysis, set forth above, creates lists of IL_NODEs that use a given definition and lists of IL_NODEs that may be the definition for a given use. The NL_LIST abstraction is straightforward, it provides the ability to create, add, remove, replace, search and iterate over node lists.

K Opcode to IL Translation

After block picker 114, set forth above, has chosen which K opcodes to compile, translating the K opcodes into IL involves three main steps. The first step is to determine the order in which code will be generated for the basic blocks. The block layout method is set forth above. Second, as basic blocks of K opcodes are chosen by the block layout method, the opcodes are examined to determine if they can be combined into a 'logical opcode'. Finally, an IL generation procedure is called based on the K opcode and its arguments.

Opcode Combination (compiler/ooct_opcode_combine.c).

Some sequences of K opcodes can be described as a single 'logical' opcode. For example, it was determined that a sequence of two TR instructions was used to test the value of a 32 bit register pair by testing each of the individual halves. These two TR instructions represent a logical 32 bit test opcode that is not available in the K architecture. The code that the IL building procedures would create for the two TR instructions is much less efficient than the code that could be created if this pattern was recognized. Fortunately, since OOCT is software, it is easy to add a new opcode, have a special unit that recognizes the patterns, and instead generate the efficient IL.

Before generating the standard IL for a given opcode, the OOCT_opcode_combine routine is called. This routine iterates over all of the patterns that have been defined, trying to use a 'logical' opcode if it is appropriate. Currently, only two patterns are defined, but it is straightforward to define additional combinations. If one of the patterns is matched, the IL building procedure for that logical opcode is used to create the IL instructions and OOCT_opcode_combine will return TRUE to indicate that the normal IL building procedure need not be called.3.

IL Building Procedures (compiler/ooct_il_build.c)

For each K opcode, there is a specific IL building procedure. The IL building procedures take two types of arguments, the address of the instruction, and a list of arguments that are the fields in the original instruction. The IL building procedures also use a shared global variable global_gen_state that is used to keep track of the pseudoregisters and the labels while generating the IL. Each of the IL building procedures adds IL instructions to the IL_CTXT structure. All of the IL generation routines create a LABEL IL_NODE with the address of the original instruction as the label's identifier (if the label is not the target of another instruction, it will be eliminated early in the optimization process) not in general attempt to perform optimizations, leaving that to later compiler 104 stages, but a few special cases such as checking for exceptions that can be detected at compile time are handled.

Most of the IL building procedures are straightforward once the IL and the original instruction that code is being generated for become familiar. There are a few tips that help in understanding the code:

The IL building has been designed so that the compilation of any given opcode can be easily turned off for debugging. This is mainly controlled with the REALLY_COMPILE macro, and the COMPILE_SECTION_XX macros. When REALLY_COMPILE is turned off, all of the IL building routines will simply build calls (or jumps) back to interpreter 110. When COMPILE_SECTION_X is turned off, all the IL building routines for opcodes in section number X will simply build calls (or jumps) back to interpreter 110.

Since the IL is typed, it is critical to use the correct size pseudoregister with the correct type. For example, to load a 16 bit value into a 32 bit register, first a 16 bit load is done into a 16 bit pseudoregister, and then a CVT operation is used to cast the 16 bit value to a 32 bit value (the LOAD_CVT32 macro does this).

Whenever a callback or jump to interpreter 110 is inserted, a SYNC must be added to make sure that interpreter 110 has the correct values for the K registers. The compiled code does not attempt to maintain the value of the ESI register as it goes (in fact it is used to hold other values). Thus, the code generated must put the correct value into ESI before calling or jumping to interpreter 110. When making a callback, the code must also contain an EXTMOD instruction for every pseudoregister that may have been modified by the callback (the MODIFIES_REG macro does this).

Code to handle exception conditions (such as overflow) is not inlined. Instead, code is generated at the end of the list of IL instructions. This allows the common case to be compiled as a fall through, which typically improves the performance of the generated code.

Entry Points, Interrupt Checks

In addition to the IL that is generated for each K opcode chosen by block picker 114, IL is generated for entry points, interrupt checks.

In order to allow more optimizations to occur, every branch destination is not included as an external entry point (external entry points act as a barrier to optimizations). In particular, the only destinations which should be made into external entry points are those which are jumped to from outside of the segment. When compiling a given segment, partial information is available about which destinations fit this criterion in the branch log (see above for information on the branch log). Compiler 104 uses this information to chose which basic blocks should have external entries. For each of these entries, an ENTRY IL_NODE is generated along with a GOTO IL_NODE that jumps to the generated IL for the entry original instruction.

The OOCT specifications indicate that compiler 104 should insert interrupt checks within any loop. When generating the IL, a conservative estimate is made by inserting interrupt checks within any backward branch within the segment and before any computed jump instruction. The interrupt check is inserted after the label for the last original instruction in the basic block. As with other exception conditions, the IL code for the interrupt is generated out of line so that the normal case is simply the fall through of the condition branch.

Compiler Middle End Description

Middle End Overview

The main goal of compiler 104's 'middle end' is to improve the quality of the IL so that better code will be generated in the code generation stage. The rest of compiler 104 is structured as a series of passes that either perform an analysis of the IL or perform a transformation that modifies the IL. The passes can be applied multiple times although there are some dependencies between passes. From this point on, the rest of compiler 104 does not have any special knowledge about K instructions, it only deals with the IL.

The remainder of this section is divided as follows. First, the stage that performs OASSIGN insertion is discussed. Second, compiler 104's analysis passes are discussed. Finally, compiler 104's transformation passes (that perform the main optimizations) are discussed.

FIG. 15 particularly illustrates an OASSIGN insertion example.

OASSIGN INSERTION (compiler/ooct_add_overlap_defs.c). The OASSIGN opcode is a special marker instruction that makes aliasing between pseudoregisters explicit. The need for OASSIGN arises in OOCT because some K opcodes use 16 bit registers while other operations use 32 bit registers that alias the 16 bit registers. In OOCT, separate pseudoregisters are used for all of the 16 bit and 32 bit registers. Thus, some of the pseudoregisters implicitly overlapped with each other. This creates two problems. The first problem is with optimization passes performing incorrect transformations. For each pseudoregister definition compiler 104 keeps track of the instructions which use that definition, and for each pseudoregister use compiler 104 keeps track of its definitions. This information is called use/def information. Compiler 104 uses use/def information in passes such as the Constant Folding pass. When pseudoregisters can alias each other, this requires the use/def computation and compiler 104 passes that use that information to be much more complex. A second problem created by overlapping pseudoregisters is in register allocation. When the register allocator assigns two overlapping pseudoregisters into machine registers at the same time, a modification to one register may require that the other register be invalidated. In general, keeping track of that information is very difficult and creates unneeded complexity.

Instead of tackling these difficult problems and adding significantly to compiler 104's complexity, a method for inserting special marker OASSIGN instructions was designed which would allow compiler 104 to ignore the problem. A special compiler pass immediately after IL generation inserts OASSIGNs. After this compiler 104 pass, other analysis passes are allowed to assume that pseudoregisters do not overlap (with regard to use/def analysis). Additionally, register allocation is fairly easily handled by using OASSIGNs. Whenever the register allocator comes to an OASSIGN, it spills the source at its definition and fills the destination after the OASSIGN. This method uses the aliased memory to guarantee that any use of the overlap definition uses the correct value.

The OASSIGN insertion is handled in two stages. First, a special version of the UseDef analysis is run. This version of UseDef is aware of pseudoregister overlaps, and creates use lists and definition lists that contain overlapping pseudoregisters. The rest of compiler 104 is not prepared to handle use/def lists that contain overlapping pseudoregisters, so this option for UseDef should not be used in general. After this analysis is performed, the procedure OOCT_Add_Overlap_Defs performs the actual insertion of OASSIGNs. An OASSIGN is inserted for every use that has an overlap definition (i.e. a definition that defines a pseudoregister that overlaps with the use's pseudoregister) and for overlapping reaching definitions at labels.

FIG. 15 illustrates an example of a case where an OASSIGN would be inserted. In the example, the pseudoregisters GRPAIR1 and GR1 overlap, so that the assignment to GRPAIR1 in the first line of the code is an implicit modification of GR1. The OASSIGN makes this explicit.

Analysis Passes

UseDef (compiler/oc_common/src/oc_usedef.c)

Computing the uses of a given definition and the potential definitions for a given use is one of the most fundamental compiler 104 analyses. Every compiler 104 optimization pass uses the use/def information. Each of the IL instructions may have one pseudoregister argument which is being written to (a dest) and one or more pseudoregister arguments which are read from (a src). After UseDef analysis, each dest has a list associated with it that stores pointers to all IL instructions which might use that value (called a du chain). Similarly, each src has a list associated with it that stores all IL instructions that might define that value (also called a ud chain). The method to compute the use/def information is described below. It is an iterative method that attempts to reach a fixed point (i.e. until further iterations make no changes).

Repeat the following steps until there is no change to the reaching definitions at any label.

Clear the definition list for each pseudoregister in regdefs (an array of NL_LISTs indexed by pseudoregister).

Iterate over the IL_NODEs in static program order.

If the instruction uses a pseudoregister, copy the definition of the pseudoregister from regdefs to the operand's ud chain.

If the instruction is a branch, combine the regdefs with the reaching definitions stored at the branch's LABEL. Changes to the reaching definitions cause the entire loop to be repeated.

If the instruction is a LABEL, combine the regdefs with the reaching definitions already at the label.

If the instruction defines a pseudoregister, set the definition list in regdefs to contain only this instruction.

If the instruction is an unconditional branch, change the regdefs array to be the set of reaching definitions stored at the next LABEL. This is done because the instructions are processed in their static order and the definitions that reach the unconditional branch are not the same as those that reach its static successor.

Live Variable Analysis (compiler/oc_common/src/oc_usedef.c)

Another form of analysis is for live variable information. Live variable analysis is used mainly for register allocation, but can also be used for induction variable transformations and dead-code elimination. A pseudoregister is considered live at a particular point in a program if the pseudoregister may be used along an execution path before it is redefine. The live variable analysis also marks the last use of a given pseudoregister (a use is the last use if there are no possible execution paths in which the pseudoregister is used before it is redefined). The basic method used to compute the live variable information is described below. It works by making repeated backward passes over the code until a fixed point is reached.

Repeat the following steps until there is no change to the reaching definitions at any label.

Clear live (a bitset of pseudoregisters)

Iterate over the IL_NODEs in reverse static program order.

If the instruction uses a pseudoregister, set the pseudoregister's bit in live. If the pseudoregister was not live before mark it as a last use.

If the instruction is a branch, combine live with the live registers stored at the branch's LABEL. Changes to the live registers cause the entire loop to be repeated.

If the instruction is a LABEL, combine live with the live pseudoregisters already at the label.

If the instruction defines a pseudoregister, clear the pseudoregister from live.

If the instruction is an unconditional branch, clear live. This is done because to process the instructions in their reverse static order and the live variables at the unconditional branch are not the same as those at its successor.

Register Allocation (compiler/oc_common/src/oc_regalloc.c)

Register allocation in compiler 104 is done in two stages. The first stage performs an analysis of the code and determines a set of recommended register assignments based on a high level model of the target machine. The second stage uses the analysis from the first stage along with a less abstract machine model to actually modify the code to use physical registers. This section will discuss the first stage.

The register allocation method is based on the traditional technique of using graph coloring. The nodes of the 'graph' are pseudoregister live ranges, with edges between live ranges that overlap. An N color graph coloring assigns one of N colors to each node so that no two connected nodes have the same color. Clearly if the graph of live ranges can be N colored (where N is the number of physical registers available), a register is assigned to each live range. Unfortunately, graph coloring is an NP hard problem (i.e. it requires exponential time), so in practice heuristics are used.

Register allocation is a complex, multi-step process. The steps are described in detail below.

1. Splitting of Independent Live Ranges and Allocation of REGINFO Structures

The ComputeRegInfo function does this. It splits each pseudoregister into independent live ranges, and allocates a REGINFO structure for each. The REGINFO structure is used to hold information about the live range in question used for register allocation, and ultimately holds the 'target' register—the physical register allocated for the live range. Since there's a 1:1 correspondence between pseudoregister live ranges (a logical construct) and REGINFO structures, the term REGINFO is often used to refer to both the live range and the data structure.

ComputeRegInfo does the splitting of live ranges almost as a side effect of allocating the REGINFO structures. It works by starting with a definition which does not yet have a REGINFO, creates a new REGINFO for it, then recursively looks at all its uses and all their definitions (and all their uses . . . ) and associates the new REGINFO with every definition and use that is reachable.

Once all REGINFOs have been created, they are split into 'simple' ones and 'complex' ones. A 'simple' REGINFO:

Has exactly one definition and one use

The use immediately follows the definition

The use is not the 2nd operand of a BINOP (target specific requirement).

All other REGINFOs are complex. Each REGINFO is given a unique ID. The complex ones being in the range [0..c->ri_complex) and the simple ones being in the range [c->ri_complex..c->ri_total). The purpose of this division is to save memory in holding the conflict matrix that is stored as BITSETs in every REGINFO. The effect of the above definition of 'simple' is that no two simple REGINFOs can ever be in conflict with each other.

2. Computing Conflicts and Compatibilities

The next step is to compute the conflict graph of the REGINFO structures. Two REGINFOs conflict if their live ranges overlap. Two REGINFOs are compatible if they are connected by copy. Conflicting REGINFOs cannot be assigned to the same register, as they are alive at the same time. Two compatible REGINFOs should be assigned to the same register if possible, as doing so eliminates a copy.

The conflicts can be thought of either as a graph (with a node for each REGINFO and an undirected edge connecting each REGINFO node with each other node it conflicts with—this is the view used by graph coloring methods), or as a symmetric binary matrix. This latter form is closer to how the conflicts are actually stored.

Each REGINFO contains a single BITSET that is (part of) one row of the conflict matrix. Since no two simple REGINFOs can conflict, the lower right quadrant of the matrix is all 0s. Since the matrix is symmetric, the upper right quadrant is the transpose of the lower left. As a result, the left side of the matrix is all that is needed to be stored. So the conflict BITSETs are only c->ri_complex bits each, instead of c->ri_total.

In order to determine if two REGINFOs, A and B, conflict from the BITSETs, it is necessary to first test to see if they are simple or complex (compare id against c->ri_complex). If either is complex, look at the bit corresponding to its ID in the other REGINFO's conflict BITSET. If both are complex, you can look at either bit; they must be the same. If neither is complex, they don't conflict.

Conflicts are computed from the liveness information stored in the IL (generated by ComputeLive). ComputeConflicts does a single pass over the IL code, generating the BITSET of complex REGINFOs live at the current point from the set pseudoregisters live at that point. As each complex REGINFO is added to the live set, it is marked as conflicting with every REGINFO already in the live set. As each simple REGINFO is encountered, it is marked as conflicting with the current live set.

3. Sorting the REGINFOs for 'Register Priority'

OC_SortRI prioritizes the REGINFO structures based on a variety of tunable parameters. The weight parameters are relative to each other, so multiplying all of them by a constant has no effect.

OC_RegAllocConflictWeight:

Weight placed on the graph coloring of the conflict graph. Higher settings of this parameter will favor allocations that put more different REGINFOs into registers, regardless of how often those REGINFOs are actually used. Note that REGINFOs with few uses will also tend to have short lifetimes, so will be likely to be favored over REGINFOs with long lifetimes.

OC_RegAllocDefWeight: Weight placed on definitions, Higher values of OC_RegAllocDefWeight will favor REGINFOs with more different definition IL statements.

OC_RegAllocUseWeight: Weight placed on uses. Both OC_RegAllocDefWeight & OC_RegAllocUseWeight will tend to favor REGINFOs with long lifetimes and many uses/defs (though not REGINFOs that just 'hang around' for a long time without being used).

OC_RegAllocResortRate: This parameter controls how much sorting it does to get a good coloring. If OC_RegAllocConflictWeight is 0, this is irrelevant and should be 0 (==infinity). Small numbers (>0) mean more time spent and a better coloring.

4. Register Choice.

Once the REGINFOs on a series of constraints. The first constraints are required, so after applying them, if there are no registers left, the REGINFO is not assigned to a register (target=−1). The remaining constraints are desired but not required, so if any given constraint would result in the set of possible registers becoming empty, it is skipped. Once all the constraints have been applied, it picks the lowest numbered register out of the set and uses that.

TYPE [required]: Must choose a register than can hold a value of this type (info from Machine Model)

INUSE [required]: Can't choose a register that has already been allocated to a REGINFO that conflicts (or anything that overlaps with same)

BASEREGS [required]: Can't use a register that the frame reserves as some sort of frame/stack/base pointer CLOBBERED: Try not to use a register that is clobbered by someone during the REGINFO's lifetime DEF CONSTRAINTS: Try to use a register that fits the DEST constraints from the Machine Model for each IL that defines this REGINFO USE CONSTRAINTS: Try to use a register that fits the SRC constraints from the Machine Model for each IL that defines this REGINFO COMPATABILITY: Try to use a register that is compatible with another REGINFO in the compatibility list that has already been assigned a register.

Once all the REGINFOs have been assigned to registers (or failed), it does another pass over the REGINFOs looking for registers to change via the compatibility constraint (i.e., compatible REGINFOs assigned after this one, that couldn't go in the same register for some other reason).

Transformation (Optimization) Passes

The transformation passes are at the heart of the optimizing compiler 104. Each pass makes an attempt to rewrite part of the code so that the meaning of the code remains the same, but the final code produced will run faster. Some of the transformation passes do not themselves improve the quality of the code, instead they allow other passes to improve the code. Thus, the passes tend to work best in combinations and are less effective when used alone. Because of this, many passes such as Dead Code Elimination are run repeatedly.

Dead Code Elimination (compiler/oc_common/src/oc_usedef.c)

The dead code elimination pass (OC_ElimDeadCode) removes all code that is dead based on both data flow and control flow information. Data flow information is used to eliminate IL_NODEs that have no side effects and whose results are unused. Control flow information is used to remove all IL_NODEs that will never be executed (unreachable code). Additionally, some branch retargeting is performed. The method used is described below.

Repeat the following steps until there are no changes made.

1. Iterate over the IL_NODEs in static program order.
   a) If the instruction is unreachable, remove it. The instruction is unreachable if it is a LABEL that is not the target of any other instruction, or if it is a GOTO or CGOTO to the next instruction or if the instructioh is directly after an unconditional branch and is not a LABEL.
   b) If the instruction does not have a side effect and it has no use other than itself, remove it.
   c) If a fixed branch instruction jumps to an unconditional branch, retarget the instruction (e.g. a GOTO to a GOTO).
   d) Check for a conditional branch to the next instruction followed by a branch to somewhere else (L2). In this case the condition is reversed and the conditional branch is retargeted to L2.

FIG. 16 particularly illustrates an example of dead code elimination and Address Check Elimination
(compiler/ooct_elim_achk.c).

The address check elimination pass uses Dataflow analysis techniques to eliminate unnecessary address alignment checks. The code works by performing value inferencing over an algebra of even and odd. In other words, the code is analyzed to determine whether at any given point a pseudoregister holds an even, odd or unknown value. This analysis is done globally and works across branches. This means that it will work for loops and through other control flow and works especially well if a single unrolling of loops is performed.4 The method used is described below. It is an iterative method that attempts to reach a conservative fixed point. Values are inferenced in three main ways. First, when a pseudoregister is assigned to a constant the value can be inferred. Second, when a pseudoregister is the result of operation with known arguments the value can be inferred. For example, two even numbers add to give another even number. Finally, conditional branches give information about the value of pseudoregisters. For example, if a pseudoregister is tested for evenness, along one branch we know it is even and along the other branch it is odd.

Repeat the following steps until there is no change to the inferenced values at any label.

1. Clear the definition list for each pseudoregister in infvals (an array of INFVALs indexed by pseudoregister).
2. Iterate over the IL_NODEs in static program order.
   a) If the instruction can be simplified given the currently known inference values, replace the instruction with the simpler version. Changes to the instruction cause the entire loop to be repeated.
   b) Update the infvals based on the execution of the current instruction.
      i) If the instruction is a conditional on which a value can be inferred, update the inference values stored at the target LABEL and at the CGOTO with the appropriate inference value.
      ii) If the instruction is a non-conditional and defines a pseudoregister, update the value of that pseudoregister in infvals. The value is unknown unless the operation is a SET, or is a special case such as the addition of two even numbers.
   c) If the instruction is a LALBEL, combine the infvals with the inference values already at the label.
   d) If the instruction is a branch, combine the infvals with the inference values stored at the branch's LABEL. Changes to the infvals cause the entire loop to be repeated.
   e) If the instruction is a conditional branch, any values inferences from that condition are combined with infvals.
   f) If the instruction is an unconditional branch, change the infvals array to be the inference values stored at the next LABEL. This is done to process the instructions in their static order and the inferenced values at the unconditional branch are not the same as those that at its static successor.

Figure 17:
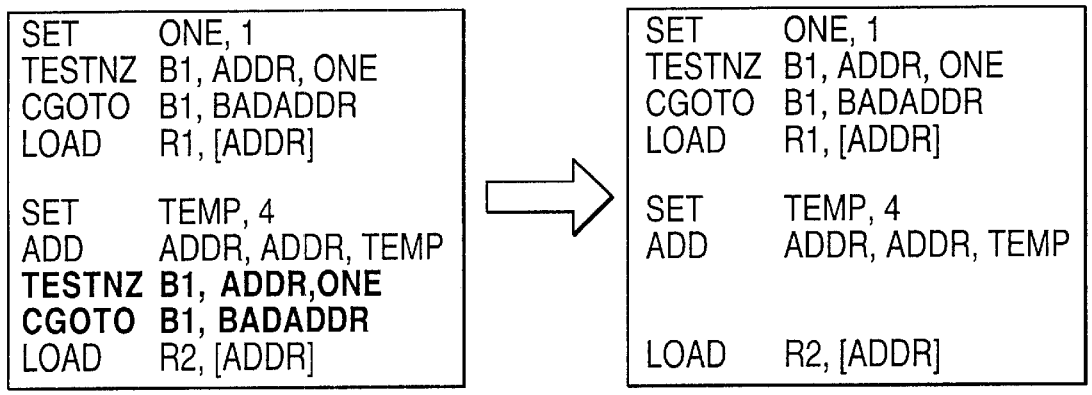
FIG. 17 is a block diagram of an example of address check elimination.

FIG. 17 particularly illustrates an example of address check elimination. In order to improve the performance of the analysis, a pseudoregister can take on other values than simply ODD, EVEN, or UNKNOWN. A pseudoregister can also be marked as EQUIVALENT to another pseudoregister or EQUIVALENT to a binary operation of two pseudoregisters. This improves the power of the analysis by allowing information about one pseudoregister to propagate to other pseudoregisters. For example suppose pseudoregister R1 and pseudoregister R2 are found to be equivalent. If the method can show that R1 is even (via a branch test result for example), than R2 must also be even.

Note that the method is a conservative one, the values that are inferred must be monotonically increasing. In other words, if at any time during the execution the method determines that a value is EVEN at m point in the program, it must be the case that the value really is EVEN. The method never indicates that a pseudoregister is EVEN during one iteration and that it is UNKNOWN during another iteration. It is straightforward to deduce from this property the termination of the method.

Hoisting (compiler/oc_common/src/oc_hoist.c)

Hoisting, commonly referred to as loop invariant code motion, is the process of moving calculations that are constant with respect to a loop outside of that loop. This generally provides a significant speedup since the code will only be executed a single time instead of once for each loop iteration.

1. Renumber the IL (i.e. so that id's are in order)
2. For each backward branch (i.e. a potential loop) try to hoist things out.

a) If there is another entry into the loop, nothing will be hoisted out of this loop
b) Iterate over the IL_NODEs inside the loop in static order
  i) If a node satisfies the following conditions, it can be hoisted:
    (a) It does not use or define a 'real register'
    (b) It does not use a pseudoregister set inside the loop
    (c) It does not have side effects
  ii) For any op that can be hoisted, rename any pseudoregister it defines
  iii) Move the IL_NODE above the loop
  iv) Renumber all IL_NODEs
  v) If a branch is detected, skip to the target of the branch (since it is undeterminable whether the branch is executed, so the code can't be hoisted).

The hoisting pass is not always effective for OOCT. The main reason for this is that many loops are also entry points, so that they have multiple entries into the loop and are not looked at by the hoisting pass. This problem could be fixed by performing 'label splitting', in which a new label is created which is used as the target for the loop. Hoisted operations can then be lifted in between the original label and the newly created label. This will soon be implemented.

Common Subexpression Elimination (CSE) (compiler/oc_common/src/oc_cse.c) Common Subexpression Elimination (CSE) is a technique aimed at eliminating redundant computations. Compiler 104 uses a global CSE method.

The basic method is described below, along with an illustrative example in FIG. 18.

1. While changes are being made, for each IL_NODE that has a destination (line 1 in the example), do the following:
  a) Pairwise check all uses of the destination to see if one dominates the other (A dominates B if all paths to B must go through A). For each such pair A and B (line 2 and 4), do the following:
    ii) Check if A and B 'match' (same opcode, and same sources), if not go to the next pair of expressions. A and B are a 'common subexpression'.
    iii) Try to find a larger common subexpression starting from A and B in the following manner. If A and B have destinations and B's destination has a unique use C (line 5) check if A's destination has any use D (line 3) such that D dominates C and D matches C. If so, add D and C to the common subexpression and try to find a larger subexpression with A=D, B=C.
    iv) Now that we have two common subexpressions A (lines 2,3) and B (lines 4,5) exist, we need to rewrite the code so that uses of B now us A instead. If A's destination might be changed before the use by B, a copy is used to a new pseudoregister.

Figure 18:
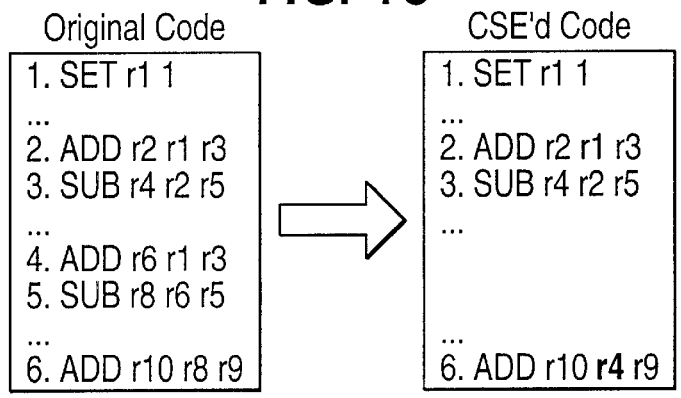
FIG. 18 is a block diagram of an example of Common Subexpression Elimination ("CSE").

FIG. 18 particularly illustrates an example of Common Subexpression Elimination ("CSE").

Copy Propagation (compiler/oc_common/src/oc_copyprop.c)

Copy Propagation is a transformation that attempts to replace uses of the target of an assignment with the source of the assignment. While copy propagation does not by itself improve the quality of code, it often produces code where the result of an assignment is no longer used, and thus the assignment can be eliminated. The method for copy propagation is described below.

1. For each ASSIGN operation.
  a) If the source of the ASSIGN has a single definition and that definition's only use is the ASSIGN and the destination of the ASSIGN is neither modified or used between the definition and the ASSIGN, then modify the definition to be a definition for the destination of the ASSIGN and remove the ASSIGN.
  b) For each use of the ASSIGN's destination, test if the ASSIGN is that use's only definition and test if the ASSIGN's source is both live and valid between the ASSIGN and the use. If both tests are true, replace the use of the destination with a use of the source.

Figure 19:
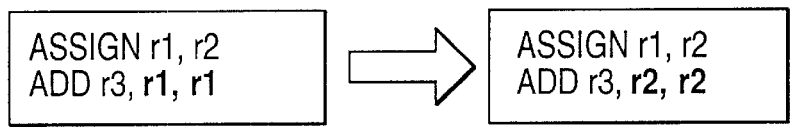
FIG. 19 is a block diagram of an example of copy propagation.
Figure 20:
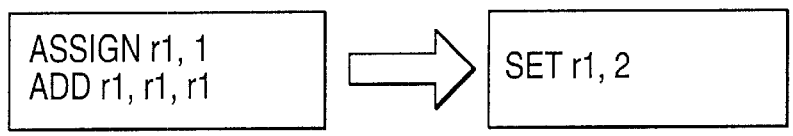
FIG. 20 particularly illustrates an example of a constant folding.

FIG. 19 particularly illustrates an example of a copy propagation. FIG. 20 particularly illustrates an example of a constant folding.

Constant Folding (compiler/oc_common/src/oc_cfold.c)

Constant Folding is a transformation that evaluates operations on constant values at compile time. For example, if the IL adds two constants together, Constant Folding will replace those IL instructions with a single SET instruction that assigns the destination of the add to the sum of the two constants.

The method for the Constant Folding pass is very straightforward. Each IL instruction is examined in order. For each arithmetic and logical operation (ADD, SUB, BAND, BOR, etc) if all of its arguments are constants, the IL operation is replaced with a SET operation that sets the destination pseudoregister to the value of the operation on the constant arguments.

Pattern Matching (compiler/oc_common/src/oc_pattern.c)

Compiler 104 also has a pattern matching optimization pass that replaces known patterns of IL instructions with more efficient versions. There are currently no patterns that commonly match IL patterns generated by OOCT, so the pattern matching pass is not run.

Target Code Generation

After the IL has been generated and the transformations have been applied to improve the quality of the code, three main compiler 104 passes are used to generate code. Up to this point, the IL and the transformation passes have been machine independent, but these three passes are heavily dependent on the target architecture.

INSTRUCTION FOLDING (compiler/oc_common/src/ix86_ifold.c)

The OOCT IL is a RISC like architecture, which without modification does not map efficiently to the target architecture. In particular, it would be suboptimal to emit an target instruction for every IL instruction. Since the target architecture is a CISC to architecture, multiple IL instructions can often be combined into a single target instruction. The instruction folding pass is designed to solve this problem by marking groups of IL instructions that can be combined into a single target instruction.

The instruction folding pass works by looking for one of a number of different predefined instruction combinations. The following combinations are used:

Constants are folded into various operations such as ADD, SUB, etc.

SETCC instructions are folded into the instruction they are setting the condition codes based on.

DIV, REM pairs with the same arguments are folded together.

ADD, SUB and ASL operations can be combined into a single 'lea' operation, or into the address calculation of a LOAD or STORE.

16 bit BSWAP, STORE combinations are folded into two separate 8 bit stores.

LOAD operations are folded into various operations when their result is used as a second argument.

The instruction folding pass simply decides if instructions should be folded, it does not do the actual folding, which is left for the machine code generation pass. The instruction folding pass marks instructions to be folded in two ways. First, each operand of a node can be marked with a "fold" bit. Second, instructions that have all of their uses folded into another instruction are marked with an IL_COMBINE flag and with the mmFold field that gives information about the way in which the instruction is folded. The register allocator and the machine code generation use these fields in order to perform correctly.

Target REGISTER ALLOCATION (compiler/oc_common/src/ix86_regalloc.c)

Once the register allocator (RegAlloc) has picked registers for all of the REGINFOs it can, it is necessary to go through the code and modify it to use those physical registers instead of the pseudoregisters. In addition, it is necessary to put some additional pseudoregisters temporarily into real registers so that the assembler will be able to generate code for those instructions. This will in general necessitate inserting spill and fill code to save and restore the values that RegAlloc placed in those registers. To do this OC_RegUseAlloc uses a constraint allocator (GetReg), and inserts spills and fills to reuse registers.

OC_RegUseAlloc does a single pass over the code, modifying and keeping track of the state of the physical registers in a 'stat' array. The stat array records what is (or should be) in each register at any given moment, and whether the value in the register or the spill location (or both) is correct. OC_RegUseAlloc works as a series of stages, each of which makes specific modifications to the instruction currently being processed. If multiple IL instructions have been folded together by the instruction folding pass, they are treated as a single instruction. The stages are as follows:

1. If the instruction uses any physical registers directly, make sure that any fills to those registers will occur after this use. Modify the instruction to use registers allocated for the pseudoregisters by the RegAlloc analysis. Lock all the registers so they wont be reused.
2. Modify the instruction to use registers that were allocated to temporaries by previous instruction's calls to GetReg. Lock all these registers.
3. Clean up the state information in the stat array to reflect any registers that the instruction clobbers, inserting spills as needed. Change the destination register to the register allocated by RegAlloc, if any (note that it is unnecessary to lock this register since it can be used to hold a src if needed).
4. Modify the code to put sources in registers where required for target code generation. This involves calling GetReg for those source operands that need to be in registers.
5. Unlock all the registers that have been locked.
6. Fix up destinations to use real registers where needed for target code. This involves calling GetReg.
7. Finalize the stat array to reflect the result of this operation, and fix up all used registers, setting their 'before' locations to the next instruction (so that any spills/fills will be placed after this completed instruction).

The stat array is important to understand. It is an array of data structures indexed by physical register (all registers below MM_NumRegs are physical registers), which indicate the status of that given physical register. The structure contains the following fields:

1. ri: The REGINFO structure identifying the pseudoregister that is currently associated with this real register (may be 0 to indicate no association). This may be either a pseudoregister allocated to this register by RegAlloc, or one temporarily assigned by GetReg.
2. alt_ri: A REGINFO structure identifying an additional pseudoregister that is also in this register. This is used when GetReg assigns a pseudoregister to a physical register while RegAlloc put another here (in ri).
3. flags: Flags to identify the state of the register. For example, RegValid is used to indicate that the value in the register is valid. If RegValid is not set, the register must be filled before it can be used. See ix86_regalloc for a complete description of the possible flags.
4. before: The instruction where spills or fills for this register should be placed.

Generate Machine Code

Machine code for the target is generated in two passes. The first pass is used to determine the size of the instructions so that branch offsets can be calculated. The second pass performs the actual code generation. The two passes are identical except that the first generates the code into a scratch buffer and does not have the correct branch offsets, so almost all code is shared.

Both passes consist of a single pass through the IL instructions in order. For each instruction, a table indexed by opcode and type is used to retrieve a function to generate the code. These code generating functions use EMIT macros that are a generalied method for generating target instructions without needing to know the intimate details of the target (see ix86_Asm_Emit.[h,c]). These macros ease the assembly of instructions that use any of the target addressing modes.

Segment Management

Code compiled by OOCT is stored within a SEGMENT data structure. There are a number of important issues associated with the management of segments. First, segments have a special memory allocator to handle segment storage. Second, how segments are created and installed into the system is discussed. Third, how segments are deleted is discussed (if this option is turned on). Finally, segment locking, which is used when segment deletion is on, is discussed.

Segment Allocator (compiler/SegAlloc.[h,c])

Storage management for segments in OOCT is handled with a special allocator. At OOCT initialization time, the Segment Allocator (SegAlloc) is initialized with a large chunk of memory. The SegAlloc unit then provides the ability to request an unused chunk of memory of variable size (like malloc), to free a previously allocated chunk of memory (like free), and to request statistics on current memory usage.

SegAlloc is more complex that the ZONE allocator, since it must handle variable size allocation. SegAlloc uses a fairly standard allocation method. The allocator maintains a sorted free list of chunks and uses a 32 bit header for allocated blocks to indicate their size. To allocate a chunk of memory, the free list is searched for a chunk that will fit the requested size. If the remainder of the chunk is greater than a minimum size, it is split and the remainder is added to the freelist. To free a chunk, it is added to the freelist. Since the speed of freeing memory is not a critical factor, the freelist is searched for adjacent free blocks, which are combined into a single free block.

Segment Creation and Installation (compiler/ooct_trace.c, compiler/SegMgr.[h,c])

After the main stages of compilation are complete, the end result is a block of memory that contains the relocatable target code. The next step is to create a segment for that code, and to install that segment into the space allocated for segments. OOCT_Install performs this function. Initially, room for the segment is allocated in the ZONE memory region. The segment is initialized with a list of the basic blocks chosen by block picker 114 (so that the segments can later be searched to find out if they contain a given original instruction) and with the generated code. A call to SEGMGR_Install, turns the segment into a continuous block of memory and copies it into the space allocated for segments using the SegAlloc unit.

After the segment is created and moved into the segment allocation space, the translation table that indicates which original instructions have code compiled for them needs to be updated. For each of the original instructions that are external entries, the translation table is updated with the correct address in the generated code for that entry. Additionally, the translation table is marked with the TRANS_ENTRY_FLAG to indicate that the K instruction has a valid entry.

Segment Deletion (compiler/ooct_trace.c, compiler/SegDel.[h,c])

When compiler 104 writes an entry in the translation table, it may overwrite an old one that was already there. No interpreter 110 will be able to read the old entry and jump to the old segment. When a segment has no entries in the translation table, and there is no interpreter 110 using the segment, it can be deleted and its memory can be used for another segment. This section describes how compiler 104 detects that a segment can be deleted and then deletes it. The Communications section also describes segment locking and segment deletion in great detail.

When compiler 104 overwrites an entry point in the translation table, it places the old entry point on a deletion list. After installing a new segment, compiler 104 calls SEGDEL_TryDeletions. This procedure checks each entry on the deletion list. If no interpreter is using an entry point, then it is deleted so that it can be reused later.

Every segment has an entry point counter in it. When an entry point is deleted, compiler 104 decreases the entry point counter for the segment that contains it. When the entry point counter of a segment reaches 0, no interpreter 110 are using the segment and no new interpreter 110 can jump into it. Compiler 104 deletes the segment and frees its memory for other segments to use.

Segment Locking

Each entry point to a segment has a counter that acts as a lock on the entry point. The counter records the number of interpreter 110 that are using the entry point. While the counter is greater than zero, the entry point and its segment are locked and compiler 104 will not delete them. The most important feature of the entry point lock is that the instructions that lock and unlock the segment are not part of the segment itself. This makes it impossible for an interpreter 110 to execute any instruction in the segment unless it holds the lock. The documentation for compiler 104 and interpreter 110 explains the segment locking mechanism in great detail.

Other Issues

There are a number of other issues in compiler 104 that do not fit nicely into other sections, but that are important to understand.

Stack Warping (common/ooct_warp.[c,h])

Compiler 104 is initially allocated a small stack that does not dynamically expand. Unfortunately, since compiler 104 uses a number of recursive procedures, the size of the stack it requires is often larger than the one provided. While running programs on the GranPower situations were observed in which page faults that compiler 104 could not recover from occurred due to stack overflow. Instead of attempting to rewrite sections of compiler 104 or determine how to correctly handle page faults due to stack overflow, a much larger stack is used than that which was allocated from the OOCT_buffer. The size of this stack was chosen such that the stack size would never be a limiting factor (other factors such as the ZONE size are a larger limitation). In order to use this stack, a clean interface was designed, OOCT_Warp_Stack, which allows a function to be called using OOCT's large stack space. On return from OOCT_Warp_Stack, the stack pointer will be unchanged. Thus, when compiler 104 is entered via ooct_Compile_Seed, the main entry point to compile a seed, it is called using OOCT_Warp_Stack.

Assertions (common/assert.[c,h])

The code in compiler 104 has a large number of assertion statements. Assertions are used throughout compiler 104 to check consistency constraints and for other error conditions. Assertions play two main roles. In the debugging environment, an assertion failure causes the program to halt while displaying or storing information useful for tracking down the problem. In the production environment, assertions are used to catch error conditions and to safely exit compilation when those conditions occur. For example, if compiler 104 runs out of memory, an assertion will cause compiler 104 to abort compiling that seed.

Service Routine (common/service.h)

The Service unit provides services that are typically provided in standard C libraries like printf and memset that are not provided by the KOI monitor. This unit is intended to abstract away the need to handle these system calls differently in the Windows and firmware builds. There are two underlying implementations of these Service routines, one for the Wintest project and the other for the firmware build.

VIII. Windows Testing Environment

The Windows Testing Environment plays a crucial role in the rapid development and testing of the OOCT system. By developing under Windows, standard debugging tools are provided under MSVC. Additionally useful tools such as profilers are available. For testing purposes, specialized testing methods have been developed under Windows that have increased the speed of testing and the coverage of the tests.

First describe is the simulated Granpower Environment. Then, the Comparison unit that performs most of the advanced testing techniques is discussed. Finally, compiler 104's code dumps are described.

Simulated Granpower Environment

In order to perform the initial testing of OOCT as well as the more advanced testing and performance analysis, an interpreter was need that would run under Windows. Interpreter 110 itself did not require modifications, but initialization calls and AOI system calls that are supplied on the GranPower system needed to be written. Additionally, for OOCT to run under windows, a design was required to run multiple 'tasks' since compiler 104 runs as a separate task from interpreter 110.

Initialization

The first part of creating a simulated environment under Windows was to create code to correctly initialize KOI data structures and to simulate the KOI initialization API for the OOCT task. Interpreter 110 expects a number of data structures to be properly initialized in order to execute any code. Additionally, certain data structure elements control whether to use OOCT. By basing our initialization code on the firmware initialization process, simulation of the correct initialization to run interpreter 110 and control some of its basic behavior. Similarly, the KOI initialization API was based for the OOCT task to run on the code used by the firmware. This allowed the initial writing and testing of interfaces between interpreter 110 (such as calls to OOCT_Init) to work under standard Windows debugging environments. It has also made it straightforward to change and test the interface.

AOI System Calls (wintest/MiscStubs.c, wintest/MsgStubs.c)

Interpreter 110 expects to run in an environment that has all of the AOI system calls available. In order to even compile and link an executable, stubs for the AOI system calls need to be created. Many of the system calls do not have significance while testing the system under Windows, so those calls are simply left as empty functions (only there for linkage purposes). Implementations of the AOI system calls are provided for timing (ScGtmnSet, ScGtmRef) and for messsgAlc, ScMsgSnd, ScMsgRcv).

OOCT relies heavily on the message passing system calls for interprocess communication between the Exec and compiler 104. Under Windows, a dummy version of those AOI system calls that is used to allow threads within the same task to communicate (see above). The Windows version of the messaging system calls implements the complete specification of the system calls using locking and message queues.

Seperate Threads for Compiler/EXEC

In order to simplify implementation and debugging under Windows, separate threads were used for compiler 104 and interpreter 110 instead of separate processes. Using threads simplifies the message passing implementation between the two 'tasks'. Additionally, debugging is easier both because a single debugger can be used for both tasks (interpreter 110 and compiler 104) and because that debugger is designed to work on multiple threads (we are not aware of any debugger that has tools for debugging multiple processes).

Comparison Unit

OOCT uses a unique testing method that has proven to be extremely valuable. Since the OOCT compiled code should produce results that are exactly the same as interpreter 110, a way was created to directly compare those results. Under the Windows testing environment, an ability to run programs under both OOCT and interpreter 110 and atomically compare intermediate results has been built in. These comparisons can be arbitrarily fine grained, down to checks after every instruction. Along with the ability to compare the behavior of programs, an automatic test generator has been written. The test generator creates 'random' code that is then run and compared. This automatic test generation and comparison provides an extremely large suite of programs to verify that OOCT is performing correctly. Additionally, it has provided an extremely valuable way of pinpointing bugs that occur, since the automatic comparison points to the place where the compiled code and interpreter 110 first differ.

This section will describe the comparison unit in two stages. First, the infrastructure that is used to compare the results of the compiled code against that of interpreter 110 is described. Second, generation of the random code used in testing is described.

Comparison Infrastructure

The comparison infrastructure is based on the idea of running two versions of the same K program, where the machine state of the simulated K machine (registers and memory) are check-pointed at specified times. The results of those check points are then compared to determine if the compiled version and interpreted version give the same results.

Figure 21:
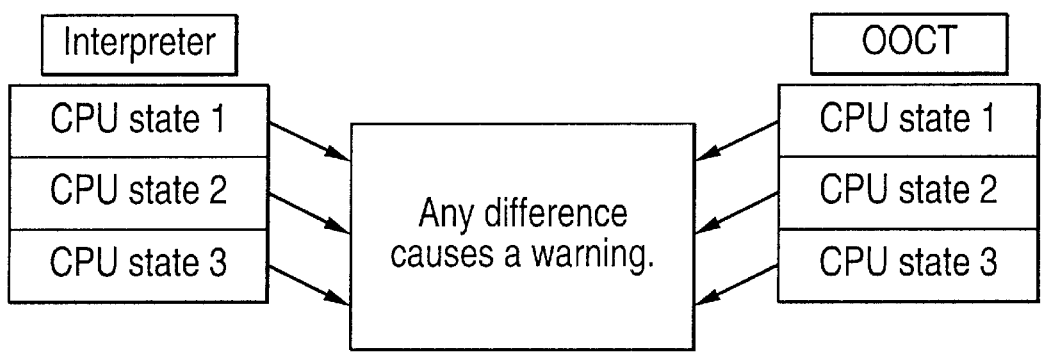
FIG. 21 particularly illustrates an example of the above process which has a comparison infrastructure according to an embodiment of the present invention.

FIG. 21 particularly illustrates an example of the above process which has a comparison infrastructure according to an embodiment of the present invention. In practice, the compare test is run as two Windows processes. The parent process runs the full OOCT system with branch logging and compilation. The child process runs just an interpreted version of KOI. Both processes write their check-point logs into memory (the child writes to shared memory) to record their effect on the simulated K machine state. The parent process compares the data in the logs and reports any discrepancies.

Code Generation

Generating random code for comparison testing is done by three units. First, the K assembler provides a mechanism for producing K machine code by using C function calls. Second, units are provided for creating various kinds of basic blocks of K opcodes. Finally, the random control flow unit allows code with a variety of different types of control flow to be generated.

K Assembler (wintest/OOCT_Assemble.[h,c])

The K assembler provides a straightforward mechanism for generating K code from within a C program. Each K opcode has a function used to assemble instructions specifically for that opcode. The individual instructions take as arguments a pointer to memory for where to store the code, a (possibly empty) label name, and an argument for each field used in the instruction. The function simply combines the fields into their correct places and writes the code into the buffer. Since branches to a label may occur before the definition of the label, a second pass over the code is used to resolve branch destination.

Random K Opcode Creation Units (wintest/GenArith.c, wintest/GenCassist.c, Wintest/GenMisc.C)

In order to test various types of instructions, individual units that generate basic blocks (straight-line code) containing those types of instructions were created. In particular, units that generate the arithmetic and shift operations, the C assist instructions, and all other instructions implemented by OOCT are created. The main interface to the units is through a FillBasicBlock routine. This routine takes as arguments a memory buffer and a number of instructions, and writes into the buffer the given number of instructions (picked randomly). The FillBasicBlock routine chooses randomly from an array of instruction generating functions to add instructions. The units contain one instruction generating function for each K opcode that can be generated. This instruction generating function chooses appropriate random values for the arguments to the assembler and assembles the instructions. Instructions are not generated completely randomly. Instead, they are generated with certain restrictions. For example, when randomly choosing a register to be the destination, the base registers are never used. The code is also restricted to use a number of predefined memory locations. In our testing, these limitations have not proven to be very significant. If they prove to be significant in the future, it is possible to reduce some of the restrictions by using a more complex process.

Using random testing is important because it tests interactions between many different instructions, which is particularly important for a compiler 104 such as OOCT. In OOCT, the code produced by compiling an instruction can differ substantially depending on surrounding instructions.

Figure 22:
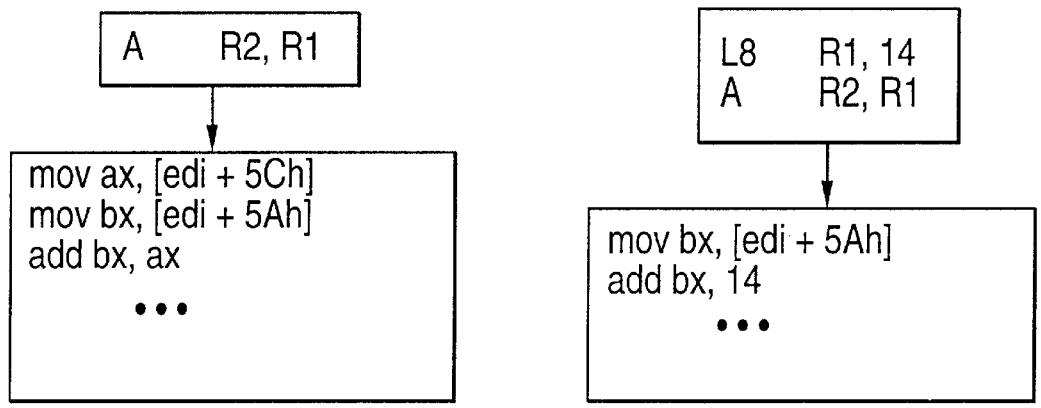
FIG. 22 particularly illustrates an example of code generation for the same instruction with different surrounding instructions.

FIG. 22 particularly illustrates an example of code generation for the same instruction with different surrounding instructions. Additionally, random testing tests many cases that programmers would not.

The random K opcode creation units are effective by themselves for certain types of testing. For example, when implementing a new opcode it has proven to be very effective method to create a simple loop that executes a basic block of instructions using that opcode. While the individual units can be effective, in order to fully test certain aspects of compiler 104, more complex control flow is needed.

Random Control Flow Creation Unit (wintest/Gdom control flow creation unit (GenControl) is used to create tests that use more complex types of control flow than straight-line code. GenControl starts with a single basic block and performs a certain number of transformations (chosen randomly). The transformations that are currently performed are as follows:

A basic block can be split into two basic blocks.

A basic block can be replaced with a diamond. This represents a conditional branch, where the two paths join back together.

A basic block can be replaced by a loop.

A basic block can be replaced with three basic blocks, where a function call is made to the second basic block and returns to the third.

After the specified number of transformations has been performed on the basic blocks, a randomly generated control flow graph exists that needs to be filled in with instructions. This consists of two parts. To generate the code for the basic blocks themselves, the random K opcode creation units, discussed in the previous section, are used. The second part is to fill in instructions to perform the branches and loops. Loops use a predefined template that iterates a fixed number of times. For conditional branches, a random test instruction is used.

Compiler Code Dumps

For debugging purposes and for optimization purposes, a number of code dumping mechanisms are used in OOCT under Windows. There are two main dumping mechanisms. First, during compilation, a code listing can be dumped that contains the K opcodes being compiled, the IL, and (if it has been generated) the target code. The second type of dump is a dump of the target code into an assembly form that can be recompiled and linked against for testing purposes.

By dumping a copy of the IL code after certain stages, the effect of a given compiler 104 optimization pass can be examined for correctness and effectiveness. Additionally, the by examining the final code produced, one can manually examine how well compiler 104 is translating each K opcode into IL and the quality of the target code produced for each IL instruction and K opcode. These code dumps are controlled by using the COMBDUMP macro, which is inserted in between compiler 104 passes in OOCT_Optimize_IL_And_Gen_Code (see compiler/ooct_trace.c). This macro calls the OOCT_Combdump procedure (see ooct_combdump.c), which iterates over the K opcodes and the IL instructions.

Current profiling tools for Windows do not handle dynamically generated code correctly. Thus, the second type of dump is used so that dynamic code from one run can be used as static code for another run and profiled correctly. This is achieved in two steps. In the first step, the program is compiled with the OC_DUMP flag (see compiler/ooct_dump.h), which causes each K opcode trace that is compiled to be recorded, and the code to be dumped to a file in a recompilable format. Second, the program is compiled and run with the OC_USEDUMP flag (see compiler/ooct_dump.h), which turns off dynamic compilation for previously compiled code instead using the static version. This version of the program can then be run with a profiler to record statistics about the quality of the code.

Second Embodiment of the Present Invention
Dynamic Optimizing Object Code Translation
Summary of the Second Embodiment Architecture emulation is the imitation of a computer architecture by a different computer architecture so that machine code for the original architecture can be run without modification. Object code translation is the process of translating machine code for one computer architecture into machine code for a different computer architecture. The dynamic optimizing object code translation system described uses compiler optimization techniques to achieve higher performance than template based object code translation for architecture emulation.

Description of Figures of the Second Embodiment

Figure 23:
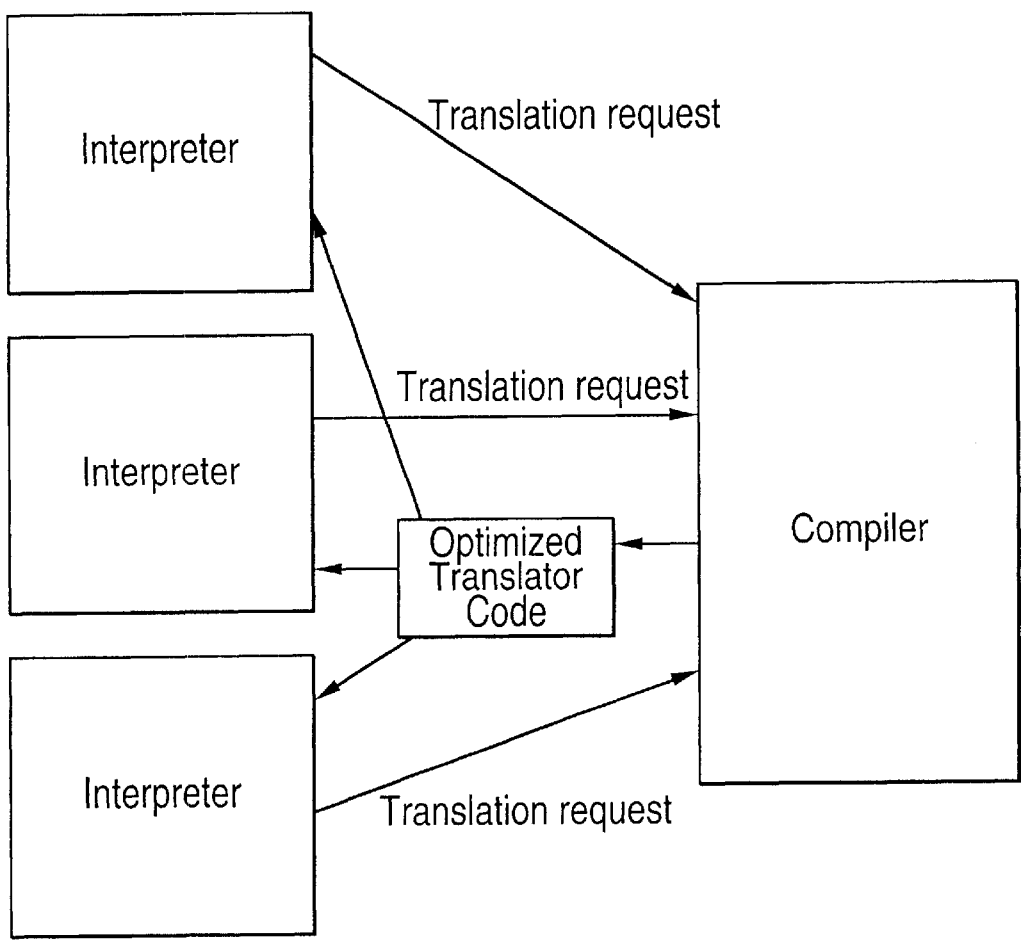
FIG. 23 illustrates a system configuration used for dynamic optimizing object code translation according to the second embodiment of the present invention.

FIG. 23 illustrates a system configuration used for dynamic optimizing object code translation according to the second embodiment of the present invention. FIG. 23 is a schematic diagram of dynamic translation concurrent with interpreted execution of programs. Each interpreter can send translation requests to the compiler. The compiler then makes translated code available to the interpreter tasks. On a machine with multiple execution units, all processes may be executing concurrently.

Detailed Description of the Second Embodiment

The dynamic optimizing object code translation system performs dynamic compilation of one instruction set to another to provide a performance improvement over template-based translation or interpreted emulation. The dynamic optimizing object code translation system combines any number of interpreters, which perform profiling of the running code, with a separate optimizing compiler. The optimizing compiler uses the profiling information from the running code to determine heavily executed portions of the code. These portions are then compiled and provided to the interpreters to use. The overall structure of the system is shown in FIG. 23.

Performing meaningful compiler-type optimizations is only possible with knowledge of the instruction flow graph. In a traditional compiler, the flow graph is given and well defined, because the whole routine is completely parsed before optimization begins. For an architecture emulation system, the code to be compiled is not available before it is actually run. Additionally, instructions and data cannot generally be differentiated without actually running a program.

Therefore, to determine the flow graph, the program must be run. An interpreter is used to run the program for the first time. As the interpreter executes the program, it informs the dynamic compiler each time that it performs a branch operation. This logging of information identifies some of the instructions and some of the join points. As the program runs, the information about the flow graph becomes more complete, though never totally complete. The system is designed to work with partial information about the flow graph: optimization is on potentially incomplete flow graphs, and the system is designed to allow optimized code to be replaced as more information becomes available.

The dynamic compilation chooses which portions of the text to optimize based on profiling information gathered by the interpreter. When the number of times some branch is executed exceeds a threshold, the destination of that branch becomes a seed for compilation. The seed is a starting point for a parse of a portion of the source instructions to be compiled as a unit. This unit is referred to as a segment.

A segment contains the instructions that result from optimizing the source instructions from the seed. It is installed and uninstalled as a unit. When the interpreter calls the compiler to inform it of a branch, it may choose to transfer control into the segment if code for the destination exists. Similarly, the segment may contain code for transferring control back to the interpreter.

A segment may be incomplete, only representing a subset of the possible flow paths from the source program. But this incomplete representation does not interfere with correct operation of the emulation. If a new, unanticipated flow path through the original code arises, then control flow will jump back to the interpreter. Later, the same segment can be replaced to account for the new flow of control.

Particular Objects of the Second Embodiment

The invention is the use of optimized object code translation for improved performance in architecture emulation systems.

Abstract of the Second Embodiment

The dynamic optimizing object code translation system described uses compiler optimization techniques to achieve higher performance than template based object code translation for architecture emulation. The invention is the use of optimized object code translation for improved performance in architecture emulation systems.

Third Embodiment of the Present Invention
Concurrent Dynamic Translation

Summary of the Third Embodiment

Dynamic translation is the act of translating a computer program in one machine language into another machine language while the program is running. The concurrent dynamic translation system described performs translation concurrently with interpreted program execution.

Description of Figures of the Third Embodiment

Figure 24:
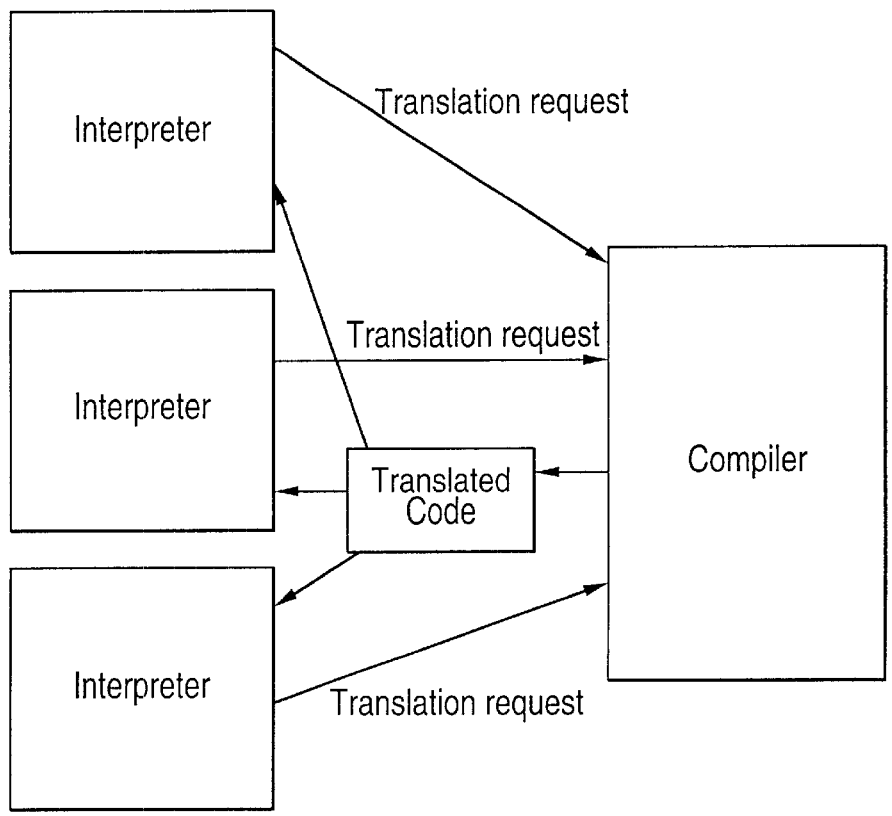
FIG. 24 illustrates a system configuration used for concurrent dynamic translation according to the third embodiment of the present invention.

FIG. 24 illustrates a system configuration used for concurrent dynamic translation according to the third embodiment of the present invention. FIG. 24 is a schematic diagram of dynamic translation concurrent with interpreted execution of programs. Each interpreter task can send translation requests to the compiler task. compiler task then makes translated code available to the interpreter tasks. On a machine with multiple execution units, all processes may be executing concurrently.

Figure 25:
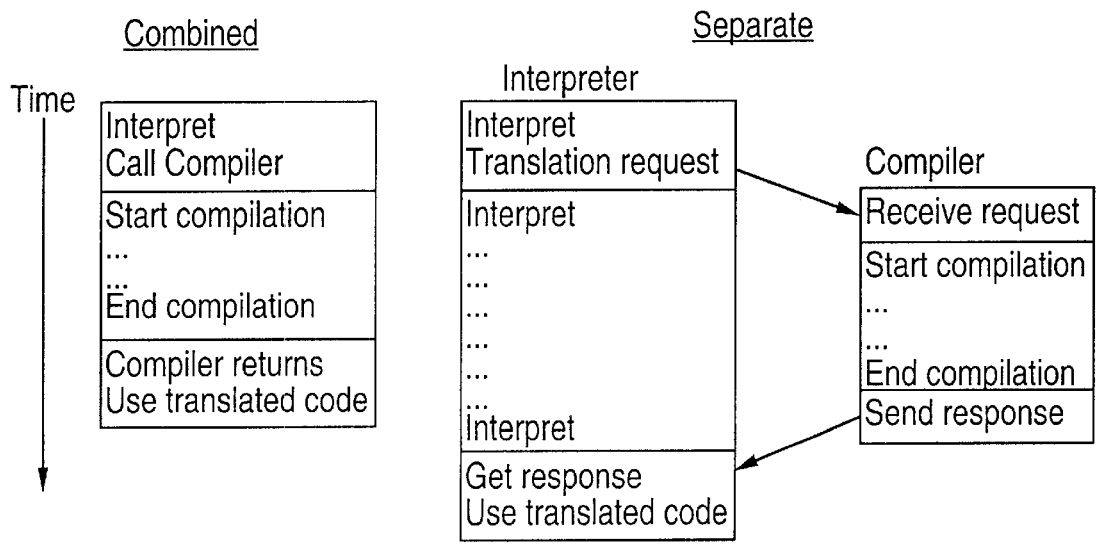
FIG. 25 illustrates difference between combining an interpreter and compiler, for example during execution as one task, and separating them, for example into different tasks; according to a third embodiment of the present invention.

FIG. 25 illustrates difference between combining an interpreter and compiler, for example during execution as one task, and separating them, for example into different tasks; according to a fourth embodiment of the present invention. FIG. 25 is a schematic diagram of latency with combined and separate interpreter and compiler tasks.

Detailed Description of the Third Embodiment

The purpose of concurrent dynamic translation is to provide a performance increase over an interpreter by compiling an executing program into a more efficient form while the interpreter is still running. In order to perform the dynamic translation concurrent with the execution of an interpreter, the compiler runs as a separate task on a system with multiple execution units. The compiler task is a server, which receives requests to translate some instructions and responds with a piece of translated code. Arranging the compiler server as a separate task has several advantages. First, more than one interpreter task can make requests to the same server. Second, the interpreter tasks do not have to wait for the result of a compilation request before proceeding. Third, the interpreters and the compiler are isolated from faults in other tasks. Fourth, the interpreters and compiler can be scheduled independently so that the work is balanced more evenly over the number of available processors. Each of these advantages is described in more detail below.

There are some existing dynamic translation systems which do not have separate compiler tasks. The Java virtual machine from Sun Microsystems is one example [2]. The interpreter in the virtual machine can issue a dynamic translation request by calling a procedure. The interpreter has to wait for the translation request to complete before it continues executing the program. Another example is the Fujitsu OCT dynamic translation system which translates a page of instructions at a time [1]. In the OCT system, the interpreter must wait for the translation request to complete before it continues executing.

There are also translation servers available for static translation of Java source code into Java bytecode [3]. These servers offer the advantages of a separate compiler task for static translation but not for dynamic translation, because they do not operate while the Java program is running.

The first advantage of the separate compiler task arrangement is that multiple interpreter tasks can make translation requests to the same server. They do not have to include the compiler code in their executable image, which makes it much smaller. They do not have cache conflicts between interpreter instructions and compiler instructions or between interpreter data and compiler data. Since efficient cache use is important on almost all modern processors, this is a significant advantage.

The second advantage of a separate compiler task is that the interpreters do not see the latency of the compiler. FIG. 25 illustrates the difference in latency. With the combined interpreter and compiler task, the interpreter executes no instructions until the compiler has finished translating the instructions. With the separate tasks, the interpreter immediately resumes executing instructions while the compiler is working. The total work done by the separate tasks is greater because they must send and receive translation requests, but the smaller latency means that users of the system do not observe pauses while the compiler is working. Also, the interpreter task can respond to external events, such as interrupts, while the compiler is working, which may not be possible in the combined task arrangement. In practice, the fact that the interpreter experiences the latency of the compiler in the combined arrangement places a limit on the complexity of the compiler and the quality of the translated code. For example, Java Just-In-Time compilers should execute fast enough that a user interacting with the Java system does not see a pause, which prohibits some complex optimizations. Similarly, the OCT system only performs optimization within a single translated instruction in order to reduce compilation time. The separate compiler task arrangement allows optimization across multiple instructions.

The third advantage of the separate compiler task is that faults in the interpreter tasks and the compiler task are isolated from each other. This means that if the compiler task gets an address exception or other exception condition, the interpreter task is not affected. The compiler resets itself after a fault and continues working on the next request. Since the interpreter tasks do not wait for the compiler to finish a translation request, they do not notice if the compiler gets a fault.

The fourth advantage of the separate compiler task is that it can balance the load of the compiler and the interpreter tasks. In the dynamic translation system, there are times when the interpreter tasks are very busy and need all of the computer?s CPUs and there are times when the interpreter tasks are idle and the CPUs are not being used. In the combined interpreter and compiler arrangement, most of the compilation work is done when the interpreters are busy because the compiler is only called when the interpreter is running. This does not take advantage of the idle CPU cycles. In the separate compiler task arrangement, the compiler continues to work when the interpreters are idle. It produces translated code that the interpreters are likely to use in the future.

Particular Objects of the Third Embodiment

The third embodiment of the present invention is directed toward the use of dynamic translation concurrently with multiple interpreters executing on a system with multiple physical execution units, providing smaller executable image size, reduced cache contention, lower interpreter execution latency, fault isolation and better load balancing.

Abstract of the Third Embodiment

The dynamic translation system described performs translation concurrently with interpreted program execution. The system uses a separate compiler so that it does not significantly affect the performance of the interpreter tasks. The invention is the use of dynamic translation concurrently with multiple interpreters executing on a system with multiple physical execution units, providing smaller executable image size, reduced cache contention, lower interpreter execution latency, fault isolation and better load balancing.

Fourth Embodiment of the Present Invention
Emulation During Dynamic Translation to Reduce the Burden of Profiling on the Emulator Summary of the Fourth Embodiment Architecture emulation is the exact imitation of a computer architecture by a different computer architecture so that machine code for the original architecture can be run without modification. Object code translation is the process of translating machine code for one computer architecture into machine code for a different computer architecture. The dynamic optimizing object code translation system described uses compiler optimization techniques to achieve higher performance than template based object code translation for architecture emulation. However it needs profiling to realize the dynamic optimizing object code translation. This description explains a method of reducing the burden of profiling.

Description of Figures of the Fourth Embodiment

Figure 26:
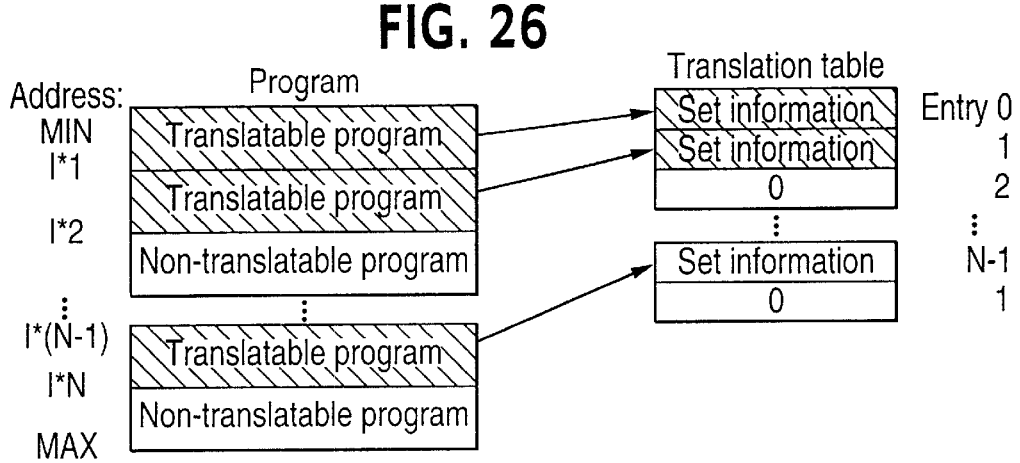
FIG. 26 illustrates a translation table used to record which instructions are translatable and which are not according to a fourth embodiment of the present invention.

FIG. 26 illustrates a translation table used to record which instructions are translatable and which are not according to a fourth embodiment of the present invention. FIG. 26 is a translation table showing which programs are translatable and which are not. In this case, programs are measured in units of I bytes. The emulator checks which entry a branch successor corresponds to, thereby determining whether it jumps to a translatable program or not.

Figure 27:
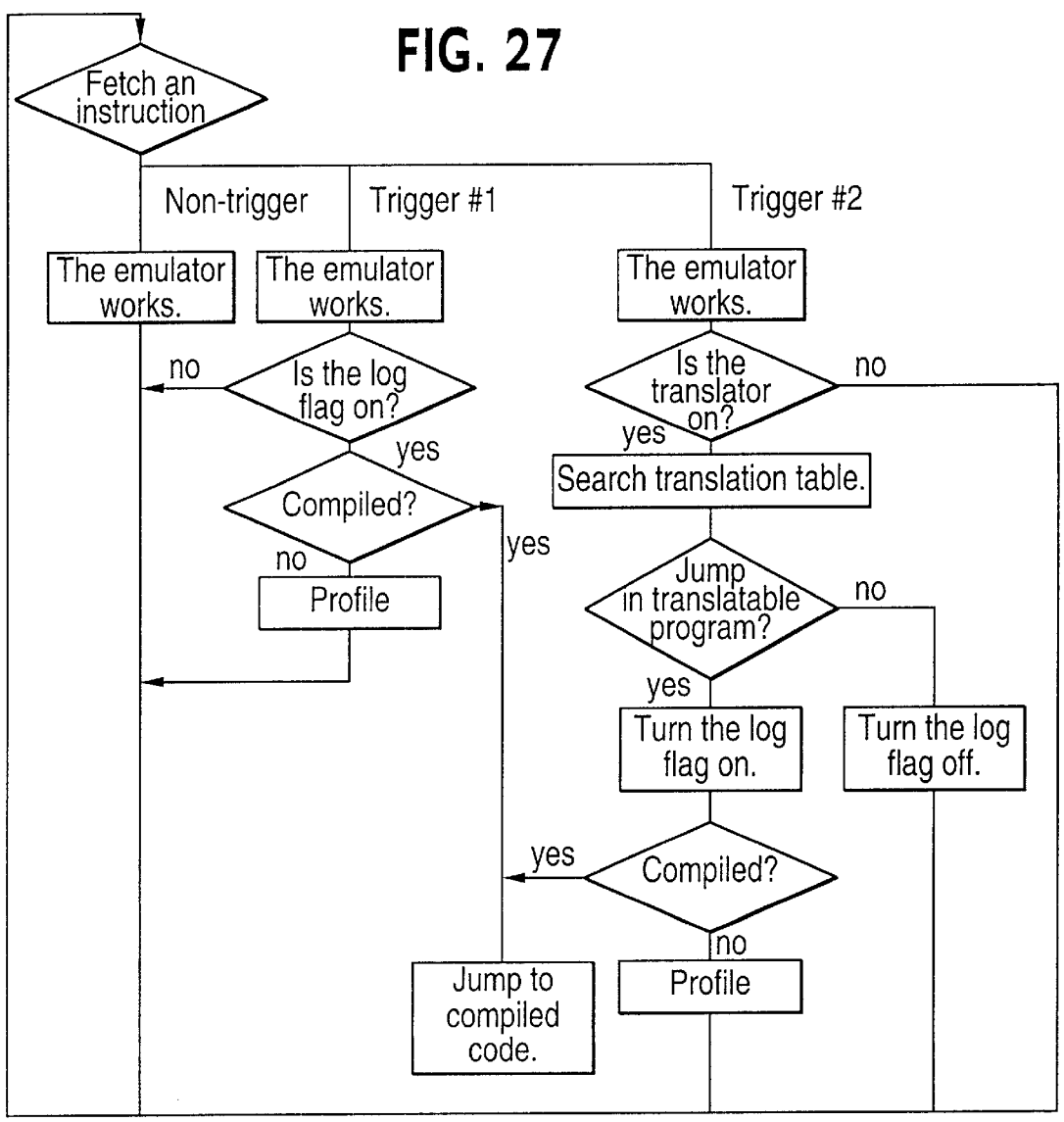
FIG. 27 illustrates how the method reduces the burden of profiling on the emulator according to a fourth embodiment of the present invention.

FIG. 27 illustrates how the method reduces the burden of profiling on the emulator according to a fourth embodiment of the present invention. FIG. 27 is a flow diagram which shows how the emulator turns on logging for translatable programs and turns it off for non-translatable programs. Trigger *1 and trigger *2 instructions should both be logged, but trigger *1 instruction may not jump between translatable program and non-translatable program. Only trigger *2 instructions can jump between them. The log flag that remembers whether the emulator if running in a translatable or non-translatable. Therefore, in trigger *1 instructions, the emulator does not have to check the translation table or change the log flag. It just checks whether the branch successor instruction has been compiled already, and jumps to the compiled code immediately. Since trigger *1 instructions represent the most frequently executed trigger instructions, this algorithm can reduce the burden of profiling on the emulation.

Detailed Description of the Fourth Embodiment

The dynamic optimizing object code translation realizes high performance by producing faster instructions, but it entails costs in terms of memory and time. Therefore, in architecture emulation, both dynamic optimizing object code translation and emulation are used together. The translation is used for the major program that runs frequently and needs high performance. And the emulator works for minor program and also profiling of major program until the translator completes compiling. A profile is used by the translator to compile and optimize the program.

Instructions that might jump from non-translated code to translated code are called trigger instructions. If a trigger instruction can jump from a minor program to a major program or from a major program to a minor program, then it is called a trigger *2 instruction. If it can only jump within a minor program or a major program, then it is called a trigger *1 instruction. Since the translator does not work on the minor programs, it is not necessary to profile the trigger *1 instructions in a minor program. It is necessary to profile trigger *1 instructions in a major program because part of the program may be translated while another part is not yet translated. It is necessary to profile trigger *2 instructions in both minor and major programs because they might jump into a major program.

The emulation performs three checks after executing a trigger *2 instruction (see FIG. 27) First, it checks if the translator is on. If it is on, it checks if the successor of the trigger *2 instruction is translatable or not. If it is translatable, then the emulation sets the logging flag to true and checks if the successor has been translated, jumping to the translated version if it exists.

The emulation only performs two checks after executing a trigger *1 instruction (see FIG. 27) First, it checks if the logging flag is on or off. If the flag is off, then this instruction is in a minor program and it does not need to be profiled. If the flag is on, then the emulation checks whether its successor has been translated or not.

Major and minor programs are distinguished by their memory addresses (see FIG. 26) The emulator uses a translation table to record the relationship translatable and non-translatable program addresses. For trigger *1 instructions, which never move between translatable programs and non-translatable programs, the emulator does not have to access the translation table because the logging flag contains that information already.

By separating the behavior of the emulator for trigger *1 and trigger *2 instructions into two methods, the burden of profiling on the emulation is reduced.

Particular Objects of the Fourth Embodiment

The fourth embodiment of the present invention is directed toward a method of reducing the burden of profiling on the emulator by placing code after trigger instructions that can jump in or out of translatable instructions which checks if the branch successor is translatable or not, and by placing code after all other trigger that merely checks a flag to see if it is translatable or not.

Abstract of the Fourth Embodiment

It is effective to use the dynamic object code translation with the emulation together, but the cost of profiling instructions to guide the translator is a burden on the emulation. By distinguishing between different types of profiled instructions, it is possible to reduce this burden. The invention is a method of reducing the burden of profiling on the emulator by placing code after trigger instructions that can jump in or out of translatable instructions which checks if the branch successor is translatable or not, and by placing code after all other trigger that merely checks a flag to see if it is translatable or not.

Fifth Embodiment of the Present Invention
Software Feedback for Dynamic Translation
Summary of the Fifth Embodiment Dynamic translation is the act of translating a computer program in one machine language into another machine language while the program is running. In some dynamic translation systems, the task that runs the program, called the interpreter, is separate from the task that translates the program, called the compiler. The rate at which the interpreter sends requests to the compiler should match the rate at which the compiler completes the requests. Also the rate at which the interpreter sends requests should not drop to zero. Software feedback provides a way of equalizing the two rates.

Description of Figures of the Fifth Embodiment

Figure 28:
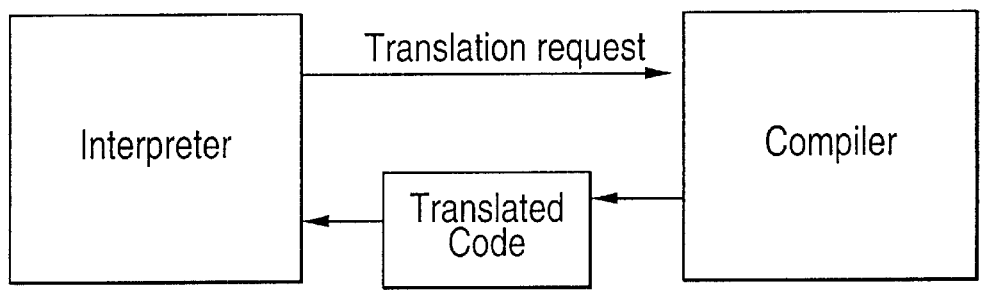
FIG. 28 illustrates an overall structure diagram of a dynamic translation system with separate interpreter and compiler according to a fifth embodiment of the present invention.

FIG. 28 illustrates an overall structure diagram of a dynamic translation system with separate interpreter and compiler according to a fifth embodiment of the present invention. FIG. 28 is a structure diagram of a dynamic translation system. The interpreter sends translation requests to the compiler. The compiler sends back translated code in response. The rates of requests and responses should be equal in order for the system to run most efficiently.

Figure 29:
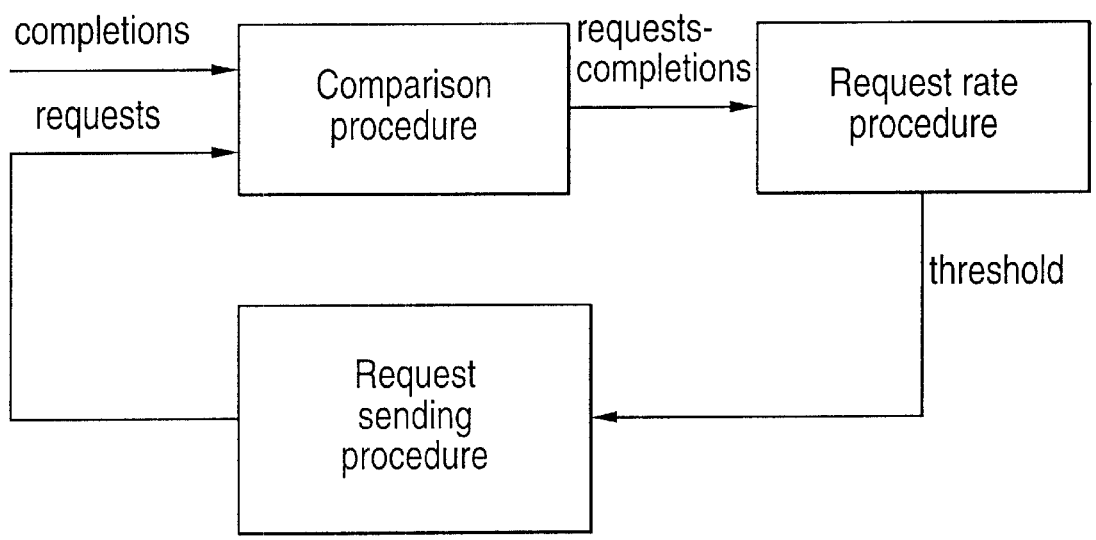
FIG. 29 illustrates components of a software feedback mechanism according to a fifth embodiment of the present invention.

FIG. 29 illustrates components of a software feedback mechanism according to a fifth embodiment of the present invention. FIG. 29 is a diagram illustrating components of a software feedback system. The comparison procedure subtracts the number of completions from the number of requests. The request rate procedure sets the rate based on that difference. The request sending procedure sends requests depending on the current rate.

Detailed Description of the Fifth Embodiment

In a dynamic translation system, the interpreter task sends requests to the compiler task. The request includes information to tell the compiler what section of the program to translate. The compiler translates the section and responds with translated code. The problem of deciding when to send a request is an example of a scheduling problem. The rate at which the interpreter task makes requests should match the rate at which the compiler finishes requests. Therefore the compiler will not become idle or overloaded with requests.

Software feedback is a method for equalizing the rates of two sets of events [1]. In the dynamic translation system, it changes the rate of translation requests to equal the rate of completed translations. As shown in FIG. 29, the software feedback system has three major parts. The first is a procedure to compare the number of translation requests and the number of completed translations. The second is a procedure that changes the rate of translation requests based on the result of the comparison. The third part is a procedure to make the translation requests that depends on the output of the second procedure.

In the dynamic translation system, the interpreter task counts how often a branch instruction jumps to a particular destination address. When this count passes a threshold, the interpreter sends a translation request including the destination address. The threshold value is the critical parameter that is set by the software feedback mechanism. When the threshold is lower than most of the execution counts, the rate of translation requests is high. When the threshold is higher than most of the execution counts, the rate of requests is low. Since the typical size of an execution count varies with the program that is being interpreted, software feedback is an ideal way to set the threshold because it adapts to the behavior of the interpreter automatically.

In the dynamic translation system, the comparison procedure of the software feedback system is very simple. It just computes the difference between the number of translation requests sent to the compiler and the number of translations completed.

The request rate procedure changes the threshold value based on the difference computed by the comparison procedure. If the difference is zero, then the threshold is too high and is preventing the interpreter from sending translation requests. In that case, the request rate procedure subtracts a constant from the threshold. If the difference is its maximum possible value, then the threshold is too low and the interpreter is sending too many translation requests. In that case, the request rate procedure adds a constant to the threshold.

The request sending procedure is called when the interpreter executes a branch instruction. If the branch instruction has jumped to the same destination address more times than the threshold, the interpreter sends a translation request including the destination address.

Particular Objects of the Fifth Embodiment

The invention is the use of a software feedback mechanism in a dynamic translation system with separate interpreter and compiler tasks to equalize the rate of translation requests sent by the interpreter and the rate of translations completed by the compiler, without allowing the compiler to become idle.

The use of minimum threshold to allow the compiler to shut off.

Abstract of the Fifth Embodiment

In a dynamic translation system with separate interpreter and compiler tasks, the rate at which the interpreter sends requests to the compiler should match the rate at which the compiler completes the requests. Also the rate at which the interpreter sends requests should not drop to zero. The invention is the use of a software feedback mechanism in a dynamic translation system with separate interpreter and compiler tasks to equalize the rate of translation requests sent by the interpreter and the rate of translations completed by the compiler, without allowing the compiler to become idle.

Sixth Embodiment of the Present Invention
Queueing Requests for Dynamic Translation
Summary of the Sixth Embodiment Dynamic translation is the act of translating a computer program in one machine language into another machine language while the program is running. For each piece of the program that is translated, the system makes a request to the dynamic translator. Requests that are made while the dynamic translator is busy are queued and delivered when the translator becomes idle. The queueing implementation combines system call and shared memory communication to reduce its.

Description of Figures of the Sixth Embodiment

Figure 30:
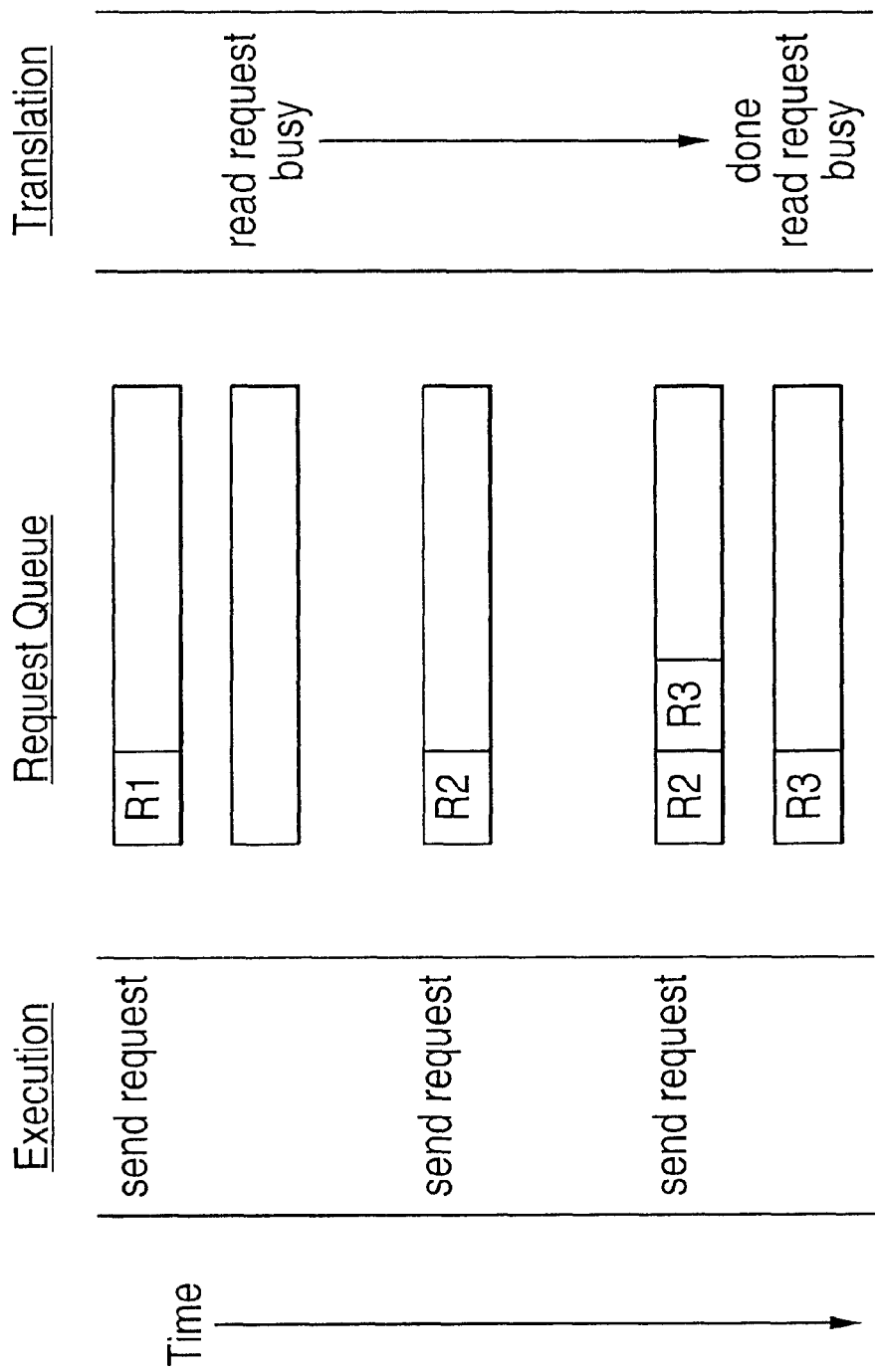
FIG. 30 illustrates how a queue is used to hold translation requests while the translation task is busy according to a sixth embodiment of the present invention.

FIG. 30 illustrates how a queue is used to hold translation requests while the translation task is busy according to a sixth embodiment of the present invention.

Figure 31:
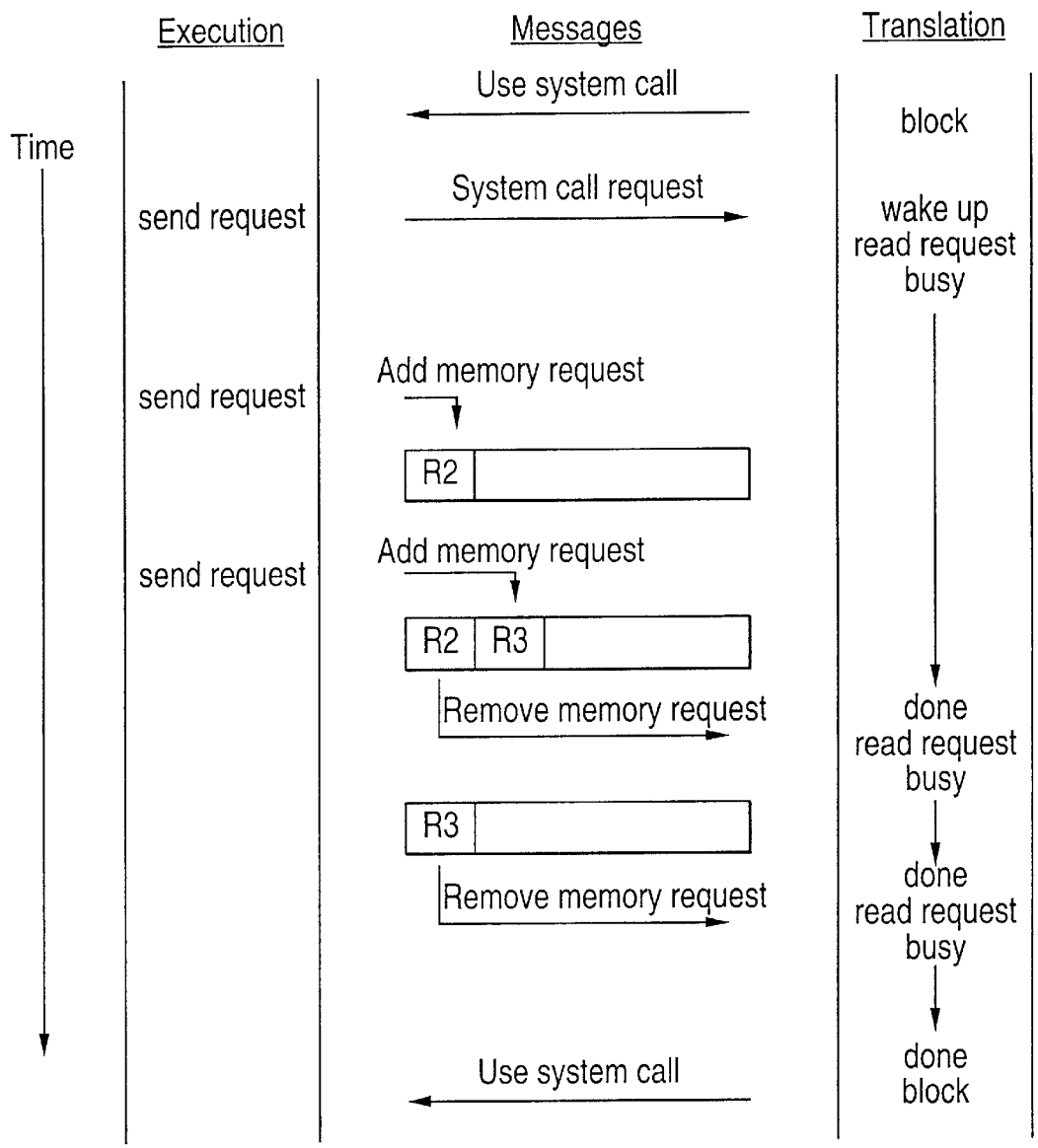
FIG. 31 illustrates how the OOCT request queue combines inexpensive shared memory requests with system call requests according to a sixth embodiment of the present invention.

FIG. 31 illustrates how the OOCT request queue combines inexpensive shared memory requests with system call requests according to a sixth embodiment of the present invention.

Detailed Description of the Sixth Embodiment

The basic function of the request queue is to remember requests that are made while the dynamic translator is busy, as shown in FIG. 30. In any dynamic translation system, there is an upper limit on the number of translations that can happen simultaneously. Typically the limit is only one translation at a time. However, there is no limit on the total number of requests made or the rate at which they are made. Therefore it is very likely that one translation request will occur while the translator is already busy. With a request queue, the translation request is placed in a queue and does not need to be repeated. When the translator takes the request out of the queue, it will perform the translation.

In OOCT, the dynamic translation system has multiple tasks, one being the dynamic translation task that handles requests and others being the execution tasks that make translation requests. The queueing implementation of OOCT improves on a naive queue by using less expensive shared memory together with system call messages to form the request queue, as shown in FIG. 31. System calls alone are sufficient to communicate seeds from the execution tasks to the translation task and to allow the translation task to become idle, or block, when there are no pending requests. However, system calls are expensive operations. Shared memory can be used to communicate the request messages from the execution tasks to the translation task, but the translation task cannot block on those messages, so it would have to run continuously to receive messages from a simple shared memory queue.

The OOCT implementation uses the best features of each mechanism, system call and shared memory. It allows the translation task to block waiting for a system call message but communicates requests through shared memory when the translation task is already working.

As shown in FIG. 31, the OOCT request queue uses two kinds of messages between the execution and translation tasks, plus a shared memory buffer accessed by both tasks. The first message goes from the translation task to the execution task. It tells the execution task to use a system call to send the next request. This message informs the execution task that the translation task has emptied the shared memory buffer and is about to block. The execution task then sends a request with a system call. The translation task receives the message and begins a translation. After sending one request with a system call, the execution task knows that the translation task is busy, so it sends more requests directly to the shared memory buffer. This is much less expensive than using another system call. When the translation task finishes one request, it looks in the shared memory buffer. If there is a request in the buffer, it is removed and translated. When the shared memory buffer is empty, the translation task again tells the execution task to use a system call.

The benefits of the OOCT request queue are that the execution tasks can use shared memory when they are sending requests at a high rate and the translation task can block when requests are coming at a slow rate.

Particular Objects of the Sixth Embodiment

This claim is a translation of the Fujitsu patent in Japanese, with one clause added.

The invention is a method of continuing interpretation while starting the translation of frequently branched to instructions by sending a message to the translation task and of queueing messages to the translation task when a translation is already in progress, and a performance improvement from using both system call and shared memory mechanisms to send the translation request messages.

Abstract of the Sixth Embodiment

The translation request queue described is a mechanism for collecting translation requests while another translation is executing. It allows the execution tasks to continue running immediately after sending a request. By using both shared memory and system calls together, it is possible to improve the efficiency of the translation queue. The invention is a method of continuing interpretation while starting the translation of frequently branched to instructions by sending a message to the translation task and of queueing messages to the translation task when a translation is already in progress, and a performance improvement from using both system call and shared memory mechanisms to send the translation request messages.

Seventh Embodiment of the Present Invention
Page Fault Recovery for Dynamic Translation
Summary of the Seventh Embodiment Dynamic translation is the act of translating a computer program in one machine language into another machine language while the program is running. The dynamic translator must read the source machine instructions before translating them into target machine instructions. While reading the source instructions, the translator can cause a page fault by reading from memory that is paged out, but it is inefficient to page in the memory. The translator described recovers from page faults without reading the paged out data and continues the translation.

Description of Figures of the Seventh Embodiment

Figure 32:
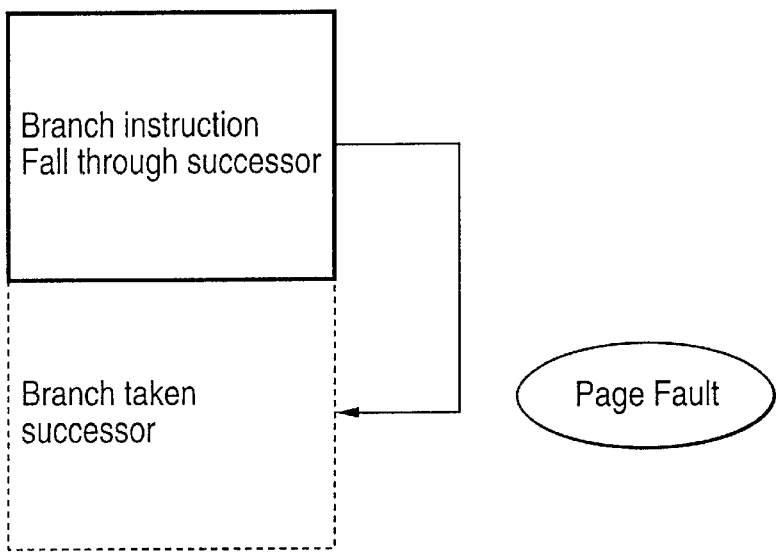
FIG. 32 shows how a dynamic translator is likely to cause page faults that would not occur during normal execution of the source instructions according to an seventh embodiment of the present invention.

FIG. 32 shows how a dynamic translator is likely to cause page faults that would not occur during normal execution of the source instructions according to an seventh embodiment of the present invention.

Figure 33:
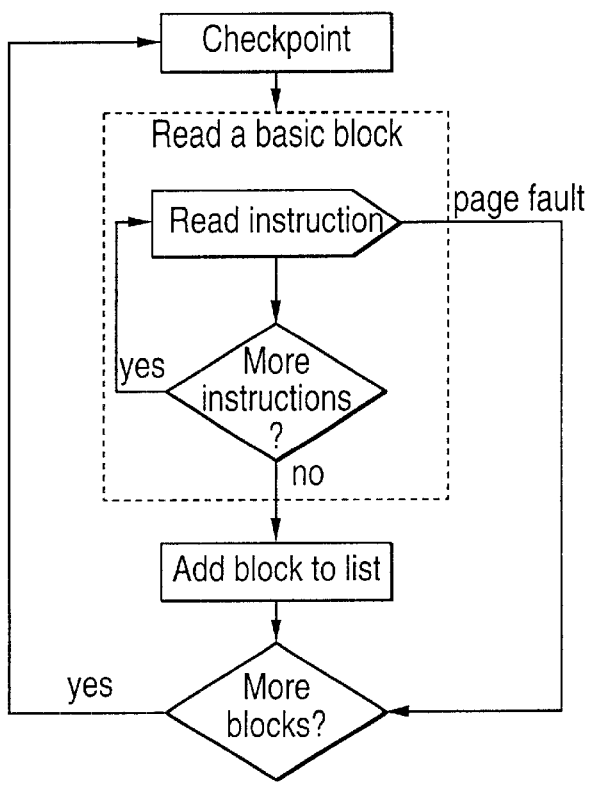
FIG. 33 shows the algorithm for recovering from page faults during translation and continuing with the translation according to an seventh embodiment of the present invention.

FIG. 33 shows the algorithm for recovering from page faults during translation and continuing with the translation according to an seventh embodiment of the present invention.

Detailed Description of the Seventh Embodiment

A dynamic translator is very likely to access pages that are bad candidates for copying into physical memory, because it reads all of the possible successors of an instruction, not just the successors that are actually executed. For example, as shown in FIG. 32, conditional branch instructions have two successors, the fall through successor and the branch taken successor. When a CPU executes a conditional branch instruction, if the branch is not taken, then the branch taken successor instruction is never loaded. Therefore it will not cause a page fault. When the dynamic translator reads the branch instruction, it tries to read both the fall through and the branch taken successors, without knowing which one will actually be executed. It might cause a page fault to read the branch successor instruction even though it will never be executed.

The normal method of handling page faults is to page in the requested memory and perform the memory access in software and then allow execution to continue after the faulting instruction. This method has two costs. First, it takes time to move one page from physical memory to backing store and to move another from backing store to physical memory and then perform the memory access. Second, it changes the set of memory pages that are paged in. The page that is copied into physical memory may not be accessed frequently before it is paged out again, which would mean that it was a bad idea to copy it to physical memory.

Since the dynamic translator can cause more frequent page faults, it is beneficial to reduce the cost of those page faults. The dynamic translator minimizes the cost of extra page faults by not copying a new page into physical memory and not evicting a page already in physical memory. This saves the copying time and also ensures that an infrequently referenced page is not copied in. Instead of copying the page, the page fault handler interrupts the current stream of instructions in the translator and returns control to a checkpoint designated by the translator.

The translator reads source instructions in units called basic blocks. If a page fault occurs while reading one basic block, then the translator ignores that block but continues to translate any other blocks. After all of the basic blocks are read, they are translated into one set of target instructions. The method of ignoring a basic block that causes a page fault is shown in FIG. 33. Before reading a basic block, the translator makes a checkpoint. All basic blocks read before the checkpoint are safe and cannot be affected by any page faults happening after the checkpoint. Then the translator tries to read the next basic block. If there is a page fault, it jumps immediately to the checkpoint. This causes it to skip the basic block and try to read the next one.

Particular Objects of the Eighth Embodiment

The invention according to the seventh embodiment is a way of reducing the memory access cost of dynamic translation by not copying pages to physical memory while still allowing translation to continue when a memory access fails.

Abstract of the Seventh Embodiment

The page fault recovery mechanism described is a way of reducing the cost of dynamic translation when accessing non-physically mapped memory. It permits dynamic translation to continue even when it cannot read all of the source machine instructions because of page faults. The invention is a way of reducing the memory access cost of dynamic translation by not copying pages to physical memory while still allowing translation to continue when a memory access fails.

Eighth Embodiment of the Present Invention
Recording Exits From Translated Code for Dynamic Translation Summary of the Eighth Embodiment Dynamic translation is the act of translating a computer program in one machine language into another machine language while the program is running. The dynamic translator chooses the instructions to translate by profiling them while they execute. The frequently executed instructions are translated and the infrequently executed ones are not. The translated instructions can cause the profiler to miss some instructions, which might cause frequently executed instructions to be interpreted. By recording specific exits from translated code, it is possible to profile all of the frequently executed instructions and ensure that they are all translated.

Description of Figures of the Eighth Embodiment

Figure 34:
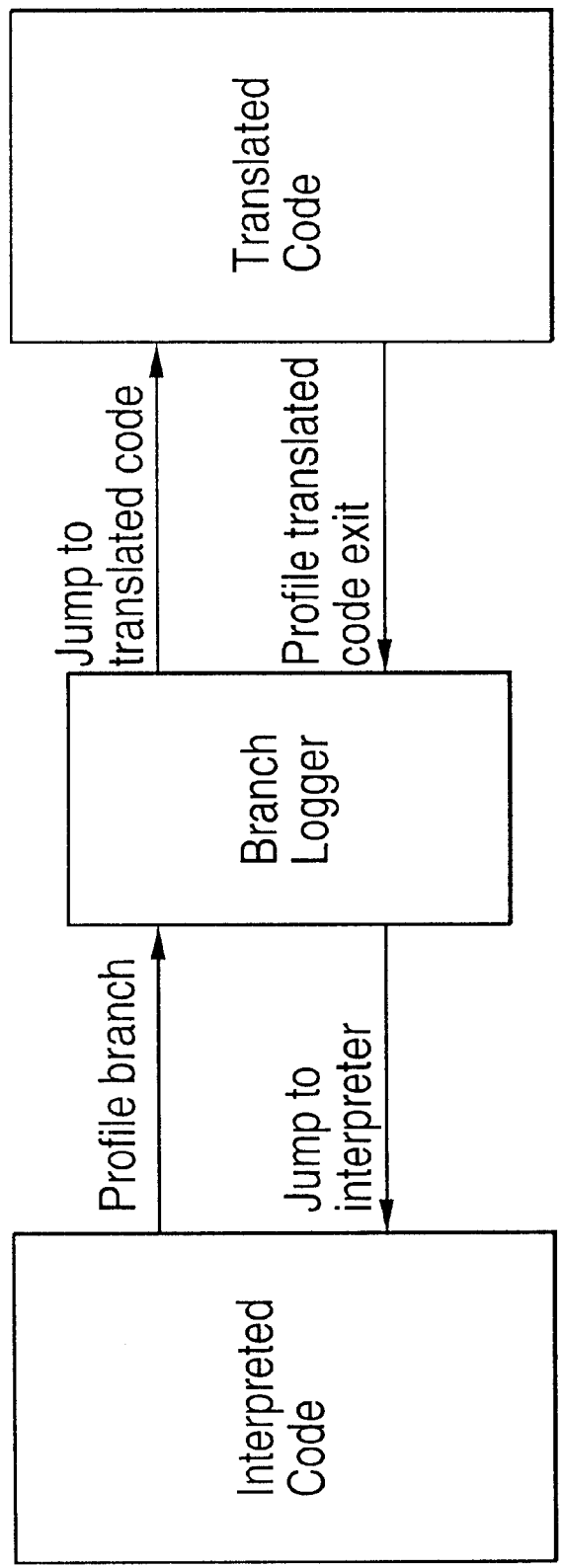
FIG. 34 illustrates a pattern of control flow in a dynamic translation system with a branch profiler according to a eighth embodiment of the present invention.

FIG. 34 illustrates a pattern of control flow in a dynamic translation system with a branch profiler according to a eighth embodiment of the present invention.

Detailed Description of the Eighth Embodiment

As described in the document ?Branch logger for dynamic translation?, the dynamic translation system profiles the branch instructions of the original program as they are interpreted to determine which instructions are frequently executed and which are not. The branch logger only profiles branch instructions and relies on the assumption that all frequently executed instructions are reached through frequently executed branches. In some cases, the dynamic translator itself makes this assumption untrue, because control will flow from translated instructions back to interpreted instructions without executing a profiled branch. The translator can identify those cases and it creates special translated instructions that profile this control flow as if it were a branch.

FIG. 34 illustrates how control flows from interpreted instructions to translated instructions and back. Wherever control exits from translated instructions, the translator makes sure that the exit is profiled as if it were a branch instruction. There are several cases in which control flows from translated to interpreted instructions.

First, there are branches to non-fixed destinations. The translator does not know which instruction will be executed after the branch, so it cannot combine that instruction into the same translation unit as the branch. Instead it creates an exit from translated code back to interpreted code.

Second, there are instructions that cannot be read because of page faults during translation. As described in the document ?Page fault recovery for dynamic translation?, the translator ignores blocks of instructions that cannot be read because of a page fault. So the translated program has to jump back to interpreted instructions when it reaches those blocks.

Third, some instructions are infrequently executed when the translation is performed. They are not translated because they were infrequently executed, as described in the document ?Block picking threshold for dynamic translation?. But they may become frequently executed in the future, so the translator must record exits to those instructions. This feature enables the dynamic translation system to adapt to changing execution patterns that alter the distribution of frequently executed instructions.

Because the exits from translated code are recorded, more instructions are translated. This increases the chance that a translated version of an instruction will exist. Therefore, after running the dynamic translation system a long time, most of the exits from one translated unit cause a jump to another translated unit instead of a jump back to interpreted code. This has a direct benefit from using the faster translated instructions more often and an indirect benefit from not executing the branch logging instructions as often.

Particular Objects of the Eighth Embodiment

The eighth embodiment of the present invention is directed toward a method of ensuring that frequently executed instructions are translated even if they are not reached through any profiled branches by profiling the possible exits of translated instruction units.

Abstract of the Eighth Embodiment

A dynamic translation system must locate and translate all frequently executed instructions, which can be accomplished by profiling branch instructions. But translating instructions will create paths to instructions, which do not include profiled branches. Therefore profiling is extended to include the exits from translated instructions. The invention is a method of ensuring that frequently executed instructions are translated even if they are not reached through any profiled branches by profiling the possible exits of translated instruction units.

Ninth Embodiment of the Present Invention
Block Picking Threshold for Dynamic Translation Summary of the Ninth Embodiment Dynamic translation is the act of translating a computer program in one machine language into another machine language while the program is running. The dynamic translator should translate all of the frequently executed parts of the source program and ignore all of the infrequently executed parts. To accomplish this, the translation system profiles branch instructions and does not translate those instructions whose execution probability is below a specified threshold.

Description of Figures of the Ninth Embodiment

Figure 35:
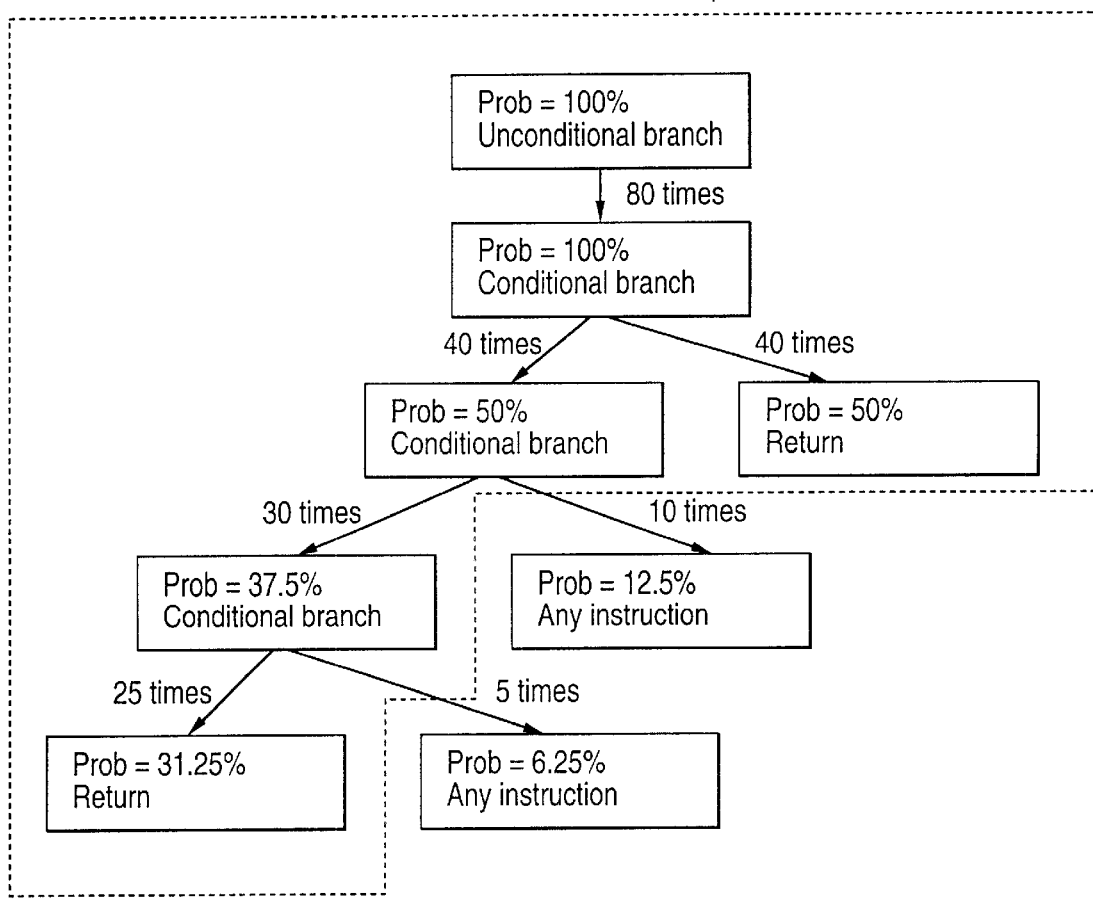
FIG. 35 illustrates how the dynamic translator uses branch profile information to compute the execution probability of a basic block according to a ninth embodiment of the present invention.

FIG. 35 illustrates how the dynamic translator uses branch profile information to compute the execution probability of a basic block according to a ninth embodiment of the present invention.

Detailed Description of the Ninth Embodiment

The purpose of a dynamic translator is to improve the overall execution speed of a computer program by translating it from its original source language instructions to more efficient target language instructions. The benefit of dynamic translation is measured by comparing the total time to execute the original program to the time required to translate the program plus the time to execute the translated program. The time required to translate any part of the program is approximately constant, so the benefit of translating one part is primarily determined by the number of times that part is used. Frequently executed instructions are worth translating, but infrequently executed instructions are not worth translating.

In order to measure the frequency of different instructions, a dynamic translation system can profile branch instructions. Using this profile information, it can pick a frequently executed instruction and begin translating at that point. After the initial instruction, the translator tries to read as many frequently executed successor instructions as possible without reading the infrequent successors. The block picking threshold is used to determine whether a successor is frequently or infrequently executed.

The dynamic translator reads instructions in units called basic blocks. In one basic block, all of the instructions are executed the same number of times, so they are either all executed frequently or all executed infrequently.

The dynamic translator uses profile information from branch instructions to determine if a basic block is frequently or infrequently executed. This process is shown in FIG. 35. The translator computes the probability that an execution path is taken from the first translated instruction to a given basic block. The first basic block is given an execution probability of 100%, because it contains the first instruction. If the current block has only one successor, then the successor has the same execution probability as the current block. If the current block ends in a conditional branch, then the probability of the current block is split between the two successors according to the branch profile information. For example, if the current block?s execution probability was 50% and it ends in a branch instruction that was executed 40 times and taken 10 times, then the probability of the branch taken successor would be (50% * 25%=12.5%) and the probability of the fall through successor would be (50% * 75%=37.5%).

A variable threshold called the block picking threshold is used to select frequently executed blocks. If the execution probability of a block is larger than or equal to the threshold, then that block is considered frequently executed and it is translated. If the execution probability is below the threshold, then the block is considered infrequently executed and is not translated.

One important property of this block picking method is that the set of blocks picked is connected. There are more complicated ways of computing execution probability, such as adding the probabilities from all predecessors. But this can lead to disconnected sets of blocks. It is possible to translate disconnected sets of blocks, but there are more opportunities to optimize the translated code if it is all connected.

Particular Objects of the Ninth Embodiment

The ninth embodiment of the present invention is directed toward a method of improving the efficiency of dynamic translation by choosing blocks of frequently executed instructions for translation and ignoring blocks of infrequently executed instructions, using a threshold execution probability to separate the frequently executed blocks from the infrequently executed ones.

Abstract of the Ninth Embodiment

A dynamic translation system has cost proportional to the number of instructions translated and benefit proportional to the number of times a translated instruction is executed. Therefore it is most efficient to only translate frequently executed instructions and ignore the infrequently executed ones. The invention is a method of improving the efficiency of dynamic translation by choosing blocks of frequently executed instructions for translation and ignoring blocks of infrequently executed instructions, using a threshold execution probability to separate the frequently executed blocks from the infrequently executed ones.

Although a few preferred embodiments of the present invention have been illustrated and described, it will be appreciated by those skilled in the art that changes may be made in these embodiments without departing from the principles and spirit of the invention, the scope of which is defined in the claims and their equivalents.

What is claimed is:

1. A computer architecture emulation system which emulates a source computer architecture on a destination computer architecture, comprising:
    an interpreter individually translating original object code into corresponding translated object code, determining a number of executions of branch instructions in the original object code, and comparing the number of executions of branch instructions with a threshold number; and
    a compiler grouping instructions of the original object code into a segment when a number of executions of a corresponding branch instruction exceeds the threshold number, and dynamically compiling the segment,
    wherein a rate of compilation of segments to be compiled is controlled by raising the threshold number when a queue to store the segments to be translated reaches a predetermined capacity.

2. The computer architecture emulation system according to claim 1, wherein branch instructions corresponding to segments which are not compiled are stored in memory.

3. The computer architecture emulation system according to claim 2, wherein segments corresponding to branch instructions which have not exceeded the threshold number are not compiled.

4. The computer architecture emulation system according to claim 1, wherein segments corresponding to branch instructions which are not compiled are stored in memory while said interpreter executes the translated object code instructions.

5. The computer architecture emulation system according to claim 1, wherein said interpreter and said compiler are tasks which operate simultaneously in a multi-tasking operating system in real time.

6. The computer architecture emulation system according to claim 1, further comprising:
    a branch logger to store branch profile information of the branch instructions determined by said interpreter.

7. The computer architecture emulation system according to claim 1, wherein
    a code flag is placed after branch instructions that execute a jump into or out of translatable instructions, and
    successor instructions to the corresponding branch instructions are checked to determine if translatable or not by referencing the corresponding code flag.

8. The computer architecture emulation system according to claim 1, wherein
    initial translation of branch instruction is performed when a number of executions of a successor instruction to the branch instruction surpasses a corresponding threshold number.

9. The computer architecture emulation system according to claim 1, wherein
said interpreter and said compiler communicate while said interpreter continues emulating the original object code to initiate translation of segments corresponding to frequently branched instructions.

10. The computer architecture emulation system according to claim 1, wherein said compiler makes an optimized object while tracing each instruction which is in memory, in order, by using a profile corresponding to an address from which compiling was started.

11. The computer architecture emulation system according to claim 10, wherein said compiler does not compile a block upon detection of a page fault, such that when a block causes a page fault, said compiler produces an object to log branch information in a branch logger.

12. The computer architecture emulation system according to claim 11, wherein if an instruction execution process does not timely execute with respect to a predetermined rate, said compiler traces the execution by using a profile, checks whether a branch count is under a predetermined number and produces an object to log branch information.

13. The computer architecture emulation system according to claim 1, further comprising:
a branch logger storing profile information of the branch instructions in the original object code comprising the number of executions, wherein said branch logger includes a cache storing profile information of frequently executed branch instructions and a branch log storing profile information of less frequently executed branch instructions.

14. The computer architecture emulation system according to claim 13, wherein the profile information is organized in the cache by combining branch address information and branch destination information.

15. The computer architecture emulation system according to claim 14, wherein the profile information organized in the cache is stored in a plurality of groups, with each group organized in a decreasing order of entry of profile information into each respective group.

16. A computer architecture emulation system which emulates a source computer architecture on a destination computer architecture, comprising:
an interpreter individually translating original object code into corresponding translated object code, determining a number of executions of branch instructions in the original object code, and comparing the number of executions of branch instructions with a threshold number;
a compiler grouping instructions of the original object code into a segment when a number of executions of a corresponding branch instruction exceeds the threshold number, and dynamically compiling the segment; and
a branch logger to store branch profile information of the branch instructions determined by said interpreter, wherein
said branch profile information includes a branch address, a branch successor, a non-branch successor, a branch execution count, and a branch taken count, and
said branch profile information is logged by said interpreter during branch instruction emulation.

17. A computer architecture emulation system which emulates a source computer architecture on a destination computer architecture, comprising:
an interpreter individually translating original object code into corresponding translated object code, determining a number of executions of branch instructions in the original object code, and comparing the number of executions of branch instructions with a threshold number; and
a compiler grouping instructions of the original object code into a segment when a number of executions of a corresponding branch instruction exceeds the threshold number, and dynamically compiling the segment,
wherein each branch instruction is a seed, said compiler further comprising:
a block picker selecting a segment of the original object code to compile based upon the seed and the profile information of the branch,
a block layout unit flattening the segment into a linear list of instructions, and
an optimizing code generation unit performing the actual compilation of original instructions into tanslated code segment instructions.

18. The computer architecture emulation system according to claim 17, wherein the block picker creates a control flow graph that describes the original instructions to compile and passes the control flow graph to the block layout unit.

19. A computer architecture emulation system which emulates a source computer architecture on a destination computer architecture, comprising:
a plurality of interpreters individually translating original object code into corresponding translated object code, wherein each of said plurality of interpreters profiles original object code branch information in real time while executing translated object code instructions, the profile information comprising a number of executions of branch instructions, and each of said interpreters comparing the number of executions of branch instructions with a threshold number; and
a compiler grouping original object code instructions from any of said plurality of interpreters into segments based upon corresponding branch instructions in the original object code and dynamically compiling the segments of the original object code when the corresponding branch instruction is greater than the threshold number,
wherein a rate of compilation of segments to be compiled is controlled by raising the threshold number when a queue to store the segments to be translated reaches a predetermined capacity.

20. The computer architecture emulation system according to claim 19, wherein each of said plurality of said interpreters profiles the branch instructions and stores the branch instructions which have not exceeded the threshold number by calling a branch logger.

21. A computer architecture emulation system which emulates a source computer architecture on a destination computer architecture, comprising:
an interpreter individually translating original object code into corresponding translated object code, wherein said interpreter profiles-branch instructions of the original object code by storing a number of executions for each branch instruction and comparing the number of executions with a threshold number, such that branch instructions which exceed the threshold number are designated as seeds; and
a compiler grouping instructions of the original object code into segments based upon the seeds and dynamically compiling the segments of the original object code during translation and profiling by said interpreter,
wherein a rate of compilation of segments to be compiled is controlled by raising the threshold number when a queue to store the segments to be translated reaches a predetermined capacity.

22. The computer architecture emulation system according to claim 21, wherein
   each segment contains instructions that result from optimizing the original object code based on a corresponding seed, and
   each segment is installed and uninstalled as a unit.

23. The computer architecture emulation system according to claim 22, wherein branch instructions corresponding to segments which are not compiled are stored in memory while segments corresponding to branch instructions which have not exceeded the threshold number are not compiled.

24. The computer architecture emulation system according to claim 22, further comprising:
   a branch logger storing branch profile information of the branch instructions determined by said interpreter,
   wherein the branch profile information comprises a branch address, a branch successor, a non-branch successor, a branch execution count, and a branch taken count, and the branch profile information is logged by said interpreter during branch instruction emulation.

25. The computer architecture emulation system according to claim 22, wherein a code flag is placed after branch instructions that execute a jump into or out of translatable instructions, and
   successor instructions are checked to determine if the corresponding branch instructions are translatable or not by referencing the corresponding code flag.

26. The computer architecture emulation system according to claim 22, wherein
   branch instruction are initially translated when a number of executions of a successor instruction to the branch instruction surpasses a threshold value.

27. The computer architecture emulation system according to claim 22, wherein
   a rate of compilation of segments is controlled to be compiled by raising the threshold number when a queue to store the segments to be translated reaches a predetermined capacity.

28. The computer architecture emulation system according to claim 22, wherein if an instruction execution process does not timely execute with respect to a predetermined rate, said compiler traces the execution by using a profile, checks whether a branch count is under a predetermined number and produces an object to log branch information like the page fault.

29. The computer architecture emulation system according to claim 22, further comprising:
   a branch logger storing profile information of the branch instructions in the original object code comprising the number of executions, wherein said branch logger comprises a cache storing profile information of frequently executed branch instructions and a branch log to store profile information of less frequently executed branch instructions,
   wherein the profile information is organized in the cache by combining branch address information and branch destination information and the profile information is stored in a plurality of groups in a decreasing order of entry into the group.

30. The computer architecture emulation system according to claim 22, wherein said compiler further comprises:
   a block picker selecting a segment of the original object code to compile based upon the seed and the profile information of the branch, wherein the block picker creates a control flow graph that describes the original instructions to compile;
   a block layout unit flattening the control flow graph into a linear list of instructions; and
   an optimizing code generation unit performing the actual compilation of original instructions into translated code segment instructions.

31. A multi-tasking computer architecture emulation system which emulates a source computer architecture on a multi-tasking destination computer architecture, comprising:
   an interpreter task individually translating original object code into corresponding translated object code and determining a number of executions of branch instructions in the original object code, and comparing the number of executions of branch instructions with a threshold number; and
   a compiler task, operating with said interpreter task on the multi-tasking destination computer architecture, to group instructions of the original object code into a segment when a number of executions of a corresponding branch instruction exceeds the threshold number, and dynamically compiling the segment,
   wherein said multi-tasking computer architecture emulation system is a dynamic translation system, said multi-tasking computer architecture system further comprising software feedback equalizing a rate of compilation requests sent by said interpreter task and the rate of compilations completed by said compiler task, without allowing the compiler task to become idle by varying the threshold number.

32. The multi-tasking computer architecture emulation system according to claim 31, further comprising:
   a queue storing segments to be compiled by said compiler task, wherein the threshold number is compared with a minimum threshold number to turn said compiler task on or off.

* * * * *